(12) United States Patent
Simic et al.

(10) Patent No.: US 11,973,750 B2
(45) Date of Patent: *Apr. 30, 2024

(54) FEDERATED IDENTITY MANAGEMENT WITH DECENTRALIZED COMPUTING PLATFORMS

(71) Applicant: HYPR Corp., New York, NY (US)

(72) Inventors: Bojan Simic, New York, NY (US); Roman Kadinsky, Forest Hills, NY (US); Robert Panebianco, Hoboken, NY (US)

(73) Assignee: HYPR Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,900

(22) Filed: Nov. 22, 2022

(65) Prior Publication Data

US 2023/0239284 A1 Jul. 27, 2023

Related U.S. Application Data

(63) Continuation of application No. 17/338,394, filed on Jun. 3, 2021, now Pat. No. 11,539,685, which is a continuation of application No. 16/373,561, filed on Apr. 2, 2019, now Pat. No. 11,057,366, which is a continuation-in-part of application No. 16/270,255, filed on Feb. 7, 2019, now Pat. No. 10,601,828.

(Continued)

(51) Int. Cl.
*H04L 29/06* (2006.01)
*G06F 16/901* (2019.01)
(Continued)

(52) U.S. Cl.
CPC ...... *H04L 63/0815* (2013.01); *G06F 16/9014* (2019.01); *G06F 21/6227* (2013.01); *H04L 9/0825* (2013.01); *H04L 67/1097* (2013.01)

(58) Field of Classification Search
USPC .......................................... 709/225
See application file for complete search history.

(56) References Cited

U.S. PATENT DOCUMENTS

| 5,535,276 A * | 7/1996 | Ganesan | H04L 9/0825 380/46 |
| 6,976,164 B1 * | 12/2005 | King | G06Q 20/202 707/999.009 |

(Continued)

*Primary Examiner* — Maung T Lwin
(74) *Attorney, Agent, or Firm* — Pillsbury Winthrop Shaw Pittman, LLP

(57) ABSTRACT

Provided is a process that establishes user identities within a decentralized data store, like a blockchain. A user's mobile device may establish credential values within a trusted execution environment of the mobile device. Representations of those credentials may be generated on the mobile device and transmitted for storage in association with an identity of the user established on the blockchain. Similarly, one or more key-pairs may be generated or otherwise used by the mobile device for signatures and signature verification. Private keys may remain resident on the device (or known and input by the user) while corresponding public keys may be stored in associated with the user identity on the blockchain. A private key is used to sign representations of credentials and other values as a proof of knowledge of the private key and credential values for authentication of the user to the user identity on the blockchain.

48 Claims, 8 Drawing Sheets

Related U.S. Application Data

(60) Provisional application No. 62/720,609, filed on Aug. 21, 2018, provisional application No. 62/720,590, filed on Aug. 21, 2018.

(51) Int. Cl.
*G06F 21/62* (2013.01)
*H04L 9/08* (2006.01)
*H04L 9/40* (2022.01)
*H04L 67/1097* (2022.01)

(56) References Cited

U.S. PATENT DOCUMENTS

| | | | | |
|---|---|---|---|---|
| 8,214,890 B2* | 7/2012 | Kirovski | ............ | H04L 63/0823 726/12 |
| 8,646,062 B2* | 2/2014 | Bouz | ............ | G06F 21/33 713/168 |
| 10,044,700 B2* | 8/2018 | Gresham | ............ | H04L 63/0807 |
| 10,135,807 B2* | 11/2018 | Iwanski | ............ | H04L 63/0428 |
| 10,257,161 B2* | 4/2019 | L. | ............ | H04L 63/20 |
| 2006/0196931 A1* | 9/2006 | Holtmanns | ............ | H04L 9/083 235/380 |
| 2012/0297187 A1* | 11/2012 | Paya | ............ | H04L 63/0492 726/4 |
| 2014/0259115 A1* | 9/2014 | Bakshi | ............ | H04L 63/08 726/4 |
| 2014/0282978 A1* | 9/2014 | Lerner | ............ | H04L 63/083 726/7 |
| 2016/0127351 A1* | 5/2016 | Smith | ............ | G06F 21/316 726/10 |
| 2017/0034133 A1* | 2/2017 | Korondi | ............ | H04L 63/083 |
| 2017/0134357 A1* | 5/2017 | Ohlsson | ............ | H04L 63/166 |
| 2017/0230361 A1* | 8/2017 | Toth | ............ | H04L 63/08 |

* cited by examiner

FEDERATED IDENTITY MANAGEMENT WITH DECENTRALIZED COMPUTING PLATFORMS

CROSS-REFERENCE TO RELATED APPLICATIONS

The present application is a continuation of U.S. application Ser. No. 17/338,394, filed on Jun. 3, 2021, titled FEDERATED IDENTITY MANAGEMENT WITH DECENTRALIZED COMPUTING PLATFORMS. U.S. application Ser. No. 17/338,394 is a continuation of U.S. application Ser. No. 16/373,561, filed on Apr. 2, 2019, titled FEDERATED IDENTITY MANAGEMENT WITH DECENTRALIZED COMPUTING PLATFORMS. U.S. application Ser. No. 16/373,561 is a continuation-in-part of co-pending U.S. application Ser. No. 16/270,255, filed on 7 Feb. 2019, titled OUT-OF-BAND AUTHENTICATION BASED ON SECURE CHANNEL TO TRUSTED EXECUTION ENVIRONMENT ON CLIENT DEVICE, which claims the benefit of U.S. Provisional Patent Application 62/720,609 filed on 21 Aug. 2018, titled OUT-OF-BAND AUTHENTICATION BASED ON SECURE CHANNEL TO TRUSTED EXECUTION ENVIRONMENT ON CLIENT DEVICE, and claims the benefit of U.S. Provisional Patent Application 62/720,590 filed on 21 Aug. 2018, titled FEDERATED IDENTITY MANAGEMENT WITH DECENTRALIZED COMPUTING PLATFORMS. The entire content of each afore-mentioned patent filing is hereby incorporated by reference.

BACKGROUND

1. Field

The present disclosure relates generally to cybersecurity and, more specifically, to identity management techniques leveraging decentralized computing platforms.

2. Description of the Related Art

Many computer systems and resources thereon are protected with identity management systems. These systems are designed to ensure that access to computer systems and resources is granted only to the appropriate entities and denied to others. Examples include computer program code in a client/server architecture that verifies that a user submitted password corresponds to an identifier supplied by the user before granting access to resources associated with that user identifier. Other approaches apply federated identity management, such as arrangements between multiple enterprises or another third-party to allow users to use identification data from one platform to obtain access on another platform. For example, an existing user of platform A may use identification data from platform A to obtain access to platform B, and platform A performs the verification. Techniques like those in OAuth 2.0, and related approaches by which a delegated third-party may verify identity on behalf of a constellation of other entities for a given user, may allow the given user to sign into an online forum or native application by logging in via their email provider. In turn, the email provider supplies an authentication token to the server hosting the online forum or exposing an application program interface (API) of the native application for authenticating user access without that server having access to the user's identification data (e.g., the identification data verified by the email provider).

Existing federated identity management techniques impose more friction on users and require more trust of developers than is desirable. Often, in single computing session, a user is asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Further, enterprises hosting federated identity management systems may be un-trusted by other enterprises wishing to authenticate users on such systems. In some cases, the enterprises hosting identity management systems may be competitors of the other enterprises wishing to authenticate users with those types of systems, or developers may be concerned that even if an enterprise is currently trusted, subsequent management may be less reliable. In addition, an enterprise using such systems for authentication services may be unable to receive authentication tokens for authenticating user access in the event of a federated identify management system outage of the hosting enterprise. As a result, user experience associated with an enterprise may be affected by the reliance on third-party user authentication. None of which is to suggest that any technique is disclaimed, merely that there are tradeoffs to keep in mind in view of the following disclosure.

Further, in a variety of scenarios, it can be useful to authenticate a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to solicit additional credentials from the user. In this manner, such systems may supply additional factors by which additional confidence may be obtained regarding a user's identity, as merely compromising a user's username and password would not by itself afford access to secured resources.

Many existing out-of-band authentication techniques are potentially subject to vulnerabilities. Examples include attacks that compromise the client computing device by which the user supplies the supplemental credentials in the out-of-band channel. Some existing systems are potentially vulnerable to malicious code executing on the user's mobile device that, for example, capture user supplied credentials from system memory allocated to client-side authentication applications.

Oftentimes, out-of-band authentication is incorporated within federated identity systems. The result being that federated identity systems are further susceptible to those attacks described above that are applicable to out-of-band authentication, and the rewards of a successful attack for attackers are far greater than on an individual account basis. For example, a compromised federated identity may afford an attacker access to a wide range of different entities, accounts, protected assets, or any other information accessible under the umbrella of that federated identity. Thus, there exists a need to reduce friction on users while maintaining security. Again, none of which is to suggest that any technique is disclaimed, merely that there are tradeoffs to keep in mind in view of the following disclosure.

SUMMARY

The following is a non-exhaustive listing of some aspects of the present techniques. These and other aspects are described in the following disclosure.

Some aspects include a decentralized identity management system that implements zero-knowledge authentication credentials on a blockchain-based computing platform by which federated identities, physical access, and payments may be managed according to the example aspects of methods and processes described herein.

Some aspects include a computer-implemented method of establishing a user identity within a tamper-evident, immutable, decentralized data store, the method comprising: receiving, with one or more processors, a request to establish a user identity, the request comprising representations of credentials, first signed data, and a public key. A determination of whether to establish a user identity record by one or more processors may be based on a verification of the first signed data, the first signed data verified based in part on the public key and the representations of credentials. In response to a determination to establish the user identity record, it may be published to the tamper-evident, immutable, decentralized data store and comprise information including the public key and the representations of credentials. The data store may comprise a plurality of user identity records established for respective users and a plurality of other records, like authentication records pertaining to authentication of users to their respective user identity records, records pertaining to federation of user accounts under their respective user identity records, records pertaining to user devices authorized to utilize a user identity record, and records pertaining to other users a user authorizes to utilize their user identity record. Aspects further include receiving, with one or more processors, a request to authenticate a user to the user identity record, the request comprising second signed data and an identifier of a first record, and then accessing, within the data store, the first record indicated by the identifier, and accessing at least one other second record referenced by the first record. A determination of whether to authenticate is a user is made, such as by one or more processors of a server, a computing node of the decentralized computing platform, oror a plurality of computing nodes, and which may be performed by executing all or some of the operations enumerated in a smart contract. The user may be determined to be authenticated to their user identity record within the data store in response to operations comprising a verifying that the first record has not been tampered with subsequent to publishing by verifying that the first record is consistent with a set of cryptographic hash values based on the first record, at least some of the cryptographic hash values also being based on other records; a verifying that the second record has not been tampered with subsequent to publishing by verifying that the second record is consistent with a set of cryptographic hash values based on the second record, at least some of the cryptographic hash values also being based on other records, wherein the second record is the user identity record; and a verifying that the second signed data is signed by a private key corresponding to the public key of the user identity record. In response to the determination and the request to authenticate the user to the user identity record, aspects include causing, with one or more processors, one or more computing devices to publish to the tamper-evident, immutable data store an authentication record including at least a reference to the first record and the second signed data.

Some aspects further include generating a token, which may be included in the authentication record. A user may sign that token and present that token for verification based on their public key recorded in the authentication record. A relying party server within the identity management system may sign that token with their private key and transmit the signed token to a device of the user. A user may utilize their device to present the token signed by the relying party in association with a request, like a physical access request or payment authorization request, such as by near field communication, and the signed token may be verified as proof of user authentication based in part on the public key of the relying party. Likewise, such a request may also include a signature of data by the user with their private key, thereby permitting verification according to their public key. Aspects may include selecting data for signature, like a string including the token and other data such as to afford proof of relying party authorization, confirmation of authenticated user identity, and recentness of generation of data oror signature, as verified by public keys. Aspects may include verification by taking as input in one or more signature verification functions a data string, signed data, and one or more public keys to verify authenticity of signatures and recentness of an authorization compared to a threshold of time for expiration. Public keys may be stored on, or otherwise accessible, by devices configured to grant physical access or permit payments responsive to signature verification. Some public keys may be provided in a request, as their validity may be conferred by signature verification of signed data including the public key. Alternatively, other encryption techniques, like asymmetric encryption, may be utilized to convey some data, but that data may still be signed and verified for authenticity.

Some aspects include a computer-implemented method executed by one or more processors of a computing device that supports a client-side role in authentication on a decentralized data store, the method comprising obtaining an application within a memory of a computing device and executing, by the computing device, the application within a client execution environment of the computing device, the application when executed being configured to perform operations. Operations can include establishing a secure session with a trusted execution environment of the computing device, the trusted execution environment comprising a secure memory not accessible from the client execution environment; requesting, by one or more requests over a secure session, establishment of a set of credentials within the secure memory by a co-processor of the trusted execution environment, the co-processor being a different processor from a central processing unit of the computing device; requesting, by one or more requests over a secure session, first data comprising a representation of each credential in the set of credentials, first signed data, and a signature key of the trusted execution environment; determining the co-processor of the trusted execution environment generated the representations responsive to the signature key; in response to the determination, transmitting the first data to a first server for publication within the decentralized data store; receiving identity information, the identity information corresponding to an immutable, tamper-evident, identity record established within the decentralized data store, the identity record comprising a public key; requesting, by one or more requests over a secure session, second signed data, wherein the second signed data is signed within the trusted execution environment by a private key corresponding to the public key; and transmitting the second signed data and identity information to a second server for authentication of user ownership of the identity record based on verification of the second signed data being signed by the private key corresponding to the public key of the identity record and verification of authenticity of the identity record within the decentralized data store.

Some aspects further include a computer-implemented method executed by one or more processors of a computing device that supports a client-side role in authentication of a federated user account on a decentralized data store, the method comprising obtaining an application within a memory of a computing device and executing, by the computing device, the application within a client execution environment of the computing device, the application when executed being configured to perform operations. Operations of the application, which may be an authentication application, can include establishing of a set of credentials within a secure memory by a co-processor of a trusted execution environment of the computing device, the co-processor being a different processor from a central processing unit of the computing device; requesting, from the trusted execution environment, first data comprising a representation of each credential in the set of credentials, the representation of each credential indicative of corresponding credential values processed within the trusted execution environment; transmitting the first data to a first server for publication within the decentralized data store; receive identity information, the identity information corresponding to an immutable, tamper-evident, identity record established within the decentralized data store, the identity record comprising a public key; and storing the identity information within a wallet application accessible by other applications on the computing device. Some aspects of the method further include executing, by the computing device, a relying application within the client execution environment of the computing device, the relying application when executed being configured to perform operations. Operations of the relying application can include comprising interfacing with the wallet application to access the stored identity information; requesting, from the trusted execution environment, second data signed within the trusted execution environment by a private key corresponding to the public key of the identity record; and transmitting the second data to a second server for publication within the decentralized data store in association with the identity record.

Some aspects include a tangible, non-transitory, machine-readable medium storing instructions that when executed by a data processing apparatus cause the data processing apparatus to perform operations of one or more of the above-mentioned processes and computer-implemented methods.

Some aspects include a system, including: one or more processors; and memory storing instructions that when executed by the processors cause the processors to effectuate operations of one or more of the above-mentioned processes and computer-implemented methods.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
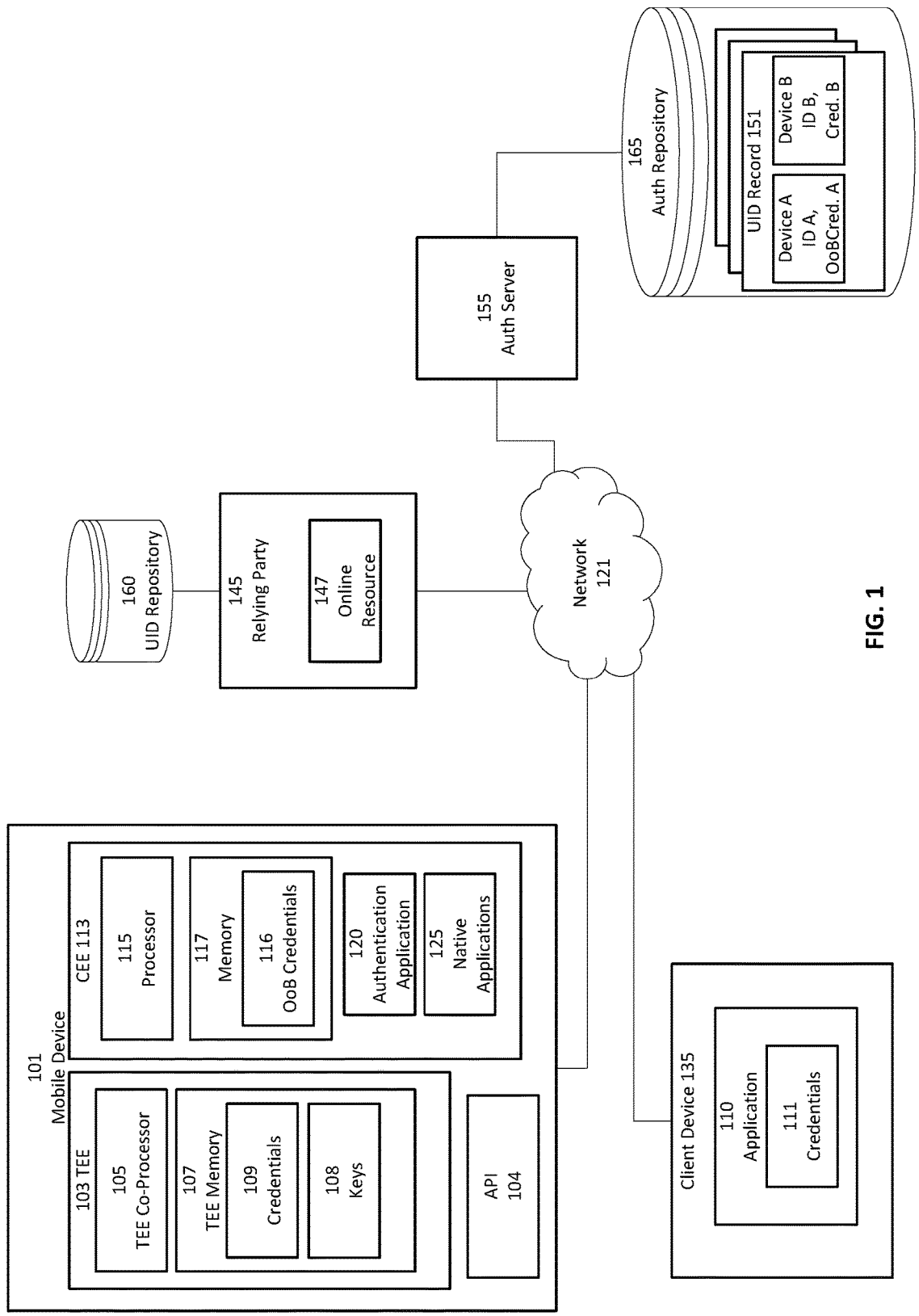
FIG. 1 is a block diagram showing an example of a computing environment by which the present techniques for user authentication may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments implement a computing architecture that mitigates some of the above described challenges with existing identity management computing systems. Some embodiments may expose interfaces by which a user may establish an identity (e.g., create one that did not previously exist within a system), and user access to the identity is predicated on the user proving knowledge (e.g., by a zero-knowledge proof) of secret retained values (which may reside with the user, within a trusted environment of the user device, oror both) used to establish the entity. For example, a record of the identity may contain one or more cryptographic keys (e.g., public keys in an asymmetric encryption protocol) or representations of credentials whereby the user may prove knowledge of a corresponding private key and credential values retained in secret by the user. In some embodiments, such provided information may include a data signed within or by a component of a secure environment (e.g., a trusted execution environment) of the device used by the user that is operable to verify that the representations were generated responsive to the user providing actual credential values. Some embodiments may expose interfaces by which a user may associate user accounts (e.g., for federation under the identity), user devices, oror other users with the established identity, such as to afford use of the identity (and associated accounts) on those different devices oror by those different users. Approval of such associations may be predicated on approval of a request, such as by the user having established the identity confirming the request by a zero-knowledge proof. Access to the established identity by those different devices oror users may be governed by similar proofs of knowledge established during the association process, such as by inclusion in a request.

Some embodiments may expose interfaces by which an entity may authenticate user access to an established identity. For example, the entity may request, via one of the interfaces, authentication of the user. The request may include information operable to identify a record of an established identity. The request may also include user supplied proof of secret knowledge for verification of user access to the established identity. In some embodiments, a user, such as via a user device, may request authentication oror respond to an authenticate challenge via one of the interfaces (e.g., to provide a proof of identity for physical access, out-of-band authentication, payments, etc.). The interface, in turn, may provide a result for authentication of the user to utilize the identity. In some embodiments, an interface is configured to provide a given result for authentication of a user based upon an earlier authentication result for the same user. In some embodiments, authentication of the user based upon the earlier authentication result may be predicated upon the earlier authentication satisfying criteria for the current authentication request, and that criteria may be specified by an authentication policy. For criteria not satisfied, the user may be requested to provide authentication information. In some embodiments, the entity requesting authentication of the user may be different from an entity for which the earlier authentication result having earlier authenticated that same user, for instance, if within a threshold duration of time. In some embodiments, the subsequent entity may selectively honor earlier authentication decisions based upon whether the earlier authentication applied equal or greater authentication criteria, for instance, if the subsequent entities authentication criteria are a subset of those of the earlier entity, thereby reducing authentication friction for a user relative to systems that request credentials for each entity.

Some of the above-described issues with traditional out-of-band authentication techniques oror their incorporation into federated identity management systems are also mitigated by various embodiments described herein. Specifically, various embodiments described herein provide improvements in computer security that mitigate the capture of user supplied credentials from system memory allocated to client-side authentication applications, even in cases where the capture of such credentials is attempted by intercepting inter-process communication on the client device between the client-side authentication application and security infrastructure on the client device. Thus, various embodiments described herein provide improvements in computer security that mitigate highly sophisticated methods for the capture of user supplied credentials, and some of those embodiments incorporate use of and improve upon trusted execution environments, like Secure Enclave, ARM TrustZone, or various other trusted platform modules compliant with ISO/IEC 11889, to provide enhanced client-side security. Moreover, the techniques described in those embodiments for mitigating capture of user supplied credentials on client devices may be implemented in connection with various other embodiments described herein to configure robust identity management systems with authentication processes apt to prevent unauthorized access to identities including federated identities and other secure assets, like protected data, programs, etc., to which those identities are permitted access, even in instances where a nefarious party has access to a device (or multiple devices) of an authorized party.

Embodiments of systems and methods described herein may confer one or more of the aforementioned benefits. Examples of such embodiments may protect user credentials with zero knowledge techniques. For example, some embodiments store or process credential values, private keys, or other data for zero knowledge techniques on a mobile computing device, without that data leaving the mobile computing device. Rather, only representations of credentials, public keys, and the like are transmitted from the mobile computing device for verification or storage by other entities. In some embodiments, credential values, and cryptographic hash values based thereon, or various private cryptographic keys of asymmetric encryption protocols may be stored, for example, exclusively within a trusted execution environment, for instance, in a secure memory of a trusted execution environment implemented with a secure coprocessor that is separate from a central processing unit of the mobile computing device upon which an operating system and native applications of the mobile computing device execute. In some embodiments, the zero knowledge techniques may be applied to prevent even the central processing unit of the mobile computing device from accessing such credentials and keys. In some embodiments, a secure channel (or session) may be established between an application, like an authentication application or other native application (e.g., of a party reliant on user authentication techniques described herein) executing on that central processing unit and the trusted execution environment. In some cases, the secure channel may impede attempts by threat actors to extract cryptographic keys or other credentials by impersonating the trusted execution environment or the authentication application in communications with one or the other of these computational entities. In addition, the secure channel may be a secure session, in that it may be closed (e.g., expire), such as after a predetermined number of communications between the trusted execution environment and the authentication application.

In some embodiments, the mobile computing device is a portable device which a user frequently carries on or near their person throughout the course of their daily activities. Example mobile computing devices may be a smartphone or smartphone-like devices such as phablets or tablets with wireless data access.

Some embodiments may be implemented in a distributed physical architecture that includes client computing devices controlled by diverse entities. In some embodiments, users may operate client computing devices, like a laptop or desktop computer, which a user may use to attempt to log into an online account to access online resources. Other devices may also be suitable for this purpose, such as tablets, netbooks, and the like. A user may input credentials via the client computing device for the online account at a log-in page of a website via a browser or similar log-in interface within a native application. In turn, the client computing device may submit (e.g., in response to a user election to log-in) the credentials (or cryptographic hash values based thereon) to a remote server, which may include, engage, or otherwise participate in an authentication system configured to determine an authentication result indicating whether the user is permitted access to those online resources. For example, the authentication system may verify whether a user can input valid credentials in a zero-knowledge proof governing access to an established identity of the user. Such verification may be provided by a mobile computing device, which may be different from the client computing device, such as by an association of that mobile computing device with an established identity indicated in the access attempt (e.g., for out-of-band authentication). Alternatively, the mobile computing device may attempt access, such as via a native application on the mobile computing device. In either instance, the user may provide proof via the mobile computing device that they have access to one or more secret credential values, private keys, etc. governing access to the established identity without exposing the actual credential values or private keys.

Verification of proof may be achieved by verification of digital signature of data, such as over cryptographic hash values, tokens, etc., with one or more private keys. For example, a private key may be used to sign data and a corresponding public key used to verify the data was signed by the holder of the private key. Further, for example, the data may be a representation of credential values, like a cryptographic hash of credential values, which may be signed within a trusted execution environment of a mobile device (e.g., by a private key retained securely within the environment, which may be a key of a component), and may be verified in a similar fashion. Signing of the data within the trusted execution environment may be indicative of receipt of credential values by a component having an interface with the trusted environment and processing of those values within the trusted environment to determine results, like a representation of the credential values. Signature functions may also use time stamps to indicate a time (e.g., a system time) at which data was signed, such as by including a timestamp in a data string that is signed, or received data to indicate which received data prompted the signature, such as a token value, identifier of a notification, or other data, thereby indicating how recently the signature over a data string was generated or why the signature over a data string was generated. If those credentials are authenticated (i.e., verified), the client computing device is granted access to the online resources provided by the website or the native application. Conversely, if the user inputs invalid credentials, authentication fails (i.e., not verified) and the client computing device or mobile computing device is restricted from access to online resources provided by the website or the native application.

In some embodiments, a remote server engages an authentication service of an authentication system or identity management system. For example, the remote server may transmit the credentials received from the client computing device to an authentication server. Alternatively, in some embodiments, the mobile computing device may transmit credentials to an authentication server. The authentication server may authenticate the credentials, and provide the authentication result (e.g., verified or not verified), such as to the remote server or other requesting entity. The remote server may then grant the client computing device or mobile computing device access to the online resources or restrict access to the online resources based on the result. Thus, in some embodiments, the remote server engages the authenticate service in response to an access attempt, receives a result subsequent to a user authenticating with the authentication service (e.g., with the mobile computing device), and authenticates a mobile device that engages the remote services based on the result. In some embodiments, the remote server may receive a result from the authentication service prior to a first access attempt. For example, a user may pre-authenticate on their mobile computing device with the authentication service. The result may be received by the remote server subsequent to the user authenticating with the authentication service (e.g., with the mobile computing device). Alternatively, in some embodiments where the user initiates the authentication process with the mobile computing device the mobile computing device may receive the result from the authentication service and present the result to the remote server. In some embodiments, a remote device dedicated to authenticating a mobile device based on a result presented by the mobile device or configured to transmit a result presented by the mobile device. Results presented by a mobile device or other computing device may include additional data, signatures of the result, public keys and the like, such as in a given schema for authentication.

In some example embodiments that include configurations where a device requesting authentication, like a mobile computing device engages the authentication server, that device may receive the results from the authentication server, which may be signed by the authentication server. In turn, the mobile computing device may present that results to access a secured asset, whether in an out-of-band authentication process, in-band authentication process, or for other unique applications. For example, the result may be presented by the mobile computing device via a native application, which may be a trusted application within the trusted execution environment, like a wallet-type application configured to provide the result and corresponding identity to which the result pertains to other devices. Examples of those other devices may be door locks, payment terminals, and the like configured for near-field-communications over protocols like Bluetooth, Zigbee, WiFi, etc., and which may be coupled to a network or include a processor, by which such a result received from a mobile computing device may be verified prior to effecting an operation (e.g., unlocking a door, confirming a payment, etc.). In some embodiments, such as those including payment terminals, the results may be structured in a standardized format accepted by those terminals on a given payment service. For example, a user may be authenticated to an account and a result, like a token, corresponding to that account may be provided to the mobile device. Indication of which payment service and the token (an optionally other credentials) may be submitted to the terminal which transmits the data to the payment service for authorization of payment. In some embodiments, token generation may be predicated on account information (e.g., like a credit limit or balance) and confer authorization of payment. Standardized formats for payments include various fields for encrypted data or tokens, such as for one-time-payment authorization, to prevent another transaction being authorized on the same data. In some embodiments, such as those including physical access, the results may be structured in a standardized format for activation of a given mechanism, like an electro-mechanical device, which may include an electromagnet, an electrical motor, a solenoid or other circuit to cause a change in an electromagnetic field to actuate a lock, like driving a pin into or out of a hole, changing a state of an electromagnet adjacent a ferromagnetic plate attached to a door, or the like, (e.g., to access or secure access to an area or receptacle or otherwise interact with a secure asset—like a switch to turn on some device). The electro-mechanical device may include one or more hardware elements like a processor, memory, receiver, transmitter, and the like to receive results for authentication. Some electro-mechanical devices may process the results directly by verification of signature, or transmit the result and receive a response, such as from a server. In either instance, the electro-mechanical device may actuate a mechanism based on a received result.

In some embodiments, an authentication process may occur when a user attempts to access a native application, or more generally, a software asset. In other words, such assets may be secured, and access to those assets may be granted conditionally upon authentication of the user attempting to access the asset. A recent development in an era where network access, such as to the Internet, is prolific, digital rights management (DRM) techniques have been implemented to protect native applications, software assets, and other media from unauthorized access. DRM can include authentication checks that occur at time of access of an asset, periodically (e.g., every few minutes or hours while the asset is being accessed (e.g., read or executed), or continuously such as over a connection with a server while the asset is being accessed, sometime referred to as always-online. Authentication may protect an asset like a native application or feature thereof rather than (or in addition to) a specific online resource. Another example of an asset may be a media file. By way of example, a native application, like a native application for creating 3D models, may require user authentication upon launch (e.g., for a license) to access the application itself (which may require periodic re-authentication), or user authentication may be required for the native application to access an online resource (e.g., a repository of data), like a repository of 3D models. Sometimes both instances of authentication may be required. In either instance, a user may supply credentials (which may differ for each instance) and a remote server (or servers) may determine or receive an authentication result. In the case of the native application requiring user authentication (e.g., upon launch), a remote server may provide the result or data indicative of the result to the native application. In the case where user authentication is required for the native application to access an online resource, a remote server may grant the native application to access the online resource based on the result.

In some embodiments, the authentication process includes one or more authentication steps in addition to verifying the credentials received from the client computing device. Moreover, in some embodiments, the credentials received from the client computing device need only identify a particular user, identity, account, or other entity. As such, an authentication process may not require any verifying of user credentials received from a specific client computing device. Rather, another client device like a mobile computing device may be prompted to provide credentials (e.g., a zero-knowledge proof). In either instance, based on the received credentials, a server may identify account or user identity information of a user associated with those credentials. In some embodiments, the received credentials include an identifier operable to identify associated user account information or records.

User account information or records may include information about different computing devices used by the user (e.g., including a mobile computing device different from the client computing device attempting to access an online resource). The information about the different computing devices may include one or more identifiers for the respective computing devices. Example of identifiers may include a network address identifier or a monitored address identifier. Example network address identifiers may include one or more of an IMEI number, telephone number, MAC and IP address, or other identifiers suitable to uniquely reference a given computing device. An example of a monitored address identifier may be a location (e.g., on a network) which a given computing device monitors for data published to that location or a key-value pair like a location and an identifier which a given computing device monitors for at that location. In some example embodiments, the monitored address identifier may be an address of a given computing device on a notification network or service, like a push notification network, to which the computing device has registered. In turn, the given computing device may receive data published to that address on the notification service. In some embodiments, a monitored address identifier may be a network address identifier of the computing device.

One or more of the different computing devices, such as a mobile computing device, may have been previously registered with a server via an authentication application. In some embodiments, such a registration process may include the establishment of an identity of a user of the mobile computing device within an identity management system. For example, a mobile computing device may register with the server via an authentication application by downloading the application from the server or an application repository (or application store), executing the application, and performing one or more steps in a registration process (e.g., to establish zero-knowledge proofs). The server may determine which ones of the different computing devices, such as those including the authentication application, are operable to receive a notification of the access attempt to the secure asset. The server may select one of the different computing devices registered with the server and cause a notification, such as a push notification, to be sent to the one of the different computing devices, like a mobile computing device registered as being associated with the user identifier. The server may send a notification such as a push notification over a service like via Firebase Cloud Messaging service, Apple's push notification service, Google Cloud Messaging, or another push notification service to which the different computing device is subscribed. An example of another notification service may be a notification service subscribed to by the authentication application on the different computing device, such as a feed or monitored address, on which the server may push, publish, or otherwise transmit a notification, like a pending transaction indicative of an access attempt. In either instance, the server transmits or otherwise publishes the notification such that one of the different computing devices may receive the notification. In some embodiments, a server oror computing node of an authentication system oror identity management system performs one or more of these steps in response to receiving credentials operable to identify associated user account information from a remote server oror client device. In some embodiments, an authentication service of an authentication system performs one or more of these steps in response to receiving credentials operable to identify associated user account information from the client computing device, such as by a redirection of the client computing device to the authentication server (e.g., by the remote server), or other configuration by which the client computing device may transmit credentials to the authentication server (e.g., via applet or other embedded content, such as within a log-in page, via application, etc.). In some embodiments, an authentication service of an identity management system, such as for federated identities, performs one or more of the above steps, and results of the authentication permitting access to a given secure asset may be applicable to afford access to a variety of other secure assets of different parties (e.g., for a configurable amount of time) to which that user is also permitted to access while authenticated.

In some embodiments, the mobile computing device may execute an authentication application that includes an event handler configured to respond to such a push notification received from a server, such as an authentication server of an authentication system. The event handler of the authentication application may interface with the mobile computing device to present, on the display, one or more user interface elements responsive to the notification. One or more of the user interface elements may be operable to solicit credentials from the user of the mobile computing device, or otherwise execute a process to solicit credentials. For example, the event handler/authentication application may request one or more native applications of the mobile computing device to present user interface elements configured to solicit the additional credentials via one or more interfaces of the mobile computing devices configured to obtain a corresponding credential input from the user. In some embodiments, the native applications selected to solicit credentials are configured to interface with a trusted execution environment of the client computing device, such that those credentials are obtained within the trusted execution environment. Alternatively, or in addition to interfacing with native applications, the authentication application may interface with the trusted execution environment of the mobile computing device to request solicitation of the additional credentials. In either instance, the user may be prompted to provide solicited credentials (or confirm a providing of the credentials) via one or more user interface elements or components and provided credentials may be obtained within the trusted execution environment when supplied by the user. For example, the user may then supply the additional credentials, like a password, pin code, or biometric "print" measurement (like a fingerprint sensor reading, image sensor reading such as a faceprint, an iris reading such as an eyeprint, a voiceprint, or the like). The authentication application may obtain representations of the supplied credentials. Additionally, one or more key-pairs may be generated within the trusted execution environment, private keys generated within the trusted execution environment may be retained securely within the environment while corresponding public keys may be provided as credentials for verification of data signed with the private keys. Additionally, the trusted execution environment oror one or more components within the environment may be configured to sign output data (e.g., results) with a private key to indicate that the data was securely collected oror processed within the environment. In such instances, corresponding public keys operable to verify those signatures may be provided as credentials. Thus, generally, credentials may include representations of credential values, signatures of data, oror public keys operable to verify signatures. Credentials may be output in a data string containing the various signed data, signed data strings, public keys, representations of input credential values, etc. for input into one or more signature verification functions. In turn, the authentication application may transmit the additional credentials obtained from the user to the authentication server of the authentication system.

Thus, for example, access to online resources (or other asset like a native application) from a device may be granted by virtue of a different computing device authenticating with the additional credentials. In practice, for non-nefarious access requests, the user of the computing device is typically the same user as the one requesting access to the online resource with the different computing device, and the supplying of the additional credentials verifies both the user's intent and identity to access the online resources (e.g., such as where access to the online resources is controlled on a per-individual user basis). Other oror additional factors may also be considered, examples of which are explained in detail below.

Before or after user input to supply a credential via a mobile device (or other device different from a client computing device requesting access to an online resource), an authentication application may establish a secure channel with a trusted execution environment on the mobile computing device using the techniques described below. The secure channel may be established during a lifetime of a secure session between the authentication application and the trusted execution environment. Should the session expire, such as after a predetermined number of requests oror response, a new session may be established to permit communication by secure channel. Supplied credential values, or a cryptographic hash value based thereon, may be obtained within the trusted execution environment. Representations of those credentials may be generated within the trusted execution environment and may be passed through the secure channel to the authentication application. In some embodiments, the trusted execution environment may determine whether supplied credential values match previously obtained credential values stored within the trusted execution environment. For example, the trusted execution environment may determine whether supplied credentials values or a cryptographic hash value corresponding to supplied credential values match a valid credential stored within the trusted execution environment. The valid credentials stored within the trusted execution environment may have been generated during a prior registration process by the authentication application, and representations of the valid credentials may have been provided to the authentication application for transmission to an authentication service or identity management system for establishing an identity during a prior registration process. Representations of valid credentials may be a cryptographic hash or encrypted version of valid credentials or valid credentials and some other value, even though valid credentials may also be cryptographically hashed or encrypted themselves. Only representations may be passed outside of the trusted execution environment such that valid credentials need not be altered to generate new representations (e.g., by changing a encryption key or changing a value operable to alter cryptographic hash output values).

Results may be cryptographically signed with a private encryption key held within the trusted execution environment (e.g. not accessible in the memory address space of the operating system of the mobile computing device in which the authentication and native applications execute, and in some cases not accessible on a memory bus of the central processing unit of the mobile computing device). For example, some embodiments may cryptographically sign (e.g., in the trusted execution environment) various outputs of the trusted execution environment used for authentication (e.g., verification and matching by an authentication system or identity management system). Example outputs may be one or more of a verification results as determined by the mobile device, a representation of a credential value, oror other information described herein. For signed data (e.g., a signature of the data using a key, like a private key), the signature may be verified based on the input data and a corresponding key (e.g., the public key corresponding to the private key).

In some embodiments, a server is configured to receive the cryptographically signed data, verify that the cryptographically signed data was signed by an entity (e.g., a specific mobile computing device of a user) with access to a private cryptographic key corresponding to a public cryptographic key associated with the user's account or established identity of the user, and then, determine whether the signed data indicates that the user-supplied credential values match those previously supplied during registration. The server may verify that user-supplied credentials match those previously supplied during registration where the data is a representation of the user-supplied credential (e.g., by virtue of verifying a signature indicative of receipt and processing of credential values corresponding to the representation within the trusted execution environment). In some embodiments, a different cryptographic key pair in an asymmetric encryption protocol, may be applied for each of a plurality of different credentials to generate representations, such as a plurality of different biometric measurements, required by a policy applied in a given authentication process. Alternatively, different representations may be generated using different inputs to a cryptographic hashing function to obfuscate the credential values. In configurations that use credential-specific keys, embodiments may mitigate key distribution issues that arise when an entity (e.g., a company) disables a particular type of credential for accessing an online resource or asset while leaving the others in place. Representations may also be generated in different ways for different ones of parties utilizing an authentication system. Thus, for example, a set of credentials used for a company A may have different representative values than when that same set of credentials are used for a company B. Additionally, in some embodiments, different key may be used for the In some embodiments, a server of an authentication system performs one or more of these steps in response to receiving credentials from a remote server oror device of a user to authenticate a same or different device access to a secure asset. In some embodiments, a server of an identity management system performs one or more of these steps in response to receiving credentials from a remote server oror device of a user to authenticate a user to an established identity, whereby that identity may be permitted access to a secure asset.

Further, in some cases, embodiments may be implemented with a decentralized computing architecture, for instance, on a blockchain-based computing platform, like Ethereum, Cardano, NEO, hyperledger, or using a similar blockchain-based protocol by which participant entities may be shielded from the risk of a single central authority leveraging a position of power over the computing architecture to their detriment. For example, in existing federated authentication systems, the participant entities, i.e., the parties relying on such authentication methods, are to some extent beholden to other participating parties oror the authentication system platform. Specifically, for example, if party A allows for user account creation based on federated user identities from a party B, at least some aspects governing user of those user accounts is tied to party B's system and continuation of a relationship with party B due to a reliance upon party B for authentication of user access to those accounts. Such configurations can cause issues in instances where party A chooses to discontinue a relationship with party B, or vice versa, because the authentication of at least some user accounts within party A's system is handled by party B. This can also present complications for users. For example, a user may create an account with party B and party B may enable the user to use that account as a federated identity. If the user creates an account with party A utilizing the federated identity supported by party B, this can cause issues in instances where the user chooses to discontinue a relationship with party B, or vice versa, and the user wishes to maintain a relationship with party B because authentication of the user to access the account created with party A may be dependent upon the user maintaining the federated identity with party B that was used for account creation with party A.

In accordance with example embodiments implemented with a decentralized computing architecture, such as on a blockchain-based computing platform, user identities, authenticating entity identities, and authentication policies thereof, may be committed to a blockchain ledger, in some cases along with time stamped authentication decisions by such entities for such users (e.g., for a given computing device of a user). As a result, authentication decisions may be based on data stored on a blockchain. Those authentication decisions may take into account one or more of the different informational items pertaining to user identifies stored on the blockchain. For example, with respect to a user choosing to discontinue a relationship with some party, information pertaining to the user identity established with that party that is stored on the blockchain may be accessible by other parties. In some cases, the information pertaining to the user identity stored on the blockchain may be operable to authenticate the user even where the user no longer has a relationship a party with which the identify was originally used.

In addition, committing of data to a blockchain may reduce friction for a user utilizing a federated identity, as a prior authentication request or requests and an authentication decision or decisions (along with other data stored in the blockchain) pertaining to the federated identity may be accessible by other parties. For example, in some embodiments, subsequent authentication requests by a user on a recently authenticated computing device (like within the last 15 minutes, an hour, or day) may be serviced by referencing the blockchain ledger to determine whether the computing device was authenticated within a threshold duration of time by another entity with an authentication policy that is equal to, or more stringent than, an authentication policy for the entity receiving the authentication request. Upon determining that these criteria are met, some embodiments may defer to the earlier authentication decision and authenticate the user without requiring the user to resupply at least some authentication credentials. Or in some embodiments, the user may re-authenticate with a subset of authentication criteria, for instance, by supplying a requested biometric authentication factor but not a password authentication factor in virtue of an earlier authentication determination based on a username and password but not based on a biometric measurement.

The re-authentication process may occur in response to a variety of criteria, and that criteria may be defined by the policy specified by an authentication request. For example, considering a given authentication request for an authentication decision subsequent to at least one prior authentication decision, re-authentication may commence for a decision on the given authentication request after a first threshold period corresponding to a prior authentication decision for an authenticated computing device but before a second threshold period of time requiring full authentication, or where one or more prior authentication decisions for an authentication computing device are within a threshold period of time but have less stringent criteria than criteria specified by the given authentication request.

A given authentication request may specify policy for making the authentication decision, which may include criteria such as thresholds for the utilization of prior decisions and criteria for which authentication factors are required. A requested authentication factor may be selected in response to criteria specified by the given authentication request and the criteria associated with the one or more prior authentication decisions. For example, if the criteria specified by the given authentication request specifies some authentication factor not previously provided in association with prior decisions, that factor may be selected. Similarly, an authentication factor may be selected based on that factor not being used in association with prior decisions. Alternatively, if each of the available authentication factors were used previously, the selected authentication factor may be different than at least the authentication factor used in association with the last decision. In some embodiments, selection of an authentication factor for re-authentication may be from a subset of factors that are less intrusive to user experience, like a biometric input or a PIN rather than a lengthy password. In contrast, for an initial or full authentication, a stronger authentication factor (which may be a combination of authentication factors) may be requested, and the stronger authentication factor may optionally be requested along with one or more authentication factors selected from the subset of factors for re-authentication. The criteria and authentication factors of a policy for an authentication decision on a given authentication request may, in some embodiments, be organized into different tiers, e.g., tiers 1-3, where a decision on a tier 1 request may be governed by a policy that is less strict than a policy for a tier 2 request, and so on for the number of tiers used.

In some embodiments, these techniques may be implemented on a distributed and decentralized physical computing architecture. The computing environment may include user computing devices, such as laptop computers, cell phones, wearable computing devices, desktop computers, and the like by which users supply credentials, make request to access resources, and interact with those resources via a network, like the Internet. In some embodiments, these user computing devices may include native applications or web browsers by which the computing resources are accessed. Further, some embodiments may execute a federated identity management client module or application by which different client-side applications coordinate with one another, access authentication-related client-side state, and coordinate with remote computing devices. The computing architecture may further include various collections of servers that expose the various secured resources for which authentication determinations are made.

The computing architecture may also include a collection of computing devices each executing peer compute nodes of a decentralized blockchain-based computing platform that may host a blockchain ledger or other tamper-evident decentralized data structure. In some embodiments, the peer compute nodes may execute a smart contract, for instance, with verifiable computing techniques, for example, by having each computing node execute the code of the script encoding the smart contract and arriving at a consensus (e.g., with Paxos or Raft) regarding a result of the execution. In some embodiments, the smart contract may read and write state on the block chain ledger. In some embodiments, the smart contract may further implement logic by which authentication determinations like those described below are implemented. In some embodiments, the blockchain computing platform may be implemented with the techniques described in whitepapers with the following titles hosted on the hyperleger.org website on the date that the present application is filed: Hyperledger Architecture, Volume 1: Introduction to Hyperledger Business Blockchain Design Philosophy and Consensus; and Hyperledger Architecture, Volume 2: Smart Contracts, each of which is incorporated by reference herein.

In some embodiments, some of authentication credentials may be supplied with zero knowledge techniques, for instance, by which the credential value itself, such as a password or biometric measurement, remains resident on the computing device of the user (i.e., does not leave that computing device) upon being supplied by the user. Some embodiments may input such a credential or value based thereon into a one-way cryptographic function, like a cryptographic hash function, such use SHA 256, and embodiments may supply the output or a value based thereon via a network to a remote computing device that determines whether the user is to be authenticated based on a comparison between the cryptographic hash value and a previously stored cryptographic hash value, for instance, supplied during registration or credential creation based on the same input and hash function. Upon determining that the cryptographic hash values match, the corresponding security criterion may be determined to be have been satisfied by the remote computing device.

FIG. 1 illustrates an example computing environment 100 within which an out-of-band authentication system with a client-side role in out-of-band authentication may be implemented. In some embodiments, the computing environment 100 may include a mobile device 101, a client device 135, a relaying party 145, and an authentication server 155. These components may communicate with one another via a network 121, such as the Internet and various other local area networks. In addition, embodiments of the example computing environment 100 may include a mobile computing client device, such as mobile device 101, that supports client-side out-of-band authentication based on a secure channel to a trusted execution environment.

In some embodiments, the techniques described herein may be implemented within the computing environment 100 (e.g., including each of the illustrated components) shown in FIG. 1 by executing processes described below with reference to FIGS. 2 and 3 upon computing devices like those described below with reference to FIG. 4. In some embodiments, computing devices like those described with reference to FIG. 4 may include additional oror other components specific to configurations discussed herein. For example, a mobile computing device 101 may include components similar to those described with reference to FIG. 4 that support the client execution environment 113 and additional components supporting a trusted execution environment 103, which may include a subset of like components (e.g., processor, memory, bus, etc.) configured to perform operations of the trusted execution environment. Similarly, client devices 135, server 145, 155, and repositories 160, 165 may include some additional oror other components than those illustrated in FIG. 4. However, each of these devices may operate in accordance with principles similar to those discussed below and with reference to FIG. 4, such as by loading instructions and other data into a memory and executing those instructions by a processor to perform various operations.

The mobile device 101 may be a mobile computing client device to which a user has access to and may use to authenticate a request to access a secure asset like online resources. Notably, as is often the case, the request to access online resources may not originate from the mobile device 101. Rather, the mobile device 101 serves a client-side role in an out-of-band authentication process for that request to access online resources. By way of example, the request to access online resources may originate from a different client device, such as client device 135. A common context for the above scenario might include an employee using a work or personal computer (e.g., a laptop or desktop computer), represented by client device 135, to request access to online resources (e.g., a web application) hosted on a server by their employer, and using a work or personal mobile device (e.g., a smartphone or tablet), represented by mobile device 101, to provide data used to authenticate the request to access the online resources.

Accordingly, while the mobile device 101 may be any client device, the mobile device may optionally include a trusted execution environment which, in some cases, may be an external, portable device capable of being coupled via a bus, like USB, to any client device including a suitable interface. Example devices including highly portable smartphones and tablet type devices carried by users during their day-to-day activities are common representative embodiments. Moreover, smartphone and tablet type devices, given their portability, are more likely to include integration of trusted execution environments for purposes beyond out-of-band authentication, such as for secure payments, digital currency wallets, and the like. The above should not be construed to rule out other portable mobile computing devices, such as wearables, like watches or bracelets, that as they become more prevalent may be as equally suited as a smartphone or tablet device to collect credentials from users. For example, some of those wearable devices are operable to collect different user credential inputs which may be used for authentication processes. In fact, devices such as wearables, may be suitable to reduce intrusion on users while providing robust out-of-band authentication.

Generally, embodiments of a trusted execution environment 103 may include any isolated execution environment, which may run in parallel with a client execution environment 113 (CEE). Compared to a user-facing client execution environment 113, which may execute the mobile device operating system and most user-facing mobile applications, the trusted execution environment 103 is more secure and may execute a subset of specific applications (e.g., applications, services, oror software modules) on the mobile device, like trusted applications or modules for authentication operations, which may include user authentication, payments, digital rights management, and the like. Some of those authentication operations may be performed in an out-of-band authentication process, such as for granting user access to online resources and other assets, payments, digital rights management, and the like. Additionally, the trusted execution environment 103 may store within oror cryptographically sign data associated with those applications or modules within the trusted execution environment, such as to protect the data from being tampered with, read, oror modified by an unauthorized entity.

In some embodiments, the trusted execution environment 103 may perform one or more operations responsive to requests received at an interface by which one or more applications within a user-facing client execution environment 113 may request data from oror provide data to the trusted execution environment, such as to use one or more of the modules within the trusted execution environment 103 for authentication operations. Thus, in some embodiments, a client execution environment 113 may include an application programming interface (API) by which those requests are communicated from the CEE 113 to the TEE 103, and responses thereto are communicated from the TEE 103 to the CEE 113. In some embodiments, the TEE 103 may include an API like that above for facilitating the above communication of data, or may additionally include another API (e.g., in addition to either aforementioned API) or secure operating system for facilitating communication of data between elements within the TEE 103. Thus, for example, once the TEE 103 receives a request or other data for processing, that data can be processed exclusively within the TEE. The structure of the trusted execution environment 103 may be logical, implemented in hardware, or a mix of both.

Some embodiments of the trusted execution environment 103 may include a TEE co-processor 105 and TEE memory 107, which may be physically separate from the processor 115 and memory 117 of the client execution environment. For example, some implementation of the TEE memory 107 may include a physically distinct memory address bus from the main processor 115, but which is coupled to the TEE co-processor 105 to support secure communications between them. This is not to suggest that both the co-processor 105/processor 115 oror TEE memory 107/memory 117 may not be incorporated in a same package or die or that the co-processor 105 oror TEE memory 107 cannot make use of at least some or all of the capabilities of the processor 115 oror memory 117 in a secure fashion. In some examples, embodiments of the trusted execution environment 103 may include a TEE co-processor 105 oror TEE memory 107 which can be physically separate from but have available the full processing power of the processor 115 oror memory 117 of the client execution environment 113. In some embodiments, the TEE co-processor 105 oror TEE memory 107 are partially or wholly logically separate, such as by way of a reserved or additional processing core oror reserved address space. For example, embodiments of the trusted execution environment 103 may include a TEE co-processor 105 oror TEE memory 107, which are logically separated from the processor 115 and memory 117 of the client execution environment, such as by cryptographic isolation of one or more processes, threads, processing cores, oror address space, or as secure elements within respective components. Within the trusted execution environment 103, the different trusted applications or modules may also be isolated from one another, such as by cryptographic isolation or other software isolation techniques.

Oftentimes, the trusted execution environment 103 includes at least one keyed hardware component. Keyed hardware components can include a unique cryptographic key or keys for isolating trusted applications oror data within the trusted execution environment or to otherwise prevent tampering from the client execution environment 113 or other entity. Keyed hardware components can be substantially tamperproof. For example, the design of the keyed hardware component can be immune to software attacks, and an attacker might have to go to exceptional lengths in physically examining the keyed hardware component (e.g., with highly specialized tools) to even possibly be able to read the key. In some cases, the key may even be stored in a memory configured such that attempts to read the key of the hardware component is destructive to the memory (e.g., causes stored values to change or the memory to change stored values). Thus, under even the most extreme of circumstances, the keyed hardware components can be configured to prevent divulging of their key or keys.

In some embodiments, one or more components operable to solicit credentials from a user may be configured to communicate with the TEE co-processor 105 oror memory 117 in ways similar to those described above to provide enhanced security. For example, one or more of the components operable to solicit credentials may be logically oror physically isolated from the CEE 113 to support secure communications with the TEE 103. For example, one or more of those components may be physically isolated by couplings through a system bus different from a main system bus. The isolation may also be logical, such as by cryptographic isolation, which may use keys associated with those hardware components operable to solicit credentials. Accordingly, data communications by one or more of those components that is secured by one or more cryptographic keys may, in some configurations, logically flow through oror be accessible from the CEE 113 and still be considered isolated as the TEE 103 securely stores a key operable to decrypt the data and that key is not accessible by the CEE 113. As an example, the memory 117 of the TEE 103 may securely store one or more keys operable to decrypt information received from the respective components. In some cases, isolation of one or more components may only be partial, such as where the component also serves a function with the CEE 113. For example, a given component may communicate securely via a separate system bus, cryptographic isolation, or in another secure way (e.g., on a request/response path between the TEE and component) described herein for communications pertaining to the TEE 103 and in an unsecured fashion via a main system bus oror without encryption for communications pertaining to the CEE 113.

In some embodiments, the trusted execution environment 103, with the TEE co-processor 105, may execute a process to generate or otherwise store one or more encryption keys 108, which may include one or more keys from a key-pair, such as a pairing of a private encryption key and a public encryption key. One or more generated keys 108, such as generated private keys, may be protected within the trusted execution environment, such as within the TEE memory 107. For example, generated private keys may be isolated from trusted applications within the trusted execution environment by cryptographic isolation. In some embodiments, generated private keys may be encrypted (e.g., for storage) based a cryptographic key of a hardware component, such as a key of one of the TEE co-processor 105 or component associated with the TEE co-processor 104, so that only the TEE co-processor 105 can use a generated private key. For example, a process of the TEE co-processor 105 may access an encrypted version of the generated private key stored within the TEE memory 107 and then decrypt the encrypted version of the generated private key based on a cryptographic key of the hardware component prior to another process utilizing the private key). In this way, a generated private key may be afforded a substantially similar degree of security as that of a cryptograph key of the hardware component. In other words, a malicious actor must cause the hardware component to divulge a key for decrypting an encrypted version of the generated private key prior to being able to use the generated private key (e.g., for a signature). Similarly, the TEE co-processor 105 may encrypt other data stored within the trusted execution environment, either with a generated key, received key, a cryptographic key of a hardware component, or combination thereof. Likewise, the TEE co-processor 105 may decrypt other data, such by decrypting that data with a generated key, received key, a cryptographic key of a hardware component, or combination thereof (such as in instances where some data is encrypted based on a generated private key and stored subsequent to further encryption based on a cryptographic key of a hardware component).

In some embodiments, the TEE 103 may be configured to isolate different data within the TEE 103. For example, some embodiments of the TEE 103 may encrypt different data (e.g., different keys or other data associated with different applications or modules) based on a function that takes as input a cryptographic key, such as a key 108 in TEE memory 107, (which may be a generated key, hardware key, or other stored key) and a value that is altered for the different data. Alternatively, the cryptographic key itself may differ for different data, for example, a function may take as input a cryptographic key of a hardware component and a value that is altered to generate different cryptographic keys for different data. In turn, a function may use different cryptographic keys to encrypt different data within the TEE 103. The value that is altered may be altered deterministically, selected deterministically, generated randomly, output from a linear shift register, or by other method, and the alteration of the value ensures that one module or application within the TEE 103 cannot use a key or data stored within the TEE memory 107 to which it is not authorized.

In contrast to a generated private key of a key pair, which may be maintained solely within the trusted execution environment 103, a public key of the key pair may be shared by the trusted execution environment 103 with the client execution environment 113. Elements outside the trusted execution environment 103 may use the public key of the key pair to encrypt data, which can then only be decrypted with the private key stored within the TEE 103. Similarly, the TEE may sign results or other data output with a function utilizing a private key of a key pair, stored within the TEE 103, and an element outside the TEE 103 may use a disseminated public key of the key pair to verify the signature, and thus verify that the result or other data output was generated by the TEE 103. Thus, for example, the trusted execution environment 103 may execute a process to sign some data with a private encryption key, and a disseminated public encryption key can used to verify that the trusted execution environment 103 signed the data. In the context of authentication, the data may be a credential value or a cryptographic hash value of the credential value and representative of a user authenticating a request to access online resources.

In some embodiments, the TEE 103 and CEE 113 communicate information by way of one or more application programming interfaces, such as an API 104. Some embodiments of the API 104 are implemented in or by firmware stored to non-volatile memory of the mobile device 101, which can sometimes be a memory space separate from the TEE Memory 107 oror Memory 117 and specify underlying functions available to the CEE 113 for communicating with the TEE 103 (e.g., like a Basic Input/Output System "BIOS"). Some embodiments of the API 104 may include one or more drivers to facilitate communications with hardware components, such as of the CEE 113 oror TEE 103. In some embodiments, the API 104 and drivers may be considered separate, but may be layered, like in a stack, whereby the API 104 provides higher level functions and the drivers facilitate operations associated with those functions. Different configurations may include the example API 104 or other elements supporting API functionality, like drivers, in different locations. Some embodiments may include the API 104 within the CEE 113, within the TEE 103, within an element having a physical interface with the TEE 103 oror CEE 113, in firmware of the mobile device 101 (e.g., in a BIOS), or combination thereof. Some embodiments of the TEE 103 may include a monitor to monitor a system bus for requests from an API 104 (or driver). Oftentimes, the location of the API 104, drivers, oror other elements depends on the physical oror logical structure of the TEE and CEE, which can vary between different implementations. However, regardless of the specific implementation, an API 104 may be configured to provide an interface by which at least some data or results determined within the TEE 103 may be passed to the CEE 113 and by which at least some functions performed within the TEE 103 may be requested by the CEE 113. Further, requests for at least some of those functions may include data or arguments for performing at least some of those functions on the data.

An example API, such as API 104, may be configured to receive requests from elements (e.g., a given application, module or interface) within the CEE 113 and communicate those requests to an appropriate element (e.g., a given application, module, or interface) within the TEE 103. In some embodiments, the API 104 translates a received request from a schema compatible with the CEE 113 to a schema compatible with the TEE 103. In some cases, that may include translating a request in one schema into multiple lower-level requests in another schema. In some embodiments, the API 104 may communicate one or more requests in a schema compatible with the TEE 103 over a system bus, which the TEE 103 may include an interface or monitor to detect those requests for processing within the TEE 103. Example requests may include a request to generate a cryptographic key or key pair, solicit credentials, verify credentials, or otherwise perform a function provided within the TEE 103, such as the various operations of the TEE described herein. In turn, one or more elements within the TEE 103 may process a request and optionally return a result of processing the request to the API 104. In some embodiments, the TEE 103 processes a received request in a schema compatible with the TEE 103 and returns result according to that schema. For example, the TEE 103 may include an interface or monitor to provide results back to the API 104, such as over a system bus. The API 104 may translate results received from the TEE 103 into a schema compatible with the CEE 113. In some cases, that may include receiving multiple results from the TEE 103, some of which may be used in subsequent requests to the TEE 103, prior to returning a result in a schema compatible with the CEE 113 in response to a request received from the CEE. The API 104, in turn, may communicate a result to an element having initiated a request or other specified element.

In some embodiments, one or more elements within the TEE 103 may communicate with one or more elements within the CEE 113 via the API 104 over a secure channel. In some embodiments, the secure channel substantially protects communication sessions between the authentication application 120 and the TEE 103. More specifically, a secure channel prevents other applications, like native applications 125, from accessing data communicated between the authentication application 120 and the TEE 103 in a communication session. In some embodiments, different ones of the native applications 125 may also communication with the TEE 103 over a secure channel such that other applications cannot access the communicated data. In some embodiments, the secure channel extends to communication sessions within the TEE 103. For example, the secure channel may protect communications between a trusted application or module within the TEE 103 and the API 104 such that other trusted applications or modules within the TEE 103 are prevented from accessing data communicated between the authentication application 120 and the trusted application or module which the communication session was established via the API 104.

Cryptographic systems (like those discussed above for encrypting data) generally rely on cryptographic algorithms based on mathematic problems for which there currently exist no efficient solution. The use of asymmetric encryption algorithms, like those utilizing key exchanges, can afford secure communications without requiring a secure channel. One example of such an asymmetric encryption algorithm generates a key-pair for an entity, where a first key of the key-pair is a private key (e.g., held securely by the entity) operable to decrypt data encrypted with a second key of the key-pair and the second key is a public key made available to other entities for encrypting data to be transmitted to the entity having the private key. However, such asymmetric encryption algorithms are computationally intensive and inefficient for high frequency communications oror communications of increasing data size. Thus, in many instances, it is preferable to communicate securely, but also efficiently, such as over a secure channel, using symmetric encryption algorithms that are less computationally intensive than asymmetric ones. The secure channel may be initiated utilizing asymmetric encryption to encrypt and pass an identifier or session key that may subsequently be used as a symmetric key or basis therefor in asymmetric encryption algorithms. In some embodiments, an asymmetric key, like a public key, may be used to encrypt an identifier (e.g., by a first entity). The encrypted identifier, in turn, can be decrypted with a private key (e.g., by a second entity) corresponding to the public key and the second entity may return a secure channel to the first entity for a communication session utilizing a shared (e.g., symmetric) encryption key. Additionally, the secure channel may be bound to the identifier such that keys or data created in sessions over the secure channel are not accessible from other application sessions.

In addition to the trusted execution environment 103, the mobile device 101 includes a client execution environment 113. The client execution environment 113 may include a processer 115 and memory 117 configured to perform operations within the client execution environment. For example, the client execution environment 113 may include an operating system (not shown) and one or more applications. Some of the applications may be native applications 125, which generally, are developed for use on a particular platform or device, such as the mobile device 101. Thus, for example, a native application 125 may be loaded into memory 117 and executed by the processer 115 within the client execution environment 113.

One or more of these native applications 125 may be configured to provide services such as notification services, and optionally generate elements within a user interface on the mobile device 101 in response to the receipt of a notification. In addition, some of these native applications 125 may detect, collect, or otherwise support user inputs, such as a selection of a user interface element, and cause an operation corresponding to the selection. In some cases, a native application 125 may prompt the user to provide a specific input in response to the receipt of a notification. In other cases, a native application 125 may evaluate continuously provided inputs (such as from a biometric sensor) in response to the receipt of a notification. In some example embodiments, a native application 125 may evaluate, prompt, or otherwise obtain multiple different user inputs. In either case, example native applications 125 may interface with (or provide an interface on) one or more different components of the mobile device 101 or communicatively coupled devices, such as fingerprint sensors, image sensors, display of software oror interface with hardware keyboards, etc. as well as other types of components oror biometric sensor devices operable to obtain corresponding user input types. In some embodiments, the TEE 103 may interface via an API with such native applications 135 to securely collect input credentials.

Examples of user input can include selection of one or more characters or digits on a keyboard (e.g., displayed within an interface on a screen of the device or coupled to the device) and receipt of selected characters or digits, which may correspond to a personal identification number, password, or other keyed input. Other similar examples may include input/selection of a pattern or other combination of user interface elements on a screen. Further examples of user input can include selection of a user interface element to capture an external input indicated by the element, such as inputs pertaining to the user, which may include image data from an image sensor or other sensor, like a finger print sensor, or other biometric sensor operable to collect biometric input pertaining to the user when the user interacts with the sensor. User input may not be explicit, but rather involve detection of and capturing the input, such as by requesting the user position their face or component performing facial recognition in a position that enables capture of the input. In some embodiments, a native application 125 may communicate with one or more external devices to capture external input, like a wearable device comprising one or more biometric sensors operable to collect biometric input pertaining to the user when the user interacts with the sensor. In some embodiments, some types of biometric input (e.g., heart rhythm, blood pressure, body temperature, etc.) may be evaluated on a continual basis or for a trailing duration of time from a current time of notification where those biometric inputs may be individually or a collection thereof indicative of a particular user after a sufficient period of time; and other types of biometric input (e.g., facial image, fingerprint, eyeprint, etc.) may be evaluated upon receiving particular sensor input requested from the user that are indicative of a particular user at time of collection.

Some example native applications 125 may interface, via the API 104, with the TEE 103 to securely collect and subsequently store, in the TEE 103, various ones of valid representations of user credentials 109 for authenticating user input received from the various ones of the native applications. In some embodiments, the secure collection includes one or more secure communications between the TEE 103 and a component operable to collect the credential, and that process may be initiated by a native application 125 through a request to the API 104. In turn, a user may establish valid representations of different user credentials 109 when setting up their mobile device 101 upon purchase, activation, or update thereof, such as by inputting a password, setting up a faceprint, fingerprint, eyeprint, etc. or otherwise setting up or permitting different types of credentials for protecting data on the mobile device 101. In many cases, an operating system of the mobile device 101 or various ones of the native applications 125 request that a user input various credentials during set-up the device or upon installation or use of the application. Accordingly, one or more valid representations of user credentials 109 may be established oror updated within the TEE 103. As described above, the user credentials 109 as they pertain to different applications may be isolated within the TEE 103. Thus, storage of a valid credential may be specific to a given application (e.g., by encryption with a key different from other keys for other applications), even where the credential itself may be the same for some other applications.

Similarly, a native application 125 oror operating system of the mobile device 101 may interface, via the API 104, with the TEE 103 to securely authenticate a user based on the user providing input that matches a valid representation of a corresponding credential 109. In some embodiments, the authentication includes one or more secure communications between the TEE 103 and a component operable to collect the credential to receive user input for the credential within the TEE, and that process may be initiated by a native application 125 through a request to the API 104. The received user input may be processed within the TEE 103 for a comparison to a valid representation of the corresponding credential 109 and the native application 125, via the API 104, may receive a result indicating whether the user was authenticated based on the user input. As described above, the user credentials 109 as they pertain to different applications may be isolated within the TEE 103. Thus, authentication of user input with a valid credential may be specific to a given application (e.g., by encryption with a key different from other keys for other applications), even where the credential itself may be the same for some other applications.

In some embodiments, use of one or more of those credentials may be subject to policies implemented by an authorization server 155 providing authentication services oror relying party 145 providing access to secured assets, such as online resources, subject to authentication by the authentication service. For example, the authentication server 155 oror relying party 145 may accept or deny use of the different ones of the user credentials 109 or specify requirements for acceptance of different ones of the user credentials 109 for authentication for different secure assets. As an example, passwords not meeting certain criteria (e.g., length, randomness, number of unique characters, etc.) specified by a policy to access a given secure asset may be denied. As a result, the user may choose to establish new credentials 109 meeting the policy or a different credential 109 (e.g., of a different type) that meets criteria of the policy may be used. In another specific example, a policy for accessing a given secure asset may dictate that facial recognition credentials may be denied for a subset of mobile device 101 models, brands, or operating systems that are determined to provide insufficient results in securing the device against attack methods (e.g., are easily thwarted by a printed picture or model of a user's face). As a result, for users of devices belonging to that subset of mobile devices, different credentials 109 that meet criteria of the policy may be used.

In some embodiments, an example native application 125 provides a native notification service configured to post or store received notifications (e.g., to a location in memory 117) such that other applications may detect receipt of a notification to which that application pertains. For example, a native notification application may post a received notification (e.g., in a location in memory) such that an authentication application 120 may automatically detect and subsequently access the notification. The native application may generate a user interface element alerting the user of receipt of the notification. In turn, selection of the user interface element may call or launch the authentication application 120, which may then access the notification. Alternatively, the authentication application 120 may detect or otherwise receive the notification and generate a user interface element alerting the user of receipt of the notification. Specific implementation may vary depending on mobile device 101 capabilities, such as by operating system version or type, available notification services, and the like.

In some embodiments, a native application 125 providing a notification service, such as Firebase Cloud Messaging service, Apple's push notification service, Google Cloud Messaging, etc., may receive a notification on the service, such as push notification, and post the notification to a location in memory 117. One or more other applications (either within the client execution environment 113 or the trusted execution environment 103) may monitor that location in memory 117 for posted notifications. The one or more applications may be configured to identify posted notification to which they pertain, and in turn, perform one or more actions in response to the notification and any data which the notification includes. In some embodiments, a notification service posts notifications for different ones of the applications to different locations in memory 117, such as to different locations specified for the different ones of the applications or different locations specified by the different ones of the applications. In some embodiments, a notification service, in response to receiving a notification, passes the notification or a location in memory 117 of the notification to the application to which the notification pertains.

In some embodiments, a native application 125, like an authentication application 120, may include a module, like an event handler, configured to provide notification service capability when executed on the mobile device 101. In some embodiments, the module may be provided separately, such as in a lightweight companion application to the authentication application 120, depending on the configuration on the client execution environment 113. In either instance, the module may be configured to provide notification service capability when loaded into memory 117 and executed by the processor 115 as a background service or process within the client execution environment 113. In turn, the module configured to provide notification service capability may receive notifications from the network 121 by subscription of the module oror mobile device 101 to a notification service. For example, the module may monitor a port of the mobile device 101 configured to receive data from the network 121 and identify notifications received at the port, such as based on header information (e.g., sender/recipient information) of one or more data packets containing notification data. In response to identifying a notification, the module may post the notification to a location in memory 117 or otherwise provide the notification to the authentication application 120 by a process like one of the processes described above in terms of a native notification service. Similarly, a native notification service may monitor a port of the mobile device 101 to identify notifications received at the port from the network in a fashion similar to that described above.

Different embodiments may rely on one or more of the different example notification service implementations described herein. For example, in some embodiments, a native notification service executing on the mobile device 101 may receive a push notification pertaining to the authentication application 120 on a notification service to which the mobile device 101 oror notification service are subscribed and post the push notification to a location in memory 117. The authentication application 120 may monitor the location in memory 117 for posted notifications that pertain to the authentication application for and, in turn, access the push notification posted by the notification service. In some embodiments, the authentication application 120 includes a module configured to monitor for posted notifications. In some embodiments, the module may be provided separately, such as in a lightweight companion application to the authentication application 120, depending on the configuration on the client execution environment 113. In either instance, the module may be configured to monitor for posted notifications pertaining to the authentication application 120 when the module is loaded into memory 117 and executed by the processor 115 as a background service or process within the client execution environment 113. In another example, in some embodiments, the native notification service may receive a push notification pertaining to the authentication application 120 on a notification service to which the mobile device 101 oror notification service are subscribed and pass the notification, or information indicative of a location in memory 117 thereof, to the authentication application 120. The authentication application 120, in turn, may receive the notification or retrieve the notification.

Depending on the embodiment, the mobile device 101 may receive push notifications pertaining to an authentication application 120 following one or more of a user's attempt to access a secure asset. For example, a user may attempt to access (e.g., log on to) an internal website by supplying a username (and optionally a password) to that website, access an online or installed application with another device, make a payment with a credit card or other means, attempt a firmware/software update (e.g., code signing), access other accounts and resources (e.g., consumer across banking, finance, shared credential use, etc.), access shared employee solutions like payment portals, stock or other market trading, etc., download a secured file or other data, open a secured program or file therewith, and the like. More generally, a push notification pertaining to the authentication application 120 may be received by the mobile device 101 following a user's attempt to access or modify a secured asset (e.g., an online resource) via a client computing device. Often, such access attempts are performed with a client computing device other than the mobile device 101 and, as such, the notification causes authentication application 120 to prompt the user of the mobile device 101 to provide credentials for out-of-band authentication of the access attempt. Notably, the secured asset need not be an online resource or necessarily correspond to an access attempt from a client computing device different from the mobile device 101. For example, the secured asset may be a secured program or file on either another client computing device or the mobile computing device. In implementations where the secured asset is a resource that may be accessed offline, there may exist a reasonable expectation that devices that typically access the asset include or can obtain network 121 access such that an authenticating entity may be notified of a user's attempt to access the asset, like a secured program of file stored on the device. In some cases, the secured asset may not require authentication upon every access attempt, but rather require authentication when a network connection 121 exists or require authentication after a period of time, like 1-30 days. In the case of a device accessing secured assets that correspond to online resources, e.g., over a network 121, such access is inherent.

The authentication application 120 may be an application, like a native application 125, configured to execute within the CEE 113. The authentication application 120, like other native application applications 125, may be downloaded to the mobile device 101 and subsequently installed, such as by a user of the mobile device 101. Alternatively, the authentication application and one or more other applications, like some other native applications 125, may be preloaded on the mobile device 101 or included in an operating system of the mobile device.

Once installed on the mobile device 101, the authentication application 120 may be loaded into memory 117 and executed by the processor 115 within the client execution environment 113 to perform one or more of the operations described herein. In some embodiments, the authentication application 120, when executed by the processor 115, includes a registration process that is executed to register the authentication application 120 with a server (e.g., server 145 oror server 155). During the registration process, the authentication application 120 may communicate or otherwise establish identifying information about the user and the mobile device 101 with the server. Example communicated information and data may include one or more keys 108, a digital signature of data based on a key 108, cryptographic hashes of credentials 109 or other user or device 101 specific information and data stored within the TEE 103. Example communicated information may also include information about notification services available to the authentication application 120 for receiving notifications pertaining to requests for authentication of a user through the authentication application. Example communicated information may further include one or more preferences or setting pertaining to credentials the mobile device 101 is operable to or configured to obtain (e.g., directly or from a wearable or other device) oror credentials the user is willing to use (e.g., password, faceprint, fingerprint, etc.). Example communicated information may further include policy information governing use of different credentials and properties thereof. Policy information may be stored on the mobile device 101 oror the server. Policy information may be updated for different secured assets.

In some embodiments the authentication application 120 includes one or more modules, such as an event handler, which may be loaded into memory 117 and executed by the processor 115 as a background service. In some embodiments one or more of those modules, such as the event handler, or other functions ascribed to the authentication application 120, may be included in or as separate companion applications that are executed (e.g., as background services) to provide similar functionality.

The authentication application 120, as described above, may be configured to detect or otherwise receive notifications pertaining to a user's attempt to access a secured asset, such as an online resource. In many cases, the access attempt is initiated from a device different from the mobile device 101, such as via a client device 135.

In response to such a notification, the authentication application 120 may be configured to interface with the TEE 103, such as via the API 104. The authentication application 120 may also be configured to interface with one or more native applications 125. For example, the authentication application 120 may query the API 104 or a native application 125 to solicit or otherwise collect a credential input from a user. In turn, the authentication application 120 interfaces with the TEE 103 to obtain a result for the credential input by the user. The credential input, whether biometric, pin, alphanumeric password or other, is processed within the TEE 103 to determine a result. The TEE 103 may process the credential input responsive to one or more requests or commands received from the authentication application 120 via the API 104. to the TEE of the mobile device. In some cases, the result may include an indication of whether the input credential matches a stored valid representation of the credential 109 or does not match the stored credential. If the input credential matches the valid representation within the TEE 103, the result may be cryptographically signed within the TEE 103 and transmitted to the server. In turn, the server may verify the result responsive to the signature indicating the user authenticated with the device 101. In some cases, the result may include a cryptographically signed input credential or hash (which may be a cryptographic hash) thereof for remote matching and verification by the server. For example, the TEE 103 may sign a cryptographic hash of the input credential within the TEE 103. The TEE 103 may output data, such as a representation of the input credential and identifying data for the notification for which the credential was collected, and signed data, where the signed data may be a signature of a data string comprising the input credential and the identifying information for the notification. The server may receive the result and may compare a cryptographically hashed input credential from the output data to a valid representation of the credential, where the valid representation of the credential was hashed with a same cryptographic hash function, in addition to verifying a signature, such as with a public key received in a prior registration process. Thus, the authentication application 120 may transmit a given result received from the TEE 103 to a server in accordance with the different implementations described herein. In cases where the input credential does not match the stored credential, solicitation or collection of credential input may be performed again, as described above. In the case of remote verification failure, a subsequent notification may be received and processed by the authentication application 120.

The authentication application 120 may be configured to establish a session defining a secure channel with the TEE 103 to protect data communications between the authentication application and the TEE. For example, the authentication application 120 may be configured to generate an identifier and provide the identifier to the TEE 103, such as via the API 104. The identifier may be tied to the authentication application 120, determined at random, selected deterministically (e.g., based on a register value, system time, etc.), or a combination thereof, such as concatenation of an identifier tied to the authentication application 120 and a current system time. Further, the identifier may be determined by a processing of the data described above, such as by input of the data into a cryptographic hashing function or key generation algorithm to generate the identifier. In turn, the TEE 103 may return a session bound to the identifier such that other applications cannot access data transmitted between the authentication application 120 and the TEE 103, which can include data created during the session. The data created and transmitted during the session may include one or more keys, results, oror other requests and responses generated during the session. For example, during a session, the user may establish one or more credentials 109 in TEE memory 107 for use with the authentication application 120. The established credentials 109 may include cryptographic hashes or other ciphertext of credential values whether biometric or alphanumeric, such that those representations may be passed to a sever, like authentication server 155, for authentication operations without divulging actual credential values. In addition, or alternatively, the established credentials 109 may include unique signature information from the TEE 103 (such as a public key) that is passed to the authentication server 155 such that signed data (with a corresponding private key) output by the TEE can be verified as originating from the TEE.

The authentication application 120 may receive credentials 116 (e.g., public keys and representations of credentials) like those described above from the TEE 103 for out-of-band authentication operations. Those credentials 116 received by the authentication application 120 may be stored in memory 117 within the CEE 113 and transmitted to a server without divulging actual credential values, as they are representative of credential values protected within the TEE. The authentication application 120 may verify they originated from the TEE (e.g., verification of signed data output by the TEE), and pass the credentials to a server, like the authentication server 155. One or more of the credentials may be passed in a registration process with a server, like authentication server 155, or in response to a received notification. For example, in a registration process, the authentication application 120 may be configured to pass signature information to the server such that received data can be verified as originating from the TEE 103 and one or more representations of credentials for different credential input options may also be passed. During an authentication process, such as in response to receipt of a notification requesting the user to authenticate via one or more different credential input options, the authentication application 120 may pass data and signed data received from the TEE 103 to the server for verification. In some embodiments, the authentication application 120 may request the TEE 103 output signed data with a timestamp oror include identifying information associated with a particular notification such that signed data may be considered valid for a particular notification oror at a particular point in time to prohibit reuse. In other words, the server may check that 1) a timestamp or other identifying information associated with a notification matches a transmitted notification, 2) a representation of a credential in output data matches a stored representation (e.g., one stored by the server during a registration process), and 3) signed data, which may be a signature of an output data string of (1) and (2), e.g., {representation, notification ID oror timestamp}, is verifiable by a public key provided by the TEE during a registration process. The verification process indicating that (1) and (2) were provided by the TEE 103 as only the TEE stores the private key operable to generate signed data verifiable by the data, organized into the string, and the corresponding public key. In some embodiments, the identifying information for a particular notification may include a particular location or address (e.g., IP address and port number, identifier on a notification service, etc.) to which the authentication application 120 should transmit output data and signed data. In some embodiments, the location or address may be specific to the notification and the authentication application 120 may request signed output data including the location or address specified by the notification to further inhibit possible reuse.

In some embodiments, a session received by the authentication application 120 from the TEE 103 may be in a state that requires registration, such as upon initially executing the authentication application as described above, or a state to continue communications. In the state to continue communications, establishment of the secure channel may be predicated upon the user (and optionally the authentication application itself) successfully authenticating based upon past credentials or deterministic values.

In the registration state, the authentication application 120 may be configured to execute a key exchange process with the TEE 103 to initialize a session. For example, the authentication application 120 may provide an identifier to the TEE 103, and the TEE may return a shared key by which the authentication application 120 and TEE 103 can securely exchange data over a channel for the duration of the session. In some embodiments, the shared key generated by the TEE 103 is based on the identifier. The authentication application 120 may be configured to verify that the shared key was generated within the TEE 103, such as by verifying a signature of the TEE. In another example, the authentication application 120 may request a public key of a key pair from the TEE 103. The authentication application 120 may be configured to verify that the public key was generated within the TEE 103, such as by verifying a signature provided by the TEE. In turn, the authentication application 120 may encrypt information with the public key for transmission to the TEE 103. For example, the authentication application 120 may provide the identifier encrypted with the public key in a transmission to the TEE 103, and the identifier may serve as a shared key for encrypted data transmitted during the session. In some embodiments, the identifier may be a public key of a key pair, and the TEE 103 may return a shared key to the authentication application 120, encrypted with the identifier (public key), and the authentication application may decrypt the shared key with the corresponding private key of the key pair to determine the shared key value. The authentication application 120 may determine that any keys or other data received from the TEE 103 were generated within the TEE by the verification of a signature of the data received from the TEE 103. With a shared key established, the authentication application 120 may transmit data to the TEE 103 either by encryption with a public key provided by the TEE 103 or by a shared key.

In some embodiments, the authentication application 120 is configured to interface with the TEE 103 to establish one or more valid credentials 109 for the user within the TEE. The process may occur subsequent to the establishment of a secure channel with the TEE. Some of those credentials 109 may already exist within the TEE 103, such as those previously established by the user, and which the TEE may store for authentication of the user when utilizing the authentication application 120. Those credentials stored for utilization with the authentication application 120 may be encrypted or cryptographically hashed to produce representative values. The representations may even differ for different relying parties utilizing the authentication system. For example, the authentication application 120 may be configured to register for different ones of the relying parties by a process similar to the registration process described above, such as by using different identifiers, and notifications may indicate to which relying party they pertain such that corresponding representations may be requested from the TEE 103 as output. A user may authenticate via input of one or more of the credentials to configure those credentials for use with the authentication application 120. As described previously, the TEE 103 may encrypt representations of those credentials 109 for use in association with the authentication application 120. In some embodiments, different ones of the credentials selected for use in association with the authentication application 120 may be checked against a policy. Credentials not conforming to the policy, whether by strength, length, or security, may be rejected and the use optionally permitted to resubmit credentials for storage within the TEE as applicable. In addition, with a secure channel established with the TEE 103, a user may update one or more credentials. In some embodiments, any updating or establishing of credentials is subject to authentication of the user, such by the user providing one or more input credentials that match valid representations of credentials 109 stored within the TEE 103. For example, in order for the authentication application 120 to instruct the TEE co-processor 105 to execute one or more tasks within the TEE, such as read/write operations within the TEE memory 107, via the API 104, authentication of the user may be required.

In some embodiments, the authentication application 120 is configured to increment a counter associated with communications received from the TEE 103. Specifically, the TEE 103 may provide a counter value that the authentication application 120 must increment and include in a response to or a next communication with the TEE 103 for the TEE to consider the response valid. The TEE 103 may consider the response valid when the incremented count value returned by the authentication application 120 matches an expected value. In addition, for each valid response, the TEE 103 may compare the counter value to a threshold. If the counter value (or a tracked number of increments) exceeds a threshold, the TEE 103 may request the authentication application 120 repeat the previously described key-exchange process to refresh the secure channel and reset the count. In some embodiments, the TEE 103 may refresh the secure channel dependent on whether the user can provide a requested credential that matches a valid representation of credential 109 stored within the TEE, as described above.

The counter value (or values) may be a numerical value or alphanumerical value, like a hash of a numerical value, or some other value. Examples of other values may be a value output by a linear shift register, an identifier of a linear shift register to increment, a location in memory, or other value that may be incremented by the authentication application 120 for a comparison to an expected value, and by which the TEE 103 can track a number of increments performed (e.g., a count). In some embodiments, the incrementing is performed deterministically, for example, the authentication application 120 may increment a counter value provided by the TEE 103 based on a value output from incrementing a given linear shift register or from a provided location in memory. TEE 103 may determine a count from a number of increments (e.g., inputs) provided to a liner shift register or to another functional component (or function) and verify the output value provided by the authentication application 120. Regardless of the specific implementation, verification of the incremented value with an expected value within the TEE 103 ensures that the communication from the authentication application 120 is legitimate and without any attempted injection by an outside actor.

An example client device 135 is illustrated in FIG. 1 and may include access to the network 121. In many instances the network 121 includes the public or private networks and may include the Internet, telephonic data communications, etc., and the example client device 135 is a computing device like a laptop, desktop, or workstation operated with network access in a home, office, or field environment. In some embodiments, an example client device 135 may be a terminal device or otherwise configured to provide a user interface for terminal access to one or more computing devices or virtual machines that may include or provide access to a secure asset or be a secure asset themselves. In some cases, the client device 135 may operate on an internal network (not shown) and may or may not have public network access (e.g., network 121) but include a connection on the internal network to one or more of servers 145, 155 or other server that may have or afford public network access. Some configurations may allow tunneling into an internal network from another network (e.g., a public network) via secure connection such as VPN or other encrypted communication protocol.

In some cases, an example internal network may be wholly internal, such as a private network within a corporation, and supports communications between the client device 135 and server 145 or server 155. Example implementations of the client device 135 in such instances may be a terminal or workstation within a secure environment (e.g., a server room). In such cases, the mobile device 101 may only gain access to that example network while on site (e.g., within range of a wireless connection or while coupled to a wired connection of the internal network) and notifications may be forced to flow through the internal network to afford enhanced security.

Different example client devices 135 may be configured to access different secured assets in a variety of different ways. For example, a client device 135 may attempt to access a secured asset such as an online resource 147 on or via one or more servers 145. In some embodiments, the client device 135 may attempt to access the online resource 147 on or via one or more servers 145 using an application 110 installed to the client device 135. In another example, a client device 135 may attempt to access a secured asset such as an application 110 executed on the client device. In some embodiments, the application 110 may also be configured to access an online resource 147 on or via one or more servers 145.

In association with a given access attempt of a secure asset, a user of the client device 135 may supply credentials 111 for accessing the secured asset. Those credentials 111 may be supplied in different ways, several examples of which are outlined below. In one example, the secure asset is an online resource 147 on or accessible via one or more servers 145. The online resource 147 may be a server hosted application, application programming interface, user account, virtual machine, or other data or interface accessible by the client device 135 via the server 145. In some embodiments, the client device 135 may include an application 110 configured to access the online resource 147. For example, the application 110 may be a web browser configured to request data on and receive data from the server 145 for presentation on a display of the client device 135. Accordingly, the application 110 may be configured to retrieve data from the server 145 and present the data received from the server to the user. In some cases, the server 145 may redirect the application 110 to retrieve some or all data from one or more other servers, like server 155. The retrieved data, when executed or processed, may cause the application 110 to present on the display of the client device 135 a log-in page or other user interface including one or more fields or other user interface elements configured to receive user credential 111 input for accessing the online resource 147. In turn, the application 110 may transmit data corresponding to the credentials 111 input by the user, which may be a user name, password, or selection of one of more user interface elements, to a given server (e.g., at least one of server 145 or server 155) specified in the retrieved data for authentication. In some embodiments, the application 110 may transmit data corresponding to the credentials 111 without direct user input of the credentials, such as where the user has configured the application 110 to populate fields with or automatically submit stored credentials. In some embodiments, when executed or processed, the retrieved data may cause the application 110 to automatically collect or transmit other identifying data corresponding to the user or client device 135 with the credentials 111. For example, the application 110 may collect or generate identifying data about the user-client device 135 combination in the form of cookie, log, token, or other data. In addition, or alternatively, the application 110 may collect identifying data about the user-client device combination, such as by querying the runtime environment on the client device. All or a subset of the above information may be transmitted to one or more of servers 145 or 155.

In another example, the secure asset may be an application 110 executed by the client device 135 and configured to prompt the user to supply credentials 111 when the user attempts to use the application or a feature thereof. Similarly, in another example, the secure asset may be an online resource 147 accessible by the application 110 and the application may be configured to prompt the user to supply credentials 111 in response to the user attempting to use the application 110 to access the protected asset via the server 145. The application 110 may transmit received credentials to the server 145 or server 155 for authentication. In some embodiments, the application 110 and online resource 147 may both be secure assets, and the user may be prompted to provide same or different credentials when attempting to access different secure assets. In some embodiments, the application 110 may be configured to automatically collect or store previously supplied credentials and automatically transmit the collected or previously supplied credentials to the server 145 or server 155 without prompting the user. The application 110 may similarly collect identifying data about the user-client device combination as described previously for transmission to a server.

In some embodiments, a secure session is established between the client device 135 and one or more of server 145 or 155 for the transmitting of credentials or the exchange of user-client device data. The secure session may be HTTP over TLS/SSL, SSH or other secure connection type by which the client device 135 (or applications thereon) can exchange data with a server (or application applications thereon). The secure session may be held open by the server for a pre-configured amount of time (e.g., 1-180 seconds) before timing out to allow enough time for a user to authenticate with the authentication server 155. Once authenticated, the client device 135 may be permitted to access the secure asset. In some embodiments, based on the credentials 111 or user-client device information, a server may generate a token tied to that information and transmit that token to the client device 135. In turn, the client device 135 may present the token within a set period of time (e.g., 10-9999 ms or 1-180 seconds) after authentication to access the secure asset).

Tokening of the client may occur in addition to or separate from the secure session. For example, when attempting to access a secure asset on server 145, the client may 135 may be redirected (e.g., via HTTP request) to establish a secure session with server 155 and provide credentials 111 or user-client device information to the server 155. When the server 155 authenticates the client device 135, it may pass a token in a redirect (e.g., via HTTP request) that directs the client device 135 back to the server 145 to access the asset.

Some embodiments may include a relying party server 145, which may host or otherwise include a secure asset, like an online resource 147, accessible by devices over a network, such as by the client device 135 over the network 121. Examples of online resources 147 may include a user account, web applications, and other data as described herein. The relying party server 145 is configured to provide access to such resources 147 for authenticated users of client devices 135.

In some embodiments of the relying party 145 may include a user identification repository 160, which may store information about users and clients. For example, the UID repository 160 may store identifying information including one or more of user identifiers, device identifiers, identifying tokens for user or devices, locations of devices on a network, and the like. The UID repository 160 may also store associations between one or more identifiers, for example, a user identifier may be associated with one or more device identifiers to which that user is permitted access or otherwise uses to access the server. In some embodiments, the UID repository 160 may further store credentials associated with the identifying information for users and clients, though it need not be required to.

In response to an attempt by a client device 135 to access the relying party server 145 and thus the example online resource 147, the relying party sever 145 may respond in variety of ways. For example, the server 145 may request credential information from the client device 135, such as by directing an application 110 on the client device 135 to a log-in page or other interface for the submission of credentials, requesting the application direct the user to input credentials, requesting the application provide credential information already input by the user, or requesting the application provide identifying information about the client device or user (e.g., cookies, logs, tokens, etc. or values thereof). In some embodiments, the replaying party server 145 may collect information about the user or client device 135, such as a network address, location associated with the network address, information about the application 110 or client device such as version, runtime environment, etc. or other information. Credential information may include a user identifier, such as an email, employee ID, active user account, user name, etc., hash thereof or other identifying information about the user and optionally a password. Information about the client device 135 or application 110 may include a device identifier, which may be a combination or hash of information determined about the client device or application. An example device identifier may account for information such as a MAC address, EMEI number, identifiers of one or more other hardware components of the device, etc., or may include information indicative of the runtime environment like operating system version and type, application version, screen size or resolution, or other factor or combination of factors relatively unique to a given device. Accordingly, the device identifier may serve to accurately identify a given client device from other client devices at least for a relatively long period of time (e.g., hours, days, months, or even the lifetime of the device).

In some embodiments, the relying party server 145 may compare information about or received from the client device 135 with information stored in the UID repository 160 to determine which user or device is attempting to access a given secure asset, such as the online resource 147. For example, the relying party server 145 may identify a user identifier or a device identifier stored within the UID repository 160 corresponding to the access attempt. In response to determining which user or device is attempting to access the secure asset, such as by determining one or more identifiers stored within the UID repository 160 corresponding to the access attempt, the relying party server 145 may transmit information about access attempt to the authentication server 155. The forwarded information may include the one or more identifiers determined from the UID repository 160 to correspond to the access attempt, in addition to information received from, or determined about, the client device 135. In turn, the relying party server 145 may receive an authentication result from the authentication server 155. The authentication result indicates whether the user of the client device 135 successfully authenticated with the authentication server 155 (e.g., via the mobile device 101). Based on the authentication result received from the authentication server 155, the relying party server 145 grants (in response to successful authentication) or denies (in response to unsuccessful authentication) the access attempt by the client device 135. If a result is not received within a threshold period of time, the server 145 may deny the access attempt (e.g., by timing out a connection).

In some embodiments, the relying party server 145 performs one or more preliminary verification tasks prior to passing information about the access attempt to the authentication server 155. For example, the server 145 may determine whether the user or client device is permitted to access the given secure asset. In such cases, the UID repository 160 may store associations between user or device identifiers and different assets to which a user or device is permitted access. In some embodiments, the relying party server 1345 may also determine whether a password or other credential received from the client device 135 matches a corresponding credential stored in association with a user identifier or device identifier within the UID repository 160.

As described above, in response to an attempt by a client device 135 to access the relying party server 145 and thus the example online resource 147, the relying party sever 145 may respond in variety of ways. For example, in some embodiments, the server 145 may pass information received from the client device 135 to the authorization server 155 without performing some or all of the previously described operations within the UID repository 160. In turn, the server 145 may wait for an authentication result from the authentication server 155 and grant or deny the client device access based on the received result or time out the access attempt if not result is received within a threshold amount of time.

In some embodiments, the server 145 may redirect the client device 135 to the authentication server 155. In turn, the server 145 may wait for an authentication result from the authentication server 155 and grant or deny the client device access based on the received result or time out the access attempt if not result is received within a threshold amount of time. In some embodiments, the authentication result may be a token for one or more associated identifiers, and the server 145 may store the token within the UID repository 160 in association with one or more identifiers. One example might be a token and a device identifier for a given device and optionally a user account to which that device identifier corresponds. The token may include an associated timestamp or time-stamps that indicate when the token was created or when it expires. In either instance, the server 145 may determine from a time stamp whether a token associated with a given identifier is inactive or active. In accordance with the above example, the server 145 may receive, from the client device 135 during an access attempt, a token in addition to information previously described. The server 145 may determine, from information stored within the UID repository 160 in response to receiving a token from the client device 135, whether the received token matches a valid token received from the authentication server 155. The server 145 may also determine, from an association between the valid token and an identifier within the UID repository 160, whether information received from or determined about the client device corresponds to the identifier stored within the UID repository 160. For example, the authentication server 155 may be configured to cryptographically hash a specific set (and optionally order) of determinable information received from or about the client device 135 to create an identifier. Similarly, the relying party server 145 may be configured to execute a process in a similar manner to determine an identifier for a client device attempting to access a secured asset. As the identifier can uniquely identify the client device 135 from other client devices, the relying party server 145 can determine to grant the client device 135 access if the token presented by the client device matches a valid token in the repository 160 and an identifier determined for the client device matches the identifier associated with the valid token in the repository 160.

The set of determinable data and order of the determinable data used to create an identifier may be held secret by the relying party 155 and the authentication server 155 and optionally may change over time or be based on a function dependent on one or more determinable factors. Accordingly, the authorization server 155 may push information about valid tokens and associated identifiers to the relying party server 145 for authenticated clients such that the relying party server 145 may quickly determine whether a client device is permitted to access a given secure asset. For example, a function in a process for creating an identifier may use one or more token values as input to determine the set and order of data of determinable data to cryptographically hash for an identifier.

Thus, as described above, the relying party 145 relies on the authentication server 155 to perform one or more operations in the authentication process, and permits or denies a client device 135 access to a secure asset, such as online resource 147, in response to authentication results received from the authentication server 155. Operations of the authentication server 155 are described in more detail below.

The authentication server 155 performs operations to authenticate users and provides authentication results that indicate whether a user was authenticated. The authentication results may be used by other parties, such as a relying party 145, to determine whether a given client device 135 should be granted or denied access to a secure asset. User authentication operations performed by the authentication server 155 may be performed out-of-band from attempts by client devices 135 to access secure assets. Namely, user authentication operations may involve a device different from the client device 135, such as a mobile device 101.

The mobile device 101, as described previously, is typically a device under control of the user the authentication server 155 seeks to authenticate and is operable to store credentials specific to that user in a secure fashion. For example, the mobile device 101 may include a TEE 103 to store credentials 109 in a secure fashion. Further, the TEE 103 may be operable to generate representations of credential values such that those representations can be passed by the TEE to the CEE 113, and by the CEE 113 to the authentication server 155 without divulging actual credential values. In some embodiments, the representations of credential values may be refreshed or updated within the TEE 103 without requiring a change in credential values. For example, representations of credential values may be dependent on one or more key values or function values used as input in a cryptographic hashing function or encryption algorithm to generate the representations. In turn, the key values or function values may be updated within the TEE 103 to generated refreshed representations, rather than requiring a user to provide a new credential values, which is particularly beneficial in instances where a user may be unable to change a credential value (e.g., for a specific biometric input). As a result, the authentication server 155 receives and stores only the representations of credential values and any data breach cannot disclose user specific credential values. Moreover, in response to any data breach, divulged representations of credential values may simply be discarded and replaced with refreshed or updated representations of credential values. Thus, attackers are limited to targeting individual users. However, in order to ascertain credential values for an individual user, an attacker would need to breach the TEE 103 of the mobile device 101 storing those values. Such a process is time consuming, rarely successful, and would require physical access to a device of the individual storing credential values. Furthermore, because representations are used for user authentication, even if an attacker was successful in obtaining credential values from the TEE of a device, they would only be operable if the attacker knew the current schema for generating a representation thereof after a user reports the device missing or stolen. The end result in view of these mounting difficulties for would be attackers is a highly secure authentication system that mitigates the effectiveness of both specific user targeted and wide scale attacks.

The authentication server 155 may store data for authentication operations in an authorization repository 165. The authorization repository 165 may include a vast number of UID Records 151. A UID Record 151 may include information associated with a particular user and the devices associated with that user. In some embodiments, a UID Record 151 for a particular user may be created for a particular relying party or used across multiple relying parties. For example, a given user may have a different UID Record 151 associated with the different relying parties utilizing the authentication system and which the user engages. One relying party may be an employer of the user, another relying party may be a financial institution used by the user, and yet another relying party may be an application developer from which the user has purchased an application for personal use. The different UID Records for a same user may have some same information, such as if the user uses the same mobile device 101 for authentication with each party, device information for the mobile device 101 may remain the same across the different UID Records. However, the different UID Records for different relying parties may be segmented within the repository 165 for a variety of different reasons, such as compliance with relying party requirements, government regulations, or user privacy in general.

Information associated with a particular user in a UID Record 151 may include one or more user identifiers that user uses with a relying party, such as a username, email address, employee ID, etc. The user identifiers may also be representations of user identifies, such as cryptographic hashes of user identifiers, and the cryptographic hashing function may be specific to a given relying party. UID Records 151 may be created by the authorization server 155 when a given user elects to use an authentication application for user authentication to access assets of the relying party. Alternatively, UID Records 151 may be created by the authentication server 155 upon request by a relying party. The request may include user provided account information for generation of a UID Record. In some embodiments, the authentication server 155 may handle user registration for the relying party and receive and process some or all of the user provided information directly to generate a UID Record 151 for the user. A relying party administrator may also provide or otherwise create specified account information for generation of a UID Record, such as when an administrator of the relying party creates an employee account.

The UID Record 151 may include a plurality of constituent device records for devices associated with that user that may be used for authentication or accessing a secure asset. For example, a user having UID record 151 may use a device A for user authentication and a device B for accessing secure assets of a relying party.

By way of example, Device A record may be mobile device 101 registered with the authorization server 155 for user authentication to access secure assets of the relying party. During a registration process, such as one performed through an authentication application 120, initial information about the mobile device 101 may be collected and stored within the device A record. The initial information may include information operable to identify the device and transmit notifications to the device. In some cases, that identifier may be used by the authentication server 155 to transmit notifications. Some of the information about the mobile device 101 may also be updated over time based on information about the device provided to the authentication server 155 by the authentication application 120 on the mobile device. The Device A record for the mobile device 101 may also contrail the out-of-band credentials A for authentication of a user of the mobile device. For example, the OoB Credentials A may include representations of various different credentials provided in a registration process of Device A and a public key for verifying signed data received from Device A.

Device B record may correspond to a client device 135 used by the user. Depending on the relying party, there may be multiple device records corresponding to different client devices used by the user over time. Client devices need not be registered, and records for client devices may be created over time as a user uses different client devices to access secure assets. However, in some cases, the client device 135 may optionally be registered with the authorization server 155 for use by a particular user or to access secure assets of the relying party. A Device B record for a client device like client device 135 may contain an identifier or other identifying information for the device and optionally credentials B, where those credentials may be in-band credentials (e.g., account/password/token, etc.) for applicable embodiments. Some of those in-band credentials may alternatively be stored under the UID Record 151 for client devices 135 in general rather than for a specific client device. However, some credentials may be preferable to store in a device specific fashion, such as which device is currently using a given license (e.g., a product key) for some secure asset.

In some embodiments, permissions may be specified for a UID Record 151 or for a given device. Permissions for a UID Record 151, generally, may define which assets the user (associated with the UID Record) may access and how the user may access those assets. Permission for a client device (e.g., one registered by an administrator associated with the relying party), generally, may define which users may access the device and optionally what assets that device is permitted to access, which may differ from assets the user (associated with the UID Record 151 of the user utilizing the device) is permitted to access.

For example, in a business environment context, the client device 135 may be assigned to a particular employee by an administrator of the relying party and Device B record may be stored under the UID Record of the employee. In some embodiments, an administrator may register the client device with specific permissions to restrict use to a specified subset of users or such that only registered devices may access secure assets.

In another example context, the relying party (e.g., globally or per secure asset) may specify permissions governing amounts or types of devices allowed under a UID Record 151. As described above, the UID Record 151 may contain a user identifier tied to a particular user/account. When a given client device (e.g., client device 135) attempts to access a secure asset in association with that user identifier, the authentication server 155 may create a device record (e.g., Device B) corresponding to the given client device under the UID Record 151 for that user identifier. Permissions may specify a number of client devices which may be active under a given UID Record 151, such as to restrict use of a secure asset to a given number of devices overall, or to restrict use of a secure asset to a given number of devices at a particular time. For example, if the protected asset is a web application, permissions may be a license agreement that prohibits the use of multiple client devices (or over a threshold number of client devices) at the same time under a same UID Record 151. Similarly, if the protected asset is an application installed to a client device, permissions may be a license agreement restricting use and installation of the application to a single client. Tracking client devices in this manner may also be used for security purposes, such as to detect when an unknown or new client device attempts to access an asset or if multiple unknown or new client devices attempt to access an asset, and whether or not those access attempts are successful. For example, which devices are authenticated by which credential provided by the mobile device 101 may be tracked and additional or multiple credentials may be requested for new or additional client devices attempting to access a same asset.

Some or all of the information stored within the UID repository 160 or representations thereof may be stored within the authorization repository 165 in UID Records 151. In some embodiments, the auth repository 165 is also configured to store data to perform one or more of the functions ascribed the UID repository 160. For example, rather than the relying party server 145 use the UID repository 160, it may instead use the auth repository 165. In such a configuration, the auth repository 165 may be configured to respond to queries to return, store, or otherwise provide data in a similar fashion as the UID repository 160. The data structure of the auth repository 165 may differ from that of the UID repository 160, but one or more queries received at the auth repository 165 from the relying party server 145 may be operable to return and store similar data from the data structure of the auth repository 165. Benefits of such configurations may reduce overhead for relying parties 145 as they can significantly offload authentication burden and reduce storage of user specific data in addition to increasing security. For example, in the previously described example utilizing tokens, the process may continue in much of the same fashion, but rather than the relying party server 145 determining whether the token-identifier combination corresponds to an authenticated client, the relying party server 145 need only query the auth repository 165 or the authentication server 155 with the token, identifier, or information on used for the identifier. In an example embodiment, the relying party server 145 may query the auth repository 165 with a token and an identifier determined for the client device that presented the token and the auth repository may provide an authentication result. In some example embodiments, the queries may flow through the authentication server 155 such that, for example, the authentication server 155 may process the information to determine the identifier (e.g., such that only the authentication server 155 houses the logic for the determination) and return a result.

Figure 2:
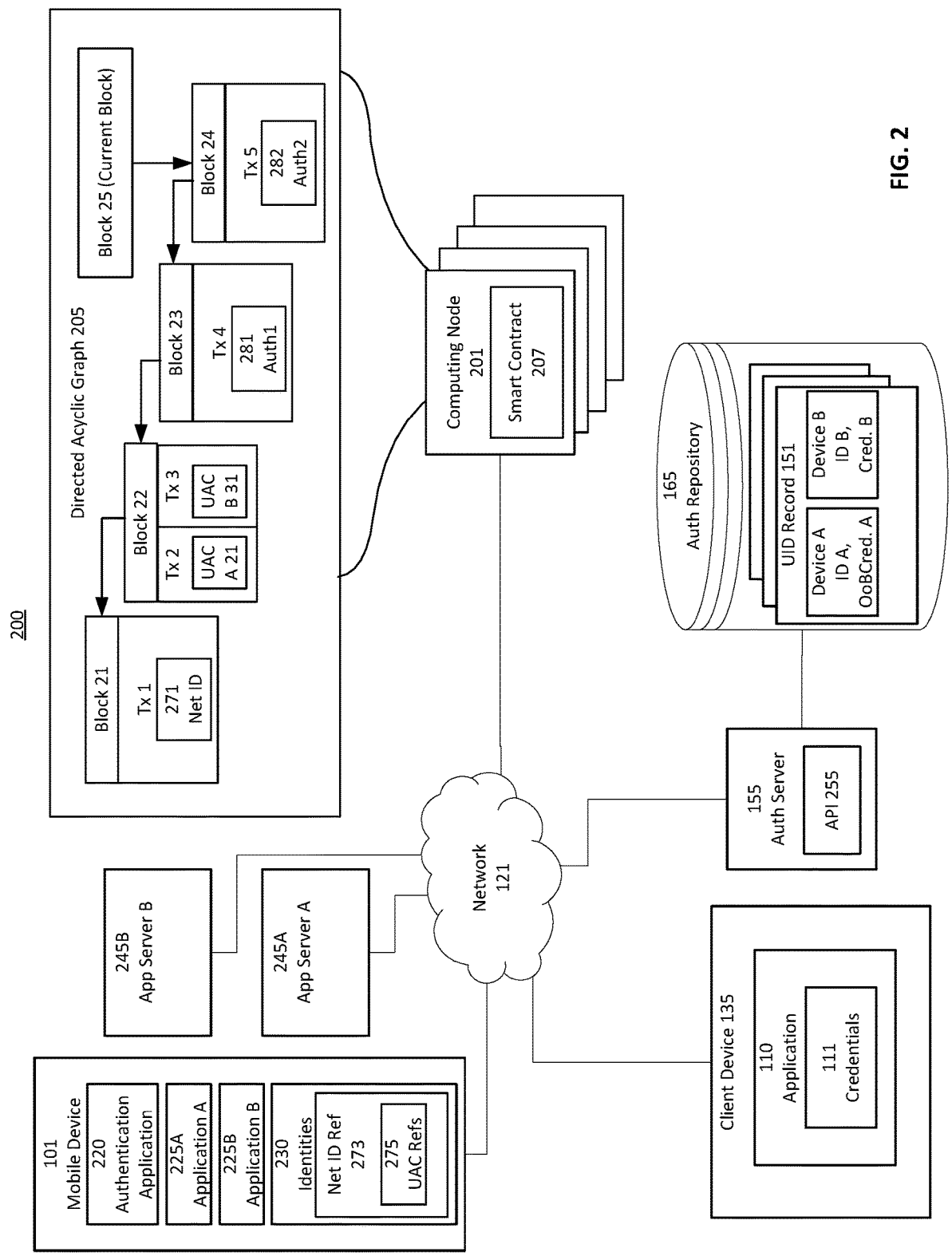
FIG. 2 is a block diagram showing an example of a computing environment by which the present techniques for identity management on a decentralized computing platform may be implemented.

FIG. 2 illustrates an example computing environment 200 within which an identity management system may be implemented. The computing environment 200 may include a computing platform by which the identity management system may be implemented. In some embodiments, the identity management system manages federated identities. In some embodiments, the identity management system implements zero-knowledge authentication credentials within a decentralized computing platform. In some embodiments, the identity management system supports authentication for federated identities within a decentralized physical computing architecture or platform. In some embodiments, out-of-band authentication is supported for established identities and federated identities. In some embodiments, the identity management system manages payments or physical access, each of which may be authenticated based on credentials stored within a decentralized computing platform. Thus, example embodiments of the identity management system within the computing environment 200 may incorporate or otherwise use various ones of the principles and processes described herein with respect to user authentication and out-of-band authentication techniques of FIG. 1, which may include but is not limited to the establishment of zero-knowledge credentials, authentication of user to use a secure asset, like an identity, and the like. Moreover, those principles and processes may confer similar benefits when so incorporated within the identity management system.

As noted above, the computing platform on which the identify management system is implemented may include a decentralized computing platform. The decentralized computing platform may be a blockchain-based computing platform. The decentralized computing platform, when implemented, such as within the example computing environment 200, may have a distributed and decentralized physical computing architecture. The computing platform may include some or all of the aforementioned aspects and is described in greater detail below.

Within the computing environment 200 of FIG. 2 various entities are depicted and those various entities may interact within the computing environment in at least some example embodiments. For example, FIG. 2 depicts a mobile device 101, client device 135, application servers 245, and authentication server 155. Over the example computing environment 100 of FIG. 1, the computing environment 200 includes a plurality of computing nodes 201 of a decentralized physical computing architecture or platform. These example entities may communicate amongst each other and with other entities, and those communications may occur directly or indirectly over the network 121 through the exchange of data (e.g., by way of one or more requests and responses on various protocols over the network). For example, servers 245 or 155 may communicate with a computing node 201 and one or more other entities over the network 121 to perform operations to determine, store, or receive results within the identity management system. Similarly, a computing node 201 may communicate with one or more other computing nodes and one or more other entities over the network 121 to also perform operations within the identity management system, and so forth for the other illustrated entities. In some embodiments, the network 121 includes the public Internet and a plurality of different local area networks.

In accordance with at least some embodiments, the computing environment 200 includes a plurality of computing nodes 201 of a blockchain-based computing platform. In some embodiments, an authority, like the entity operating the authentication server 155, may operate some or all of the computing nodes 201. For example, in some embodiments the identity management system may be a private identity management system implemented by a company and used by employees to access internal company assets and resources. Alternatively, in some embodiments, the identity management system may be an identity management system offered as a service, such as by an authority operating the authentication server 155, to multiple companies. In either instance, a company may use the service for private identity management (e.g., for managing employee access to internal company assets and resources) or for public identity management (e.g., for managing customer access to external company assets and resources or authentication operations).

A given entity within the computing environment 200 need not be required to communicate with each other entity. For example, applications servers 245A, 245B need not communicate with each other or even a same computing node 201, and not all computing nodes may communicate directly with each other but rather indirectly by communicating with at least some other computing nodes. In some embodiments, one or more of servers 245, 155 may operate as computing nodes 201 or include at least some computing node functionality. In some embodiments, a collection of computing nodes 201 may include one or more servers of parties that participate in the identity management system, like parties managing application servers 245A, 245B. For example, a party A managing application server 245A may configure application server 245A with computing node functionality or instantiate another server with computing node functionality. Further, one or more of the computing nodes 201 may include various servers, like authentication server 155, or otherwise instantiated by a similar entity (e.g., an entity having at least some role in instantiating, managing, or otherwise participating in the identity management system). Thus, in some embodiments, the authority may operate one or more computing nodes 201 and a company utilizing identity management service may also operate one or more computing nodes 201.

Depending on the embodiment, such as according to the various configurations outlined above, the entity having instantiated and managing the identity management system (e.g., the entity managing the authentication server 155) may exert a varying degree of control over the distributed and decentralized nature of the identity management system. For example, some functionality may be reserved for the authentication server 155, such as publication of an authorized user identity record for a user or addition/removal of keys, accounts, users or credentials under a user's user identity record. Other functionality may not be reserved, such as authentication of a user to a user identity, thereby allowing that user to access an online resource. In some embodiments, functions are performed, based at least in part, on one or more transactions committed to a decentralized data store. Some functions may include a transaction storing data to a transaction record within the decentralized data store (and the stored data may be based in part on one or more prior transaction records), some functions may include accessing one or more transaction records within the decentralized data store to determine a result based on the accessed transaction records, and some functions may include a transaction storing data based on the result to the decentralized data store (and the stored data may be based in part on one or more prior transaction records). Some functionality may be governed by one or more smart contracts 207 residing on the computing nodes 201. For example, a smart contract 207 may specify a schema by which entities may perform one or more functions within the decentralized data store. Thus, example embodiments of the identity management system within the computing environment 200 may incorporate or otherwise use various ones of the principles and processes described herein with respect to user authentication and out-of-band authentication techniques of FIG. 1 and those principles and processes may confer similar benefits when so incorporated within the identity management system. For example, one or more authentication functions for in-band or out-of-band authentication may be implemented via an executable smart contract 207, authentication server 155, or other entity (e.g., a corresponding application server 245) and operate on data stored within the decentralized data store (e.g., rather than in some other data repository, although that is not to suggest that one or more repositories may not be operated in parallel and retain some data exclusively or redundantly).

As described above, the decentralized physical computing architecture or platform of the computing environment 200 may include a decentralized data store, which may be a blockchain-based decentralized data store. For example, FIG. 2 illustrates an example of a decentralized data store as a directed acyclic graph 205. The example directed acyclic graph 205 may include a number of blocks, e.g., blocks 21-25, where each next block references a prior block so as to form a chain of blocks or "blockchain." Each block may include a number of transaction records. Although not shown, transaction records within a block may be stored within one or more nodes. Conceptually, those nodes storing transaction records may be visualized as leaf nodes within a tree-like structure, like a binary tree, or binary Merkle tree, having a root node and a plurality of intermediate parent nodes, whereby each leaf node may be referenced to the root node via a plurality of references through intermediate parent nodes. In some embodiments, references are pointers indicative of a location of some data stored within the decentralized data store. In some embodiments, references are associated with a hash, like a cryptographic hash, based on previously stored data to afford a tamper-evident storage scheme. In some embodiments, references are hash pointers, which may be cryptographic hash pointers, and the references themselves may afford a temper-evident storage scheme. Examples are discussed in greater detail below.

In some embodiments, the computing node 201 is a computing node of a decentralized computing platform comprising many computing nodes. While only one computing node 201 is shown in detail, embodiments may include many more computing nodes, for instance, numbering in the dozens, hundreds, or thousands or more. In some embodiments, one or more of the computing nodes 201 may be rack-mounted computing devices in a data center, for instance, in a public or private cloud data center. In some embodiments, various ones of the computing nodes 201 may be geographically remote from one another, for instance, in different data centers. In some embodiments, personal computing devices, whether a mobile computing device, client, or server device in user homes, may also function as computing nodes. Thus, in some embodiments, the computing platform that the computing nodes instantiate may be relatively to very decentralized where at least some of the computing nodes are operated by various different parties and may also perform other functions for various different purposes. For example, although only two application servers 245A and 245B and one authentication server 155 are shown, 10's, 100's, or 1000's of other parties may operate other application servers or different servers for different purposes, and those servers may number in the 10's, 100's, or 1000's and be geographically distributed along with computing nodes operated by those parties. However, that is not to say that in some embodiments a computing node 201 or nodes may be collocated (or in some cases, all be deployed within a single computer cluster).

In example embodiments where computing nodes 201 are part of a decentralized computing platform comprising many computing nodes it should be recognized that a computing device participating within the identity management system need not communicate with any one specific node. Rather, each may communicate with a different one/multiple of the computing nodes of the decentralized computing platform and also may communicate with different ones of the nodes at different times. Further, in some embodiments, one or more of the application servers 245 or authentication server 155 may be a computing node or incorporate all or some computing node functionality, thereby operating as part of the decentralized computing platform or configured to communicate with at least some of the nodes (e.g., to submit or retrieve data, not substantially process data).

In some embodiments, computing nodes, like example computing node 201, may operate upon various types of information stored within the decentralized data store of the computing platform. Examples include a directed acyclic graph 205 of cryptographic hash pointers, such as a blockchain or other tamper-evident, immutable, decentralized data stores. Other examples include various scripts in a scripting language executable by the computing node 201, for instance with verifiable computing, such that no single computing node 201 needs to be trusted. In some embodiments, these scripts or programs may be referred to as smart contracts 207, a term which should not be confused with a contract or agreement in law, finance, or other similar instrument. Rather, smart contracts 207 refer to programs executable by computing nodes to perform one or more functions within decentralized computing platform in a consistent manner, and those programs in some cases may be tamper-evident, immutable decentralized programs. As a result, a given smart contract may be executed by any one computing node and execution of that smart contract should provide a same result for given inputs as some other computing node (and thus, in some embodiments, affording verification of that result by one or more (e.g., in a consensus) of the other computing nodes). For example, a smart contract 207 may be stored within the decentralized data store, loaded by a computing node 201 into a memory of the computing node, and executed to perform one or more functions according to the script or program defined by the smart contract. For example, the authentication server 155 may publish a smart contract 207 to the computing platform such that computing node 201 (or other nodes) may process information stored in the directed acyclic graph 205, or other information, to perform one or more functions according to one or more operations enumerated in the smart contract.

In a more specific example, the authentication server 155 may publish a smart contract 207 by which a computing node 201 may execute a process to authenticate a user based in part on information stored within the decentralized data store, and the result of the authentication may govern whether a given action requested by the user (e.g., to log-in to an account, access a resource, make a payment, etc., as described herein) is permitted within the computing platform. A smart contract 207 can be a contract in the sense that the logic of the smart contract is immutable in some implementations once stored within the decentralized data store or loaded to the decentralized computing platform and thus serves as a form of a commitment to a particular body of logic.

The term "immutable" should not be read to require that immutable data be written to a form of physical media that prevents subsequent writes (e.g., a ROM or write-once optical media). Rather, the term "immutable" refers to a data structure that does not support modifications to data once written. In some cases, this feature is afforded by making the data structure tamper evident, e.g., computationally infeasible to modify committed data without rendering the data structure internally inconsistent. In some cases, the data structure computational infeasibility of undetectable modifications may be afforded by chaining the above-described cryptographic hash values, such that verification of tampering consumes less than $100,000^{th}$ of the computing resources (e.g., in time or memory complexity) of computing resources needed to modify the data structure to be consistent with a modified previously written record.

In some embodiments, a smart contract such as smart contract 207 may be stored in the directed acyclic graph 205 or otherwise published to the decentralized data store, or in some cases, the smart contracts may be stored in a different tamper-evident, immutable, decentralized data store from that of the data upon which the smart contracts operate. One example smart contract 207 is shown, but it should be emphasized that there may be, and in some commercial implementations likely will be, multiple instances smart contracts with variations to implement new or different logic. For example, different smart contracts may be configured to perform different functions or similar functions based on different criteria, which may be specific to a given party participating within the system. In a specific example, a party A might authenticate a user based on different criteria than a party B, and those authentication processes may be enumerated in different smart contracts. However, that is not to say a smart contract cannot include logic to accommodate those different criteria. For example, in some cases, the smart contracts may be composed of or reference other smart contracts or invoke or draw upon logic implemented outside of the decentralized computing platform. For example, a smart contract for performing a process like that in FIG. 3B (e.g., for authentication of a user) may in some instances call to another smart contract to perform a process like that in FIG. 6 (e.g., for authentication of a user based on records or verification of authentication as publishing of a record of that authentication). Similarly, a smart contract or contracts may perform processes like those described in FIGS. 3, 5, and 6 and implement other processes (e.g., like one or more processed performed by a server) discussed with reference to FIG. 1 or 2. Some smart contracts may interface with the outside world relative to the decentralized computing platform, such as via authentication server 155 or other entity specified in the contract.

In some embodiments, smart contracts, like smart contract 207, may be callable by the various entities within the computing environment 200. Additionally, an entity, like the authentication server 155, may publish new smart contracts callable by the authentication servicer or other entities (e.g., application servers 245). For example, the authentication server 155, application servers 245 or other servers operated by additional parties participating in the identity management system in commercial scale embodiments, may execute a peer client application of the decentralized computing platform or otherwise send messages to application program interfaces for performing operations within the decentralized computing platform to call the smart contracts and receive results. In some embodiments, the smart contracts may have an address, for instance, in a data storage address space of the decentralized computing platform, like an address corresponding to a cryptographic hash of program code of the smart contracts. In some embodiments, the smart contracts may accept arguments, such as various variables or criteria that may be passed to the smart contract and which may be operated upon by logic of the smart contract. Examples of arguments and their variables may include references, like an address, to data within the decentralized computing platform, data for storage within the decentralized computing platform, or other criteria described herein for determining a result. In some cases, each smart contract may have a respective application program interface (API) with a schema defined in the corresponding smart contract that enumerates arguments that are required, arguments that are optional, default values for arguments, types of those arguments, and the like. Such smart contracts may be implemented on computing nodes 207 participating on a protocol corresponding to the decentralized data store, such as an Ethereum blockchain protocol for an Ethereum based blockchain data store.

In some embodiments, an address of a smart contract 207 may be called with an API call (i.e., a request) including request parameters such as the address and one or more values for arguments defined in the schema of the smart contract. In some embodiments, the smart contract may respond to the API call by executing a process to perform a function within the identity management system, and the function may include storing a transaction record on the blockchain that records the request or results to the blockchain. This, in some cases, may include calculating a cryptographic hash value (or values) based on the request or the results and a cryptographic hash value of one or more other transaction records in the blockchain by which the results were determined. In some cases, a new entry (e.g., a new transaction record) created by the smart contract 207 may include this cryptographic hash value and pointers to those other nodes. In some cases, such as for the other transactions records in the blockchain by which the results were determined, the transaction record may include in association with the cryptographic hash value or pointer an indication of which arguments or other criteria were satisfied according to that transaction record to arrive at the results.

In some embodiments, a plurality of the computing nodes (which may include at least a majority of the computing nodes) executing a decentralized application implementing the block chain may execute a routine specified by the smart contract, and some embodiments may implement a consensus algorithm among those computing nodes, like Paxos or Raft, to reach a consensus as to a result of executing the smart contract. The result may be stored in the block chain and this process may be repeated for subsequent requests process by the smart contract. Some embodiments may interrogate these records, and those functions may also be enumerated in smart contracts. For example, one smart contract may perform the function of creating records of user identities within the identity management system. Another smart contract may perform the function of creating records that associate accounts of a user with a user identity within the identity management system. Another smart contract may authenticate a user as the owner of an identity and call another smart contract or include operations to authenticate that user to access to an account associated with that user identity based on a verification of those records (e.g., by recreating the calculation of the cryptographic hash values along each link in a chain of cryptographic hash pointers and comparing the recalculated values to the values in the chain to confirm (in virtue of matches) that the records are authentic). In some embodiments, the smart contract may store a record of the results of the authentication based on the successful verification to the blockchain. In turn, in some embodiments, the record of the authentication may be referenced in a subsequent authentication request to reduce friction on the user. These, and other configurations of smart contracts within the identity management system, are discussed in greater detail below.

In some embodiments, the directed acyclic graph 205 comprises cryptographic hash pointers to provide a tamper-evident, immutable, decentralized data store to which the smart contracts are stored and to which transaction records accessed by the smart contracts are stored, which in some cases may include results determined by the smart contracts as well as requests and their arguments to the smart contracts. In some embodiments, storing a transaction or smart contract to the directed acyclic graph 205 may include storing a record all of the information of that transaction or smart contract (e.g., the program code of the logic of the smart contract that is executed by the computing nodes 201 (e.g., in a virtual-machine) of the decentralized computing platform corresponding to a target of byte code into which smart contracts are interpreted) in content of nodes (e.g., a node in a tree of nodes, like a Merkle tree, and a given tree may be stored in a block) of the directed acyclic graph of cryptographic hash pointers. Cryptographic hash pointers pointing to those nodes include cryptographic hash values (as part of node content of the node that is pointing) that are based on node content (of the node to which is pointed) that includes the record of stored information (e.g., transaction information or smart contract information), thereby defining a chain of cryptographic hash pointers that becomes increasingly computationally expensive to modify (while remaining internally consistent) in the event of attempted tampering as the chain increases in length or tree increases in size. In some embodiments, a plurality of different directed acyclic graphs of cryptographic hash pointers may store different subsets of the information, may store replicated instances of the information, or in some cases a single directed acyclic graph of cryptographic hash pointers may store all of this information. In some cases, the directed acyclic graph is a sub-graph of a larger graph with a cycle, and in some cases the directed acyclic graph includes unconnected subgraphs. For example, different types of transactions or smart contracts may be stored in different sub-graphs of the directed acyclic graph.

In some embodiments, recording of information like a transaction to the directed acyclic graph 205 of cryptographic hash pointers is achieved by storing a cryptographic hash digest of the information in node content of the directed acyclic graph of cryptographic hash pointers. The cryptographic hashes in the hash digest may be operable to identify (e.g., other transactions in other nodes by cryptographic hash pointer) or verify information (e.g., on-chain or off-chain information by cryptographic hash) associated with the transaction. In some embodiments, node content may be a transaction for storing data, like a sstore or Txdata function, which may also include transaction fees for the transaction to store the data. In some embodiments, recording of information like a smart contract to the directed acyclic graph 205 of cryptographic hash pointers is achieved by storing the smart contract in node content of the directed acyclic graph of cryptographic of hash pointer by a transaction for storing data, like a sstore or Txdata function. In some embodiments, a cryptographic hash digest of the smart contract is stored in node content, where the cryptographic hash digest may include cryptographic hashes operable to identify previous versions of the smart contract (e.g., stored in other nodes by cryptographic hash pointer), identify other smart contracts to be called during execution of the smart contract (e.g., stored in other nodes by cryptographic hash pointer), or verify information (e.g., on-chain or off-chain information by cryptographic hash) such that the smart contract or other information access by the smart contract whether stored on-chain or off-chain can verified by the cryptographic hash digest.

In some embodiments, a transaction for data storage may include representations of credentials, public keys, user account identifiers, or other information stored outside of the directed acyclic graph 205 of cryptographic hash pointers. In some embodiments, a public key may be considered a representation of a credential (e.g., a private key) because it is representative of some other knowledge (the private key) held in confidence by a user or entity without being exposed. Rather, signed data is exposed for signature verification as proof that the user or entity has access to the private key. In some embodiments, a public key may be a user account identifier or an identifier of an entity, as that public key corresponds to a private key retained by a given user or entity. Representations of some or all of that data may be cryptographic hashes included in a hash digest. For example, values corresponding to the above data may be cryptographically hashed (e.g., by execution of a smart contract for performing the function of storing that data) and stored in the hash digest. Some or all of that data may also be stored directly, as some or all of that data may be cryptographically hashed, encrypted or otherwise determined (e.g., by a mobile device, such as within a trusted execution environment of the mobile device, application server 245, or authentication server 155) prior to input (e.g., as a value or values of an argument) for a smart contract. Those cryptographic hash values (or other hash digest) may be stored as node content of the directed acyclic graph 205 of cryptographic hash pointers. The information stored outside of the graph 205 may then be verified as having been untampered with or authenticated by recalculating the cryptographic hash value based on the asserted address, time, and transaction information and comparing the recalculated cryptographic hash value to the cryptographic hash value stored by the transaction in the directed acyclic graph of cryptographic hash pointers. Upon determining that the hash values match, the credentials, user account identifiers, or other information may be determined to have not been subject to tampering (e.g., can be authenticated), or upon determining that the values do not match, it may be determined to have been tampered with (e.g., cannot be authenticated). Further, to verify that the cryptographic hash value in the directed acyclic graph has not been tampered with, some embodiments may recalculate cryptographic hash values along a chain of cryptographic hash pointers to confirm that the recalculated values match those in the directed acyclic graph (e.g., can be authenticated), thereby indicating the absence of tampering (or upon detecting a mismatch, indicating the presence of tampering and cannot be authenticated).

In some cases, a transaction for data storage includes one or more keys, like one or more public keys, operable to verify a data signed with corresponding private keys of a key-pair. For example, a user might claim ownership of an existing user identity enumerated within the identity management system in a transaction record in the directed acyclic graph 205 by supplying an address of the transaction record, a representation of a credential, and a signature of the credential with a private key as arguments to a smart contract. The smart contract may verify the ownership claim by accessing the transaction record based on the address, identifying corresponding credential information associated with the transaction record (e.g., stored in the hash digest), and verify the signature with a public key associated with the transaction record. Verification of the signature indicates user ownership of the user identity enumerated in the transaction record by virtue of the user proving ownership of the private key. In practice, such as for an authentication function performed by a smart contract, the representation of the credential may be provided in a string that includes other or different data, like a time stamp or a randomly generated identifier, like a token, supplied to the user device, according to a schema of the smart contract. The signature by the private key may be performed over the whole string such that the resulting verification confirms one or more of temporal proximity of signing to verification of the signature or generation of the token (and also ownership of the token). The transaction record may also be verified as being untampered with, such as by a process for recalculating values along a chain of cryptographic hash pointers from a node storing the transaction record to a root node of a block, and then for the block in blockchain, etc., thus indicating that the transaction record can be authenticated along with the user claim to ownership of the transaction record. Where the transaction record includes cryptographic hash pointers to other transaction records in a hash digest, those other transaction records may also be verified. Thus, for example, when an ownership claim by a user to a given transaction record is authenticated, that authentication may also confirm ownership to one or more additional transaction records included in the hash digest.

In some embodiments, on-chain information may be stored according to a data structure specified by a unified schema, and the unified schema may be implemented in a smart contract. Different smart contracts for different functions may have different unified schemas, but each different schema may be considered unified for a given type of transaction record (e.g., according to function within the identity management system). For example, a transaction record corresponding to the enumeration of a user identity within the identity management system may have a different unified schema than a transaction record corresponding to the association of a user account with a user identity within the identity management system. Further, a transaction record corresponding to the authentication of a user based on a transaction record corresponding to a user identity or one or more associated transaction records for user accounts may have a different unified schema. Alternatively, the unified schema may be consistent across the different types of transaction records and unused data fields or values left null, blank, or omitted within node content having the data structure specified by the unified schema. Information having a data structure specified by a unified schema may be stored as node content by one or more transactions and may include a machine-readable portion, such as a portion of key-value pairs in dictionaries encoded as a hierarchical data serialization format, like JavaScript™ object notation (JSON) or extensible markup language (XML). In some embodiments, the off-chain portion may be a human-readable format including unstructured natural language text or clear-text that describes in prose information in the transaction. For example, an off-chain portion may describe different authentication criteria, different credential types (e.g., password, biometric, pin, etc.), and other factors that may be represented by values or ranges of values within the machine-readable portion. Or in some embodiments, this allocation may be reversed, intermingled, or otherwise differently arranged, which is not to suggest that any other feature herein is not also amenable to variation relative to the arrangements described.

In some embodiments, user identity records, authentication records, and other information in the unified schema may be stored into a data structure, which may be specified by the unified schema, that may be stored on the blockchain. In some cases, user identity records may conform to one unified schema while authentication records may conform to a different unified schema. For example, a unified schema may be operable to codify user identity information or authentication results in a unified schema for respective records in the data structure. In some embodiments, the data structure includes both XML, or JSON code or vectors, for example, a value of a key-value pair may be a vector comprising an ordering of identity information or authentication result values, like a one or more public keys or credential representations or indication of criteria by which a user authenticated and the credentials provided to satisfy that criteria. In some embodiments, the unified schema specifies a translation between XML or JSON code and a vector such that a vector may represent a compact version of the XML or JSON code. For example, a key of a key-value pair within XML or JSON code may be a location within the vector and the value of the key-value pair may be represented by a same or different value at that location, each of which may be specified by the unified schema. In turn, that vector may be translated back into XML or JSON code according to the unified schema. Thus, for example, a vector may comprise a string of data comprising a plurality of values pertaining to a user identity record, authentication records, or a request asserting of ownership an identity record for user authentication based on one or more user identity records or authentications.

In some embodiments, a transaction fee, or amount of gas, that will be needed to effect a transaction in the blockchain, such as establishing a user identity record or authenticating a user to a user identity record. The calculation, in some embodiments, will result in a total gas amount. This amount, in some embodiments, may then be multiplied by the price of gas desired and used to buy ether, if necessary, to increase an amount of ether in a wallet (e.g., of the entity requesting the transaction). After enough ether has been purchased to complete the transaction, in some embodiments, the process will send the request and gas to an Ethereum™ contract to store the corresponding record on the chain.

In some embodiments, this process may tie a user identity record or authentication records to an Ethereum™ wallet of the user identity record owner. Thus, for example, a request for authentication initiated by the user or response by the user to an authentication notification may be structured or determined based on identity information stored within the wallet. In some embodiments, an authorized party may manage or have access to the wallet of the user identity owner, such as by a transaction to associate an authorized user or device with the user identity record. In some embodiments, some transactions, like those for establishing user identity records, federating accounts under those under identity records, and authorizing additional users and devices to identity record or federated account access may be processed through an authority, like a authentication server 155, which reputably establishes identity records. Other entities may be permitted access to the identity records. Transactions occurring with higher frequency, such as for authentication of a user to a user identity record, may not flow through the authority. The decentralization of the process and immutability of data stored in blockchains means that a complete history or ledger of the changes made to a user account records can be chained back to its initial entry into the blockchain. The data structure being used, in some embodiments, to store a user identity records will either be an establishment of a user identity record entry or modification/updating of an existing user identity records entry. If it is based on an existing entry, in some embodiments, the data structure may include a cryptographic hash linking to the previous edition of the user account record for simplicity of finding one or more past iterations of the user account record. Similarly, such linking may simplify the identification of one or more prior authentication records (and the user identity record to which it pertains) to be considered in a current authentication request. Verification can still occur based on verification back to the entry in blockchain to irrefutably demonstrate no intervening changes of privileges conferred by the user identity records. However, linking can simplify review (e.g., by an interested party) prior to verification.

In some embodiments, content of nodes of the directed acyclic graph 205 of cryptographic hash pointers may be verified as having not been subject to tampering by determining whether that content is consistent with one or more chains, or other associative data structures (e.g., trees), of cryptographic hash pointers of the directed acyclic graph. In some embodiments, nodes of the directed acyclic graph of cryptographic hash pointers may include as node content a node identifier (e.g., an address in the graph) that distinguishes a node from other nodes of the graph, identifiers or one or more other nodes of the graph to which a cryptographic hash pointer of that node points, and an associated cryptographic hash values based on node content of those other identified nodes to which the cryptographic hash pointers point (in some cases, the pointing is from one and only one node to one and only one node for adjacent nodes). As additional nodes are appended to the directed acyclic graph, a chain of cryptographic hash pointers may be formed such that each subsequent node includes as node content one or more cryptographic hash values based upon some, and in some cases all of the previously published information published to the directed acyclic graph of cryptographic hash pointers. In some embodiments, following these pointers may be requested by a sload function which verifies that stored transaction records have not be tampered with or subject to other transactions such as to verify user ownership of a user identity, one or more user accounts, or an authentication decision based thereon.

The directed acyclic graph 205 of cryptographic hash pointers need not be referred to as a graph, or as having nodes or edges, in program code to constitute a graph, provided that a data structure affords the same or similar functionality, even if that data structure bears different labels. Similar qualifications apply to transaction records and the information they store or represent as described herein. For instance, graphs may be encoded in objects in object-oriented programming environment, key-value pairs, entries in a relational database, documents encoded in a hierarchical data serialization format, or combinations thereof, without being labeled as graphs.

In some embodiments, to expedite write operations (and in some cases, afford faster reads or verifications of reads), some embodiments may consolidate writes to the directed acyclic graph 205 of cryptographic hash pointers. For instance, some embodiments may form sub-graphs of directed acyclic graphs of cryptographic hash pointers that are collectively appended to an extant, larger directed acyclic graph of cryptographic hash pointers. In some embodiments, the directed acyclic graph 205 of cryptographic hash pointers may include a linked list, tree, or skip list of the sub-graphs. In some embodiments, the sub-graphs may be referred to as blocks, e.g., example blocks 21-25 as shown, with block 25 being current and blocks 21-14 storing one or more transactions pertinent to the examples described herein, and each may include 2, 4, 8, 16, 32, 64, 128, 256, 512, 1028, (e.g., 2^nth power of nodes) or more or less nodes, and one or more of those nodes may include node content, such as one or more of the various transaction records described herein.

In some embodiments, the appended sub-graphs may be implemented with a particular type of directed acyclic graph that affords relatively fast verification in addressing of published information. In some embodiments, the sub-graphs that are collectively appended may be binary trees, quad trees, radix trees, or the like. In some embodiments, the sub-graphs are Merkel trees, such as Patricia trees (lists herein should not be read as necessarily specifying mutually exclusive categories). In some embodiments, transaction records may be stored as node content of leaf nodes of a binary tree data structure that is collectively appended to the directed acyclic graph of cryptographic hash pointers upon completion of the tree data structure (e.g., achieving a threshold number of nodes, such 2^nth power of nodes to include in the tree data structure). Or in some cases, intermediate nodes of the tree data structure may include nodes having content in which published information is stored.

In some cases, those transactions may use the ERC 721 standard, which is incorporated by reference herein. ERC 721 defines a standard for tokens, which can be used in transactional exchanges, and held in an ether wallet, like a wallet for identities. Tokens may be unique, and thus, a token may be created and include transaction record information in the data structure specified by the unified schema for a type of transaction. In some embodiments, some aspects, like aspects of authentication results in the data structure, may be conferred to other tokens. The ERC 721 standard defines, for tokens, functions such as: name, symbol, totalSupply, balanceOf, ownerOf, approve, takeOwnership, transfer, tokenOfOwnerByIndex, and tokenMetadata. It also defines events, such as: Transfer and Approval.

In some embodiments, a smart contract may generate a token in association with one or more of the functions described herein. For example, a smart contract may generate a token representative of authentication results, and those results may also be stored in a transaction record in node content on-chain. The generated token may serve to provide representation of authentication results predicated on proving ownership of a user identity or user account transaction records and by which criteria the user proved ownership, by way of a user having a token representative of a successful authentication according to that criteria. Ownership of that token (e.g., within a wallet of the user) may confer a certain level of assurance (which may be tiered based on the criteria by which the user proved ownership) to the different parties participating in the identity management system, such as those operating application servers 245A, 245B, such that criteria by which the user must meet to prove ownership in a subsequent authentication decision are reduced or met by virtue of the token.

In some embodiments, a smart contract may receive as an argument a token indicative of a prior successful authentication and consume (e.g., destroy, modify, update, or otherwise receive and alter) that token during a subsequent authentication function, which may include generating a new (or modified) token indicative of transaction information for the authentication results of the subsequent authentication where that new token includes cumulative results (e.g., the different criteria by which the user authenticated for each authentication decision). In some embodiments, the different criteria satisfied by the user for each authentication decision may be associated with timestamps corresponding to the different authentication decisions and included in the token or corresponding transaction record. Thus, for example, honoring of previously satisfied criteria, which criteria a user has not satisfied or recently satisfied, and how recently a user authenticated and by which criteria may all be evaluated (e.g., by a smart contract according to criteria for authenticating the user) in one or more subsequent authentication decisions.

While tokens may be used in the above manner and afford convenient storage in a wallet to represent results of an authentication decision, the above should not suggest that a token must be used as a transaction record may as a transaction record of authentication results may also be referenced by its address and that transaction record may include (or reference other prior transaction records by way of cryptographic hash pointer that include) cryptographic hashes or associated keys (e.g., a public key for verification of a signature), by which the user may prove they effected the transaction by providing a signature (e.g., a representation of a credential signed with a private key) verifiable by the public key.

Thus, as described above, computing nodes 201 may execute smart contracts 207 to implement functions of the identity management system within the example computing environment 200. A computing node 201 may load and execute a given smart contract 207 in response to a request received via an API, and the request may include an address of or otherwise reference the given smart contract 207 (e.g., a location of the executable logic or computer program code, like a script, corresponding to the smart contract stored within the directed acyclic graph 205) to load and execute. The request may also include input values or strings according to a schema of the smart contract 207. Accordingly, those input values or strings may be provided in arguments in the schema of the smart contract 207 and the computing node 201 processes the input data according to the executable computer program code of the smart contract. Results of the processing may be published for recording in the directed acyclic graph 205 as a transaction record in node content. The computing node 201 may propagate the received request to one or more other computing nodes, and each of those computing nodes may propagate the received request to a further one or more other computing nodes. Results of the processing may be propagated in a similar fashion. Each node receiving the request may process the input data according to the executable code of the same smart contract by loading and executing the smart contract reference by the request to independently determine or verify results. In turn, the plurality of computing nodes may arrive at a consensus of the result of the processing and by virtue of the consensus collectively commit to publication of a transaction record of the determined results in the directed acyclic graph 205. In some embodiments, a smart contract may be configured to generate a token, and thus, that token may be representative of the results in the transaction record stored to the directed acyclic graph 205.

In accordance with one or more of the above described embodiments of the distributed and decentralized computing platform implementing an identity management system within the example computing environment 200, various ones of the other entities, such as one or more of mobile devices 101, client devices 135, application servers 245, and authentication server 155 illustrated in FIG. 2, may participate within the identity management system as described in greater detail below.

In some embodiments, the computing environment 200 may include a mobile device 101, a client device 135 (e.g. a primary device in a device pair used in an authentication session by a user), relying party computing systems like application servers 245, and an authentication server 155. These components may communicate with one another via a network 121, such as the Internet and various other local area networks. In addition, embodiments of the example computing environment 200 may include a mobile computing client device, such as mobile device 101, that supports client-side out-of-band authentication based on a secure channel to a trusted execution environment as described with reference to FIG. 1. Some or all of the benefits of such a configuration may be conferred to and implemented within the identity management system by committing information, like some or all of the information stored within the authentication repository 165 or representations of that information like cryptographic hashes of the information, to the directed acyclic graph 205 in the form of a transaction record. For example, the authentication server 155 may publish a smart contract configured to cause computing nodes to process a request to store some or all of the information from a UID record 151 in a transaction record. For example, existing UID Record 151 may be implemented within the directed acyclic graph 205 by way of one or more transaction records stored as node content within a blockchain. Similarly, some or all of the different functions ascribed to the authentication server 155 with reference to FIG. 1 may be implemented by smart contracts 207 which may process on-block data stored by the decentralized computing platform rather than in a relatively centralized repository 165.

In some embodiments, the techniques described herein may be implemented within the computing environment 200 (e.g., including each of the illustrated components) shown in FIG. 2 by executing processes described below with reference to FIGS. 3-6 upon computing devices like those described below with reference to FIG. 7. In some embodiments, computing devices like those described with reference to FIG. 7 may include additional or other components specific to configurations discussed herein. For example, a mobile computing device 101 may include components similar to those described with reference to FIG. 7 that support a client execution environment and additional components supporting a trusted execution environment, which may include a subset of like components (e.g., processor, memory, bus, etc.) configured to perform operations of the trusted execution environment. Similarly, client devices 135, servers 145, 155, and computing nodes 201 may include some additional or other components than those illustrated in FIG. 7. However, each of these devices may operate in accordance with principles similar to those discussed below and with reference to FIG. 7, such as by loading instructions and other data into a memory and executing those instructions by a processor to perform various operations.

One pair of mobile device and client device is shown, but embodiments are expected to include substantially more, e.g., more than 10 or more than 100 concurrently participating in the identity management system in one or more of the ways described herein. For example, multiple mobile or client devices may concurrently participate in a registration process with the identity management system while other registered mobile or client devices participate in an authentication process or other processes described herein. Similarly, while only two application servers 245 of relying parties are shown, embodiments are excepted to include substantially more, e.g., more than 10 or more than 100 concurrently participating in the identity management system in one or more of the ways described herein. For example, multiple different applications servers 245 may currently participate in registration processes, authentication process, or other process described herein.

The mobile device 101 may be a mobile computing client device to which a user has access to and may use to register a user identity with the identity management system. Once registered with the identity management system, the user may use the mobile device 101 to perform one or more different functions such as adding user accounts to the user identity, authenticating requests to access secure assets, like online resources, based on those user accounts or the user identity, effect payments, support a client-side role in out-of-band authentication process for those user accounts or the user identity, or other functions described herein. Although not shown, the mobile device 101 may be configured similar to, perform some or all of the functions of, or have an architecture similar to the mobile device 101 described with reference to FIG. 1, such as by including means for securely storing and processing credentials, keys, and other device or user specification information, means for receiving and processing notifications, means for soliciting credentials, means for transmitting credentials, means for establishing a secure channel between a TEE and a CEE, means for managing communication sessions over a secure channel, etc. as described herein. For example, identity information 230 for various identities may be maintained by the mobile device 101 some of which may be maintained within the trusted execution environment, like within a wallet, or otherwise encrypted and stored within the trusted execution environment, and some identifiers may be retained within the CEE such that notifications pertaining to those identities may be received and identified, and communication of information pertaining to those identities may occur over a secure channel established between the TEE and CEE.

For example, the mobile device 101 may include an example authentication application 220 (or other applications 225 such as by including features provided in a standard development kit, or SDK, for operability with the identity management system), and those applications may include a module, like an event handler, configured to provide notification service capability when executed on the mobile device 101. In some embodiments, the module may be provided separately, such as in a lightweight companion application to the authentication application 220, depending on the configuration of a client execution environment of the mobile device 101. In either instance, the module may be configured to provide notification service capability when loaded into a memory and executed by a processor of the mobile device 101 as a background service or process within the client execution environment. In turn, the module configured to provide notification service capability may receive notifications from the network 121 by subscription of the module or mobile device 101 to a notification service. For example, the module may monitor a port of the mobile device 101 configured to receive data from the network 121 and identify notifications received at the port, such as based on header information (e.g., sender/recipient information) of one or more data packets containing notification data.

Those notifications may be received from one or more entities within the computing environment 200, such as from an application server 245, authentication server 155, or a computing node 201. Thus, for example, the mobile device 101 may receive and process one or more notifications received from various entities within the computing environment 200 to return requested data or signed data like representations of credentials, notification data (e.g., signature of notification identifier), tokens, public keys, etc. for verification. Such requested data may be zero-knowledge proofs based on credential values, private keys, or other information maintained or input as described herein within a TEE of the mobile device 101. In response to identifying a notification, the module may post the notification to a location in memory or otherwise provide the notification to the authentication application 220 by a process like one of the processes described with reference to FIG. 1 or FIG. 3B in terms of a native notification service. Similarly, a native notification service of the mobile device 101 may monitor a port to identify notifications received at the port from the network in a fashion similar to that described above and those notifications may be passed to or identified by the authentication application 220.

The client device 135 may be a computing device having a configuration similar to the client device 135 described with reference to FIG. 1. Thus, an example client device 135 may be a computing device like a laptop, desktop, or workstation operated with network access in a home, office, or field environment, a terminal device or otherwise configured to provide a user interface for terminal access to one or more computing devices or virtual machines that may include or provide access to a secure asset or be a secure asset themselves. Different example client devices 135 may be configured to access different secured assets in a variety of different ways. For example, a client device 135 may attempt to access a secured asset such as an online resource on or via one or more application servers 245. In some embodiments, the client device 135 may attempt to access the online resource on or via one or more application servers 245 using an application 110 installed to the client device 135. In another example, a client device 135 may attempt to access a secured asset such as an application 110 executed on the client device. In some embodiments, the application 110 may also be configured to access an online resource on or via one or more servers 245, such as via an API of an application server 245 configured to support application 110 functionality.

Some embodiments may include a plurality of relying party application servers 245, which each may have a configuration similar to the relying party server 145 described with reference to FIG. 1. Thus, an example application server 245 may host or otherwise include online resources such as a secure asset, support client device 135 applications 110, support mobile device 101 applications 225, or otherwise process secure assets, like payment information, for which user access thereto is managed. Examples of online resources may include a user account, web applications, APIs supporting example applications 225 or 110, and other data as described herein. Generally, an application server 245 is configured to provide access to such resources for users (e.g., of a client mobile device 101 or client device 135) authenticated to access them while restricting other access attempts that cannot be authenticated. In some embodiments, an application server 245 may include a user identification repository (not shown), which may store information about users and clients. Like the authentication repository 165, some or all of that information in a user identification repository (not shown) associated with an application server 245 or representations thereof may be committed to the directed acyclic graph 205 for storage in one or more transaction records. For example, a relying party A operating an application server 245A may elect to participate in the identity management system and migrate some or all of the data (or representations thereof) stored within the user identification repository (not shown) to transaction records stored within the directed acyclic graph 205. In another example, a relying party B operating an application server 245B may elect to participate in the identity management and honor account registration based on information stored within the directed acyclic graph 205 or commit some or all of the data (or representations) pertaining to a user also having chosen to participate in the identity management system to transaction records stored within the directed acyclic graph 205.

In some embodiments, a relying party, such as by the application server 245 interfacing with a computing node 201 or the authentication server 245 may publish a smart contract to the directed acyclic graph 205 such that one or more of the computing nodes may load and execute the smart contract. For example, the smart contract may be configured to output results pertaining to authentication of a user requesting access to online resources of the application server 245. In some embodiments, the smart contract is executed by a computing node responsive to the computing node receiving a request to authenticate a user based on one or more transaction records stored within the directed acyclic graph 205. The transaction records may contain user account information corresponding to user account registered with the application server 245. Additionally, in some embodiments, one or more of the transaction records may include hash digests containing information about online resources that user account is permitted to access, or other information, but such information may also be maintained with a data store by the application server.

In some embodiments, the authentication server 155 performs one or more management operations in the identity management system. For example, the authentication server 155 may publish a smart contract 207 for registering a user to the identity management system. Additionally, the authentication server 155 may publish a smart contract 207 for authenticating a user on the identity management system. In some embodiments, application servers 245 may incorporate such functionality and perform one or more of these operations.

Headings are provided below to enumerate various examples or embodiments consistent with a given process (which may include a plurality of constituent processes performed by different entities) that can be implemented on the identity management system. The headings are provided for readability and should not be read to suggest that the different processes are mutually exclusive. In fact, they may be comingled, executed in parallel on same or different computing nodes or executed by different computing nodes at different times such as due to the various computing nodes receiving requests in respective queues for processing in different orders and at different times. Examples of queues for processing requests by computing nodes may be based on order of request receipt (e.g., first in, first out), timestamp of a request (e.g., priority queue where older requests have a higher priority than newer request), etc. and the decentralized and distributed nature of the computing platform results in different nodes processing same requests at different times according to network 121 factors, like latency or throughput, that affect communications between different computing nodes in different locals.

Example User Identity Creation

In some embodiments, a user may generate a user identity on a blockchain, like in the directed acyclic graph 205. For example, in block 21, a transaction record, Tx 1, is shown to include a user identity, Net ID 271. Thus, for example, transaction record Tx1 may be a user identity record establishing a user identity, or Net ID 271 of the user, within a directed acyclic graph 205. In order to use the Net ID 271, the user must prove ownership of the user identity. To that end, the user might retain some secret knowledge, like a private key, not shared with other users. The private key may be a first encryption key of a key-pair, a second encryption key of the key-pair being a public key not kept secret by the user. Thus, for example, the user may sign data, like some other key, certificate, credentials, identifier or any other data, with the private key to create a signature (e.g., the output of a signature function taking as input the data and the private key) and the public key is operable to verify the signature (e.g., the output of a corresponding signature verification function taking as input the signature, the data, and the public key). Thus, a signature verification function provides a verification result that the user who signed the data possesses the private key. Accordingly, the Net ID 271 information for a user may include a User ID Key, which may be a public key, and a User ID, whereby the user can prove ownership of the Net ID 271 by signing the User ID with the private key (e.g., for verification based on the signature, the public key, and the User ID). The User ID can be some data, like a file or digital certificate, cryptographic hash value, key, or other unique identifier.

In some embodiments, the Net ID 271 includes a digital certificate, like a X.509 type certificate, which may be a User ID itself or include a User ID (e.g., an ID bound to a public key of a user), and can include a public key for a user for signature verification. Thus, for example the user may generate a key-pair including a private key and a public key and sign a request for a certificate with the private key. In some embodiments, the request also includes one or more other credentials and identity proofs, which the user may establish in association with the Net ID 271 for proving ownership (which should not be taken to suggest that users cannot establish different or other credentials later on). In some embodiments, the authentication server 155 acts as a certificate authority and generates certificates for users. For example, the authentication server 155 may store a root certificate (e.g., a self-signed public key certificate supporting X.590-based public key infrastructure) and generate user digital certificates responsive to requests for distribution based in part on the root certificate. Thus, for example, a user digital certificate may be considered valid by virtue of its generation by the authentication server 155 for use within the identity management system and a user providing ownership of a Net ID 271 also proves ownership of a valid digital certificate authorizing the user to use the system.

Some embodiments of the authentication server 155 generate and encrypt a key that it stores to afford recovery of a Net ID 271 (e.g., should a user lose access to their private key). The authentication server 155 may transmit information, like a digital certificate, including a representation based at least in part on the key to serve as a User ID. In other words, the real value backing an operable User ID need not be exposed. Should a user lose access to a private key, ownership of a Net ID 271 may be reestablished through the authentication server 155, such as through generation of a new certificate in response to a request including a new private key of the user and that information may be stored to the directed acyclic graph 205 in a new transaction record.

As transaction record information stored within the directed acyclic graph 205 is tamper-evident, the new transaction record recording this information, i.e., ownership of the Net ID 271, may be operable as a new Net ID by showing ownership of the prior Net ID 271. Accordingly, a User ID may differ between those Net IDs as any prior User ID/Net ID may be referenced through one or more cryptographic hash pointers to prior transaction records (e.g., having established a prior Net ID 271 with prior User ID in example record Tx1). As only those digital certificates generated by the authentication server 155 may be considered valid, ownership of the prior Net ID 271. In other words, the prior User ID/Net ID may remain operable, but only through the new Net ID (e.g., because the user no longer has access to the private key for Net ID 271), subject to the user proving verified of ownership of the new Net ID (e.g., stored in a later transaction record).

Reestablishment of ownership may be predicated on a user submission of established credentials (e.g., like one or more cryptographic hash values output from a cryptographic hashing function) for verification. Depending on the embodiment of authentication server 155 or the decentralized data store, e.g., whether it is private, semi-private, or generally public, established credentials may be handled in different ways. For example, the authentication server 155 may retain in confidence some cryptographic hash values by which a user may reestablish ownership of a Net ID, such as by receipt of credential values or credential hash values from the user over a secure session with a mobile device 101, store that information in an off-block data store or obfuscate credential values to generate zero-knowledge proofs for on-block storage. A cryptographic hashing function may obfuscate one or more inputs in a way to provide a zero-knowledge proof, in which case those credentials may be stored within a transaction record, e.g., the transaction record containing the Net ID 271 information. For example, the key or other information stored by the authentication server 155 or on-block information may be concatenated with a user reproducible credential hash value (e.g., one generated within a trusted execution environment of the mobile device) and the concatenated string may be input to a cryptographic hash function (e.g., by the authentication server 155) to generate a cryptographic hash value representative of the credential for storage. As the actual credential values are obfuscated by the TEE (e.g., according to a first cryptographic hash function), and the stored value is further obfuscated by the authentication server 155 (e.g., according to a second cryptographic hash function) prior to on-block storage, actual credential values are not divulged. One or more of those cryptograph hash functions may take additional inputs, which may be held in secret, and outputs may be digitally signed according to a signature algorithm or one or more trusted components that verifies user credential value inputs were legitimately provided and any cryptographic hash based thereon legitimate generated so as to afford a zero-knowledge proof of ownership at a later date.

Configuration of an authentication server 155, another entity, or smart contracts for storing data within the identity management system in accordance with one or more of the above examples can reduce friction on users by affording Net ID recovery with high security. In various embodiments, the authentication server 155 may act as an authority within the identity management system for Net ID generation such as by generation of digital certificates based on a root certificate or optional storage of data for Net ID recovery. All or some of that information may be stored within the authentication repository 165 and may be encrypted (in which case it may be backed-up or stored within the directed acyclic graph 205 as node content within transaction records).

As shown in FIG. 2, embodiments of the mobile device 101 may include an authentication application 220. The authentication application 220 may include all or some of the features described with reference to authentication application 120 in FIG. 1. For example, the authentication application 220 may be an application, like a native application, configured to execute within a CEE of the mobile device 101. The authentication application 220, like other native application applications (such as example relying party applications 225A, 225B), may be downloaded to the mobile device 101 and subsequently installed, such as by a user of the mobile device 101. Alternatively, the authentication application and one or more other applications, like some other native applications, may be preloaded on the mobile device 101 or included in an operating system of the mobile device.

Once installed on the mobile device 101, the authentication application 220 may be loaded into a memory and executed by a processer (e.g., within the CEE) to perform one or more of the operations described herein. In some embodiments, the authentication application 220, when executed by the processor, includes a registration process that is executed to register the user/mobile device 101 with the identity management system. For example, the registration process may include the generation of a Net ID 271 (e.g., a user identity record) corresponding to the user within the directed acyclic graph 205. In addition, the registration process may include the establishment of identity information 230 on the mobile device 101, like one or more identity proofs or credential values, private keys, etc. as described herein within a TEE of the mobile device. Other identity information 230, like an address of a Net ID 271, User ID, public keys, representations of credentials, or other on-block information, may be stored within the CEE of the mobile device 101.

During the registration process, the authentication application 220 may communicate or otherwise establish identifying information about the mobile device 101 (and optionally the user) with a server, like the authentication server 155. For example, the authentication server 155 may include an API 255 by which the mobile device 101 may communicate data to the authentication server and the authentication server may provide results based on the communicated data. The identifying information may include all or some of the information described above, like a User ID and a User ID Key of the Net ID 271. Example communicated information and data may include one or more keys (e.g., public keys), a digital signature of data such as a digital certificate or request for digital certificate with a private key, cryptographic hashes of credentials, identifiers, or other user or mobile device 101 information or representations of data stored within a TEE of the mobile device. The authentication application 220 may communicate this information to the authentication server 155 through the API 255, such as by including the information in a request transmitted to the API 255 for establishing a Net ID 271. In turn, the authentication server 155 may process the received information and provide results of the processing to the authentication application 220 via the API 255.

In some embodiments, the authentication server 155 may process some or all of the received information by executing a smart contract 207 (e.g., where the authentication server 155 includes some or all of computing node functionality) or may request a computing node 201 execute a smart contract 207 to process the information. In either instance, information and results of processing the information may be committed to the directed acyclic graph 205, such as by the authentication server 155 structuring received and generated data according to a schema of a smart contract for establishing a Net ID and executing the smart contract or by transmitting a request including the data structure according to the schema to an API of a computing node 201 configured to load and execute the smart contract. Alternatively, the mobile device 101 may structure the request according to the schema of the smart contract and transmit that request to an API of a computing node 201. As described above, a computing node 201 may load and execute a given smart contract in response to a request, publish the request or results for verification by other computing nodes, and reach consensus with a plurality of other computing nodes to publish a transaction record enumerating the inputs or results within the directed acyclic graph 205. In some embodiments, Net ID reference information 273 for one or more transaction records (e.g., Tx1) corresponding to the establishment of the Net ID 271 may be returned to the mobile device 101. For example, the Net ID reference information 273 may include one or more of an address, like a cryptographic hash pointer, published ID, ID key, digital certificate, representations of credentials, etc. The authentication application 220 may store the received information as identity information 230 on the mobile device 101. In some embodiments, the authentication application 220 stores the identity information 230 within a cryptocurrency wallet or other wallet accessible to other applications on the mobile device such that the user of the mobile device may use the Net ID in association with those other applications on the mobile device.

As described above, the user retains some information, like private keys and actual credential values (as opposed to representations of those credentials) in secret, like within the TEE such that other users or nefarious actors cannot access that data (and thus cannot prove ownership of the Net ID of the user). Example communicated information may also include information about notification services available to the authentication application 220 for receiving notifications pertaining to requests for authentication of a user through the authentication application. Example communicated information may further include one or more preferences or setting pertaining to credentials the mobile device 101 is operable to or configured to obtain (e.g., directly or from a wearable or other device) or credentials the user is willing to use (e.g., password, faceprint, fingerprint, etc.). Example communicated information may further include policy information governing use of different credentials and properties thereof. Policy information may be stored on the mobile device 101 and set requirements, such as minimum entropy values, for collected user credential values processed within the TEE. Policy information may be updated for different secured assets or authentication functions within the identity management system.

In some embodiments, additional authorized users or devices may be added to a Net ID 271. For example, a user that uses multiple devices may submit a request (e.g., to the authentication server 155 via API 255) from another device to add an additional authorized mobile device. For example, to add another device, a request may include all or some of the information collected for the establishment or reestablishment of a Net ID 271. In some embodiments, the process occurs in a fashion similar to that described above for reestablishing a Net ID 271 and results in the generation of a transaction record that references the original Net ID 271.

However, the original Net ID 271 may remain in use (e.g., because the user can still prove ownership of the original Net ID 271). Publication of such a transaction record may be predicated on the user of the additional device proving knowledge of one or more of the secret values established on the mobile device 101 for the generation of the original Net ID 271.

As an alternative to, or in addition that proof of knowledge, the authentication server 155 may transmit a notification of the request received from the additional device to the mobile device 101. The authentication server 155 may also transmit a similar notification in response to a request received from a different user to be added as an authorized user of the Net ID 271 (e.g., with their own device). In response to the notification, the authentication application 220 on the mobile device 101 of the user having previously established the Net ID 271 may be configured to prompt the user of the mobile device 101 to authorize the request, such as by signature of data (e.g., notification, request, Net ID, or other data indicating approval) within the TEE of the mobile device with the private key corresponding to the public key associated with the Net ID 271.

The authentication application 220 may return the signed data indicative of approval of the request to the authentication server 155, which may verify the signature, and publish a transaction record indicative of the authorized use of the original Net ID 271 by the other user or device responsive to the verification of the signature. That transaction record may contain a cryptographic hash pointer reference to the original Net ID 271 and may also data like representations of credentials, public keys, etc., by which a user or device may prove ownership of the transaction record to use the referenced Net ID.

In some embodiments, creation of new transaction records to include reference to existing Net IDs 271 is discussed. In addition to the reference, like a cryptographic hash pointer, those transactions may also include all or some of the information published in the prior transaction. For example, a Net ID 271 may be republished to include cryptographic hash pointers to other transaction records (e.g., additional user transactions, additional device transactions, etc.) or to include some or all of the information from those other transactions directly—in which case the transaction for the republication may serve as the transaction and only include a cryptographic hash pointer to the prior Net ID record. For example, an updated Net ID record may be published and include the additional authorized user or device information (or other new information such as for a reestablishment of ownership) and include a cryptographic hash pointer to the prior version of the Net ID record (which in turn points to any prior version and so on back to the transaction record originally establishing the Net ID).

Figure 4C:
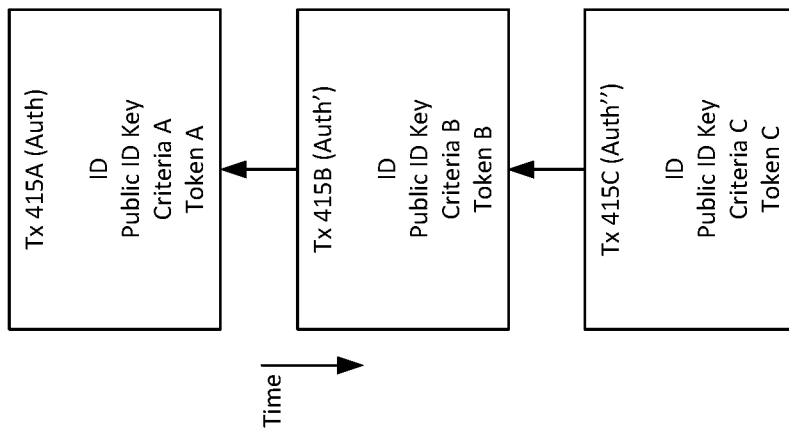
FIG. 4A, FIG. 4B, and FIG. 4C are diagrams showing example transactions recorded on a decentralized computing platform according to processes described in the present application.
Figure 4B:
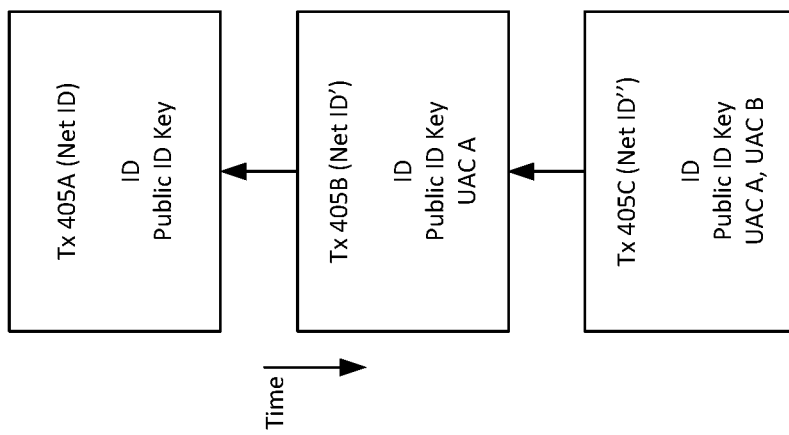
Figure 4A:
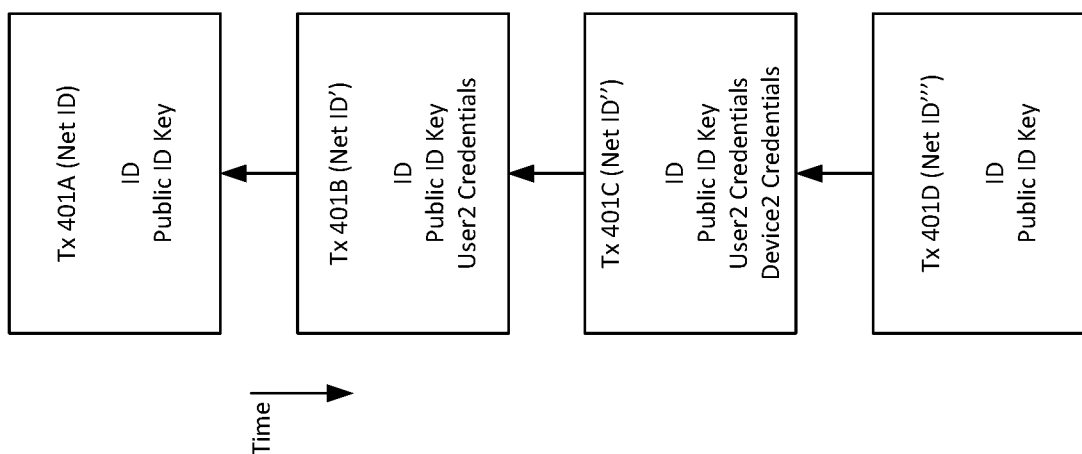

Turning briefly to FIG. 4A, an illustrative example embodiment is shown. Example transaction Tx 401A may establish a Net ID record that includes an ID and a Public ID Key and that transaction is published to the blockchain (e.g., as node content within a block within a directed acyclic graph). As described above, a transaction record like transaction Tx 401A may be published on the blockchain in association with a user registration process within the identity management system.

Subsequently, the user having established the Net ID record may authorize another user, user2, to use the Net ID. For example, user2 may request via their user device authorization to use the Net ID corresponding to Tx 401A. If the request is authenticated (e.g., by the user who established the Net ID record or by user2 proving access to secret knowledge), a transaction Tx 401B may establish a Net ID' (e.g., modified Net ID) record including User2 credentials for user2. User2 credentials may be representations of credential values unique to User2, such as one or more cryptographic hash value representative of credential values, a Public Key, etc. by which User2 may authenticate. For example, User2 may establish credential values and a private key for signing data on their device, like within a TEE of a mobile device of user2, which are retained in confidence for providing a zero-knowledge proof of access to the Net ID record through transaction 401B that established a Net ID' record including the User2 Credentials and a reference (e.g., a cryptographic hash pointer represented by the arrow) to transaction 401A.

Subsequently, the user having established the Net ID record may authorize another device, Device2, to use the Net ID, such as within a wallet on Device2. For example, the user may request via Device2 authorization to use the Net ID corresponding to Tx 401A on Device2. If the request is authenticated (e.g., by the user through confirmation on the device that established the Net ID record or by the user proving access to secret knowledge via Device2), a transaction Tx 401C may establish a Net ID" (e.g., modified Net ID) record including Device2 Credentials. Device2 credentials may be representations of credential values unique to the user or Device2, such as one or more cryptographic hash value representative of credential values, a Public Key, etc. by which the user may authenticate using the Device2. For example, the user may establish credential values and a private key for signing data on Device2, like within a TEE of a second mobile device of the user (e.g., a tablet, personal computer, etc.), which are retained in confidence for providing a zero-knowledge proof of access to the Net ID record through transaction 401C that established a Net ID" record including the Device2 Credentials and a reference (e.g., a cryptographic hash pointer) to transaction 401A. In some embodiment, transaction 401C may include any preceding transaction information, like that of transaction 401B, and reference the preceding transaction (e.g., a cryptographic hash pointer represented by the arrow), such that a most recently modified Net ID (e.g., Net ID") indicates all active user (e.g., user2) or device (e.g., device2) permissions for a given Net ID.

In some embodiments, Device2 Credentials may differ from those previously established by the user for the Net ID because a signature of a TEE may be required as verification of processing of credential values within the TEE and different TEEs may use or generate different unique private keys, use different cryptographic hash functions, establish different credential values for biometrics and so on. Similarly, because a user2 may use a different device than the user having established the Net ID (and User2 also inherently has different biometrics), those credentials values may also differ because a signature of a TEE of the device of user2 may be required as verification of processing of credential values within the TEE.

Moreover, the provided verification of a proof of ownership claim of a Net ID required for generation of a modified record (e.g., Net ID' or Net ID") authorizing a User2 or Device2 to use the Net ID, no additional burden exists on the system to support different credentials for authentication by different devices or different users other than the recording of the transactions authorizing those activities. In some embodiments, however, a user may prefer to use a same private key across the different ones of their devices such as to provide a zero-knowledge proof of ownership of the base Net ID (e.g., as established by Transaction 401A) as opposed to permitted access.

Further, a showing of ownership of the base Net ID may provide additional options unavailable to permitted users or devices, such as the option to remove user or device access or an option to establish new or updated credentials. For example, a user proving ownership of the Net ID may request revocation of access to the Net ID by Device2 and User2. If the request is authenticated (e.g., by the user through confirmation on the device that established the Net ID record or by the user proving access to secret knowledge via the requesting device), a transaction Tx 401D may establish a Net ID' (e.g., modified Net ID) record that revokes the User2 Credentials and Device2 Credentials from the most recently modified Net ID record. Accordingly, in some embodiments, an authentication function may take as input a transaction record address of a Net ID, access the record to identity the ID, and verify whether the accessed record is most current (e.g., by performing a search within published transaction records for the ID to identity any later record) prior to authentication. In some embodiments, a record of current transaction record addresses and associated IDs may be maintained by an authentication server and updated responsive to published transactions. In some embodiments, transaction record addresses referenced in pending or recently published transactions may be flagged pending a determination of whether the transaction is authoritative (e.g., whether by consensus, publication in a block, or publication in a block N where N is more than a threshold number of block older than a current block) or the transactions would not impact authentication (e.g., a pending transaction for removal of Device2 while User2 attempts to authentication).

In some embodiments, transaction records establishing Net IDs and transaction records pertaining to ownership or use of Net IDs are stored in a sub-graph, like a sub-graph of cryptographic hash pointers within a directed acyclic graph, such that Net ID records may be interrogated within a smaller search space than the entire body of on-block transactions. Thus, for example, records like those shown in FIG. 4A may be stored within a sub-graph and other types of transaction records (e.g., for authentication operations) may be stored within a different sub-graph.

Example User Account Association

Turning back to FIG. 2, in some embodiments, a user may associate user accounts with a user identity established on a blockchain. For example, a user may associate one or more user accounts (e.g., UAC A 21, UAC B 31) with a Net ID 271 of the user established within a directed acyclic graph 205. For example, in block 22, a transaction record, Tx2, is shown to include user account A, UAC A 21, and a transaction record, Tx3, is shown to include user account B, UAC B 31. The respective transaction records may associate those user accounts with the Net ID 271. As such, those user accounts may be considered federated under the Net ID 271 based on the respective transaction records, all of which are examples of user identity records according to some embodiments.

The example user accounts may correspond to existing user accounts with relying parties participating within the identity management systems, such as existing user accounts with application server 245A and 245B, respectively. Thus, for example, the user may access a user account managed by an application server by supplying credentials (e.g., user name and password) corresponding to the account, with the application server authenticating those credentials. Subsequently, such as while logged into the user account, the user may request federation of the account under a Net ID. In some embodiments, the application server may process the request to associate the user account with the Net ID subject to authentication of a proof of ownership claim of the Net ID by the user.

As before, in order to use or otherwise modify the Net ID 271, the user must prove ownership of the user identity. To that end, the user may prove knowledge of the retained secret knowledge, like a private key or other credentials not shared with other users, that was used to establish the Net ID 271. A relying party, like application server 245A, may verify such a claim based on the Net ID 271 information stored by transaction record Tx 1 on the blockchain. For example, the application server 245A may obtain transaction record Tx 1, such as by requesting the record based on an address (e.g., cryptographic hash pointer) of the transaction record provided by the user. Alternatively, other identifying information provided by the user, like a public key or identifier of the Net ID 271 by which the directed acyclic graph 205 may searched to obtain a transaction record corresponding to the Net ID 271. Accordingly, the user may transmit their claim to the application server 245A, and the application server may verify the claim based on the Net ID 271 information stored by the transaction record Tx 1. For example, by signature verification or one or more representations of credentials supplied by the user matching those enumerated in the stored Net ID information. If the claim is verified, the application server 245A may sign the result (e.g., with a private key of the relying party) and submit information such as the verification result of the user for the Net ID, signed result, public key, a user account identifier (e.g., a cryptographic hash, token, or other value which need not be username), one or more representations of credentials, or other data for publication on the blockchain. For example, the application server 245A may structure the above data according to a schema of a smart contract for associating a user account with a Net ID and submit the information as arguments to the smart contract. In turn, a computing node 201 may process the received information by execution of the smart contract, and publish the results and indication of the association of user account A 21 with Net ID 271 in a transaction record, such as transaction record Tx 2 as illustrated.

In various embodiments, an application server need not verify the claim directly, rather verification of the claim may be based on a result returned by a smart contract configured to authenticate user ownership of the Net ID 271. For example, a user may request to federate a user account B 31 and provide proof of knowledge information for authentication in association with the request to application server 245B. The application server 245B, in turn, may structure the received proof of knowledge information according to a schema of a smart contract for authenticating user ownership of a Net ID and submit the received information as arguments to the smart contract to receive an authentication result verifying the ownership claim. In turn, the application server 245B may sign the results and submit information to another smart contract to publish the association, e.g., by transaction record Tx 3. In some embodiments, the smart contract may combine these functions, such as by taking as input a signature of the application server 245B over the submitted information (e.g., rather than a verification result) and any information corresponding to the user account B 31 for publication. Thus, for example, the smart contract may verify ownership and, responsive to verification of ownership, publish the results of the association of user account B 31 with the Net ID 271 in a transaction record, such as transaction record Tx 3 as illustrated.

Alternatively, in another example, in response to a user request to federate the user account B 31, the application server 245B may provide a response to the user, and the response may include a uniquely generated token or request ID. In turn, the user may sign the response or unique information therein with a private key corresponding to a public key of the user's Net ID 271, thereby the user proves access to secret knowledge (e.g., private key) and intent to associate the account (e.g., by virtue of signing the response). In turn, the user may structure that information according to a schema of a smart contract and transmit the information in the schema to a comping node (which may be application server 245B or another computing node) for processing and publication to indicate the results (e.g., verification of ownership of the Net ID 271 and signature of the response) and association, such as by transaction Tx 3 indicating association of the user account B 31 with the Net ID. The smart contract having processed the information may be considered authoritative by the relying party operating the application server 245B such that the application server 245B honors the results of the transaction record Tx3.

Thus, as described above, a variety of embodiments and smart contract configurations are applicable to publish verifiable transaction records, e.g., Tx 2 or Tx 3, indicating associations of user accounts of a user with an established Net ID 271 of the user to federate those user accounts under the Net ID. As smart contracts may be tamper evident and stored within the directed acyclic graph 205, a replying party operating an application server 245 may agree to a particular body of logic implemented by smart contract for federating user accounts under Net IDs. In some embodiments, access to such smart contracts may be restricted to an authentication server 155 or application server 245, such as by verification of the requesting entity, like verification of a signature of an entity by way of a public key. For example, a given smart contract may access or include one or more public keys for signature verification of requests. Thus, for example, an application server 245 may sign a request or other information indicative of approval of a request to associate a user account with a Net ID and a smart contract or authentication server 155 may verify as a condition for publication of a transaction record of the association.

In instances where a user does not have an existing account with an application server 245, application servers may include in a registration process for a user account an option to use a Net ID. In turn, a transaction record (e.g., like a transaction record Tx 2 or Tx 3) may be indicative of an application server 245 establishing the Net ID as a user account in-kind where Net ID information serves as accepted user account information. Alternatively, user account information, like a user account name or ID (or other account details), may be generated by an application server 245 for association with the Net ID in a similar fashion to existing user accounts.

Configuration of an authentication server 155, another entity, or smart contracts for storing data within the identity management system in accordance with one or more of the above examples can reduce friction on users by affording federation of user accounts held or create with relying parties participating within the identity management system under a Net ID. Once a user account association with a Net ID is recorded, such as within the directed acyclic graph 205, cryptographic hash pointers or transaction record information enumerating those associations serve to afford account access under the Net ID. For example, a user providing proof of ownership of a Net ID 271 for which there exists associations to federated user accounts A 21 and B 31, application servers 245A and 245B, respectively, may permit access to those accounts responsive to verifying the ownership claim.

As shown in FIG. 2, embodiments of the mobile device 101 may include applications 225. Those applications 225 may be configured to interface with corresponding relying party application servers 245. Similarly, a client device 135 may include an application 110 configured to interface with one or more relying party application servers 245. The example applications 110, 225 may be loaded into memory on the respective devices 135, 101 and executed by one or more processors on the respective devices.

Those applications 110, 225 or the application servers 245 may govern access to assets based on user accounts. Thus, for example, a user may use an application 110 on a client device 135 and provide credentials 111 applicable to access their user account or other assets of a given application server. Similarly, a user may launch an application 225A on a mobile device 101 and provide credentials for their user account with the application server 245A to access application 225A features or access assets provided by the application server 245A. Example applications 110, 225 may be operable to display user interfaces, such as a user account options interface. Such an interface may include an option for a user to elect to federate the user account under a Net ID, e.g., Net ID 271, such as by providing an identifier of their Net ID, like an address of the Net ID or a public key corresponding to the Net ID, and submitting a request to federate the user account. Alternatively, for users without a user account, an application or application server may provide an interface by which a user may request to use their Net ID to register an account. In either instance, example embodiments of interfaces may be operable to receive proof of ownership corresponding to the Net ID. Alternatively, an application server may generate a notification or request generation of a notification responsive to a request including an identifier of an established Net ID, the notification being transmitted to or obtained, for example, by a mobile device 101.

In some embodiments, an authentication application 220 may receive or obtain the notification. In some embodiments, an application 225 of a relying party may receive or obtain the notification, such as by including one or more modules, functions, or otherwise utilizing services similar to those discussed with reference to the authentication application 220 (or 120). For example, an application 225 may include various functionalities of an authentication application (e.g., 110 or 120) as provided in a standard development kit (i.e., SDK). An example SDK may be used by application 225 developers to incorporate functionality (e.g., similar to that of an authentication application) affording interoperability with the identity management system within the application. Such functionality may include one or more modules or computer program code for exchanging data with a TEE of a mobile device 101 over a secure channel, exchanging data with an authentication server 155 via API 255, or exchanging data with a computing node such as by structuring data according to a schema of a smart contract and transmitting a request including the data structure for processing by a computing node with the smart contract. Thus, a given application 225 may perform one or more operations similar to those performed by an authentication application as discussed herein.

An authentication application 220 (or application 225) may be loaded into a memory and executed by a processor (e.g., within the CEE) to perform one or more of the operations described herein. In some embodiments, the authentication application 220, when executed by the processor, receives or identifies a notification pertaining to identity information 230 used on or by the mobile device 101. For example, a notification may include a Net ID reference 273 and request for proof of ownership of the corresponding Net ID (e.g., Net ID 271). The Net ID reference 273 may be any one of identity information 230 stored for different identities, like an address of a Net ID 271, User ID, public keys, representations of credentials, or other on-block information stored within the CEE of the mobile device 101. The authentication application 220 may interface with a TEE of the mobile device 101 (e.g., over a secure channel) to request proof of ownership of the Net ID 271 and may request one or more signatures of the notification or identifying information within the notification, like a token or notification ID, be performed within the TEE. In turn, the user may be prompted to authenticate with the mobile device 101, such as by providing user credential values processed within the TEE to determine an authentication result for the user within the TEE. If the user successfully authenticates with the mobile device 101 and permits (e.g., by selection within an interface) processing of the notification, the TEE may process the request such as by signing, within the TEE, with one or more private keys corresponding to public keys of the Net ID 271, one or more representations of credentials to prove ownership of the Net ID 271 or notification information confirming approval of the association or registration of a federated user account indicated by the notification. The results of the processing within the TEE, such as one or more signatures, data that was signed, or public keys are output by the TEE (e.g., over the secure channel) for transmission by the authentication application 220.

Depending on the embodiments, the authentication application 220 may transmit the results to an application server, computing node, or authentication server for verification and publication. One or more of those entities may verify the results, such as by verifying one or more credentials or signatures supporting the user's proof of ownership claim of the Net ID 271 or confirmation of the request to register or associate a user account with the Net ID 271, or verifying signature of the application server 245 to which the user account pertains. In some embodiments, verification of the results is performed by a smart contract executed by a computing node. For example, the authentication application 220 may return the signed data indicative of approval of the request to the corresponding application server, which may verify one or more signatures, and include computing node functionality to publish a transaction record indicative of the approval to federate a user account under the Net ID 271. That transaction record may contain a cryptographic hash pointer reference to the Net ID 271 and user account identifier corresponding to the federated user account, and may also include data like representations of credentials, public keys, etc., by which a user or device may prove ownership of the transaction record by way of Net ID credential information to use the user account. Example verified results may be published to the directed acyclic graph 205, as indicated by example transaction records Tx 2 and Tx 3 that federate user accounts under Net ID 271. In some embodiments, references, like addresses or identifiers pertaining to those transaction records or federated user accounts are returned to the mobile device 101, such as by a notification. In turn, the authentication application 220 or other application may store those user account references 275 for federated user accounts within the identity information 230, like within a wallet, such as in association with a Net ID reference 273 corresponding to the Net ID 271 under which those user accounts were federated. In some embodiments, Net ID reference 273 information may be updated to include reference to a transaction record enumerating Net ID association with to one or more federated user accounts.

In some embodiments, creation of new transaction records to include reference to existing Net IDs 271 is discussed. In addition to the reference, like a cryptographic hash pointer, those transactions may also include all or some of the information published in the prior transaction. For example, a Net ID 271 may be republished to include cryptographic hash pointers to other transaction records (e.g., one or more user account associations, etc.) or to include some or all of the information from those other transactions directly—in which case the transaction for the republication may serve as the transaction and only include a cryptographic hash pointer to the prior Net ID record. For example, an updated Net ID record may be published and include the additional identifiers, credentials or other information pertaining to one or more federated user accounts and include a cryptographic hash pointer to the prior version of the Net ID record (which in turn points to any prior version and so on back to the transaction record originally establishing the Net ID).

Turning briefly to FIG. 4B, an illustrative example embodiment is shown. Example transaction Tx 405A may establish a Net ID record that includes an ID and a Public ID Key and that transaction is published to the blockchain (e.g., as node content within a block within a directed acyclic graph). As described above, a transaction record like transaction Tx 405A may be published on the blockchain in association with a user registration process within the identity management system.

Subsequently, the user having established the Net ID record may federate a user account with some other party participating within the identity management system under the Net ID. For example, the user may request via their user device authorization to use the Net ID corresponding to Tx 405A to access a user account A with a relying party A. In other words, the user may request the option to authenticate with the relying party A based on their Net ID rather than some other user account with party A. If the request is authenticated (e.g., by the user who established the Net ID record proving access to secret knowledge), a transaction Tx 405B may establish a Net ID' (e.g., modified Net ID) record including user account A information, like one or more identifiers operable to identify or authenticate federation of a UAC A, like a user account identifier, public key corresponding to the party A, or a signature of the user account identifier by party A. The user account A information may also include one or more representations of credential values, such as one or more cryptographic hash values representative of credential values, a Public Key, etc. by which the party A may require the user to authenticate over proof of ownership of the Net ID. For example, party A may be a medical or financial service provider and require authentication by input of a social security number, and a representative credential may be a cryptographic hash value based in part on the social security number of the user. Actual credential values like one or more other values used by a cryptographic hash function to obfuscate social security number values and a private key for signing data on the device, like within a TEE of a mobile device of the user, are retained in confidence for providing one or more zero-knowledge proofs. For example, a signature with a private key may establish ownership of the Net ID record through transaction 405B that established a Net ID' record including the federate account information and a reference (e.g., a cryptographic hash pointer represented by the arrow) to transaction 405A. Further, a signature may be of another zero-knowledge proof, like generation of a representation of a credential within the TEE, where that representation of a credential may be additional credential values governing access to user account A.

Subsequently, the user having established the Net ID record may request to federate another user account, such as a user account B. For example, the user may request via their user device authorization to use the Net ID corresponding to Tx 405A to access a user account B with a relying party B. In other words, the user may request the option to authenticate with the relying party B based on their Net ID rather than some other user account with party B. If the request is authenticated (e.g., by the user who established the Net ID record proving access to secret knowledge), a transaction Tx 405C may establish a Net ID" (e.g., modified Net ID) record including user account B information, like one or more identifiers operable to identify or authenticate federation of a UAC B, like a user account identifier, public key corresponding to the party B, a signature of the user account identifier by party B, or any additional representations of credentials (which may differ from those for other user accounts).

In some embodiment, transaction 405C may include any preceding transaction information, like that of transaction 405B, and reference the preceding transaction (e.g., a cryptographic hash pointer represented by the arrow), such that a most recently modified Net ID (e.g., Net ID") indicates all active federated identities under the Net ID. Verification of a proof of ownership claim of a Net ID in connection with relying party approval required for generation of a modified record (e.g., Net ID' or Net ID") enumerating federation of a UAC A or UAC B under the Net ID permits in-kind use of those user accounts by virtue of authentication on the Net ID. However, in some embodiments, a relying party to which a federated user account pertains may require specific authentication criteria for some user activities. As a result, representations of additional credentials may be stored such that a user may authenticate by those additional criteria, such as by generation of a representation within a TEE of their mobile device.

A showing of ownership of the base Net ID record 405A may permit a request for removal of a user account or an option to establish new or updated credentials. For example, a user proving ownership of the Net ID may request revocation of federation of a given user account without any impact on the existing account. If the request is authenticated (e.g., by the user through confirmation on the device that established the Net ID record or by the user proving access to secret knowledge via the requesting device), a transaction Tx establish a new modified Net ID (not shown) record that revokes given user account information from that most recently modified Net ID record. Accordingly, in some embodiments, an authentication function may take as input a transaction record address of a Net ID, access the record to identify a federated UAC, and verify whether the accessed record is most current (e.g., by performing a search within published transaction records for the ID to identity any later record) prior to authentication. In some embodiments, a record of current transaction record addresses and associated IDs may be maintained by an authentication server and updated responsive to published transactions. In some embodiments, transaction record addresses referenced in pending or recently published transactions may be flagged pending a determination of whether the transaction is authoritative (e.g., whether by consensus, publication in a block, or publication in a block N where N is more than a threshold number of block older than a current block) or the transactions would not impact authentication (e.g., a pending transaction for removal of a UAC A while the user attempts authenticate access to an asset associated with UAC B).

In some embodiments, transaction records establishing Net IDs and transaction records pertaining to ownership or use of Net IDs are stored in a sub-graph, like a sub-graph of cryptographic hash pointers within a directed acyclic graph, such that Net ID records may be interrogated within a smaller search space than the entire body of on-block transactions. Thus, for example, records like those shown in FIG. 4B may be stored within a sub-graph and other types of transaction records (e.g., for authentication operations) may be stored within a different sub-graph. In some embodiments, the example transactions 405B, 405C in FIG. 4B may also include information from one or more of transactions 401B-C of FIG. 4A and be stored in a same sub-graph. Further, in some embodiments, a record combining that information may indicate which devices or users are permitted to access which user account, such as by one or more associations (e.g., key-value pairs) between a user account and additional user/device credentials operable to authenticate on the Net ID for use of the user account.

Example Net ID Authentication

Turning back to FIG. 2, in some embodiments, a user may authenticate to a user identity established on a blockchain. Authentication to a user identity, such as Net ID 271, may also confer authentication in-kind to one or more federated user accounts (e.g., UAC A 21, UAC B 31) associated with the Net ID 271. The Net ID 271 and associations with federated user accounts may be established by one or more transactions, e.g., transactions Tx 1-3, within a directed acyclic graph 205. For example, in block 21, a transaction record Tx 1 may establish a Net ID 271 for the user, and in block 22, one or more transaction records Tx 2, Tx, 3, may establish associations between user accounts of the user and the Net ID to federate access to those user accounts. Transaction records Tx 1, Tx 2, and Tx 3 are examples of user identity records according to some embodiments.

Subsequently, a user may desire the use the Net ID 271 to access assets governed by the Net ID 271 or one or more of the federated user accounts. Thus, for example, the user may submit a zero-knowledge proof of ownership of the Net ID 271 for authentication, such as to an authentication server 155, computing node 201, or application server 245. In the case of submission to an authentication server 155 or application server 245, those example entities may perform one or more steps in a verification process to authenticate user ownership of the Net-ID 271. Those example entities may also include computing node functionality to publish results for recording in the directed acyclic graph 205. In various embodiments, a verification process may be substantially executed on a computing node 201 according to a smart contract 207, and authentication servers 155 or various application server 245 may be a computing node or include computing node functionality to execute a smart contract. The above example configurations are not mutually exclusive as different process and functionality may be distributed among different smart contracts or entities. For example, some smart contracts may be configured to determine results and publish results (e.g., substantially perform the operations to authenticate user ownership of a Net ID), other smart contracts may be configured to verify and publish results (e.g., perform operations to verify results determined by an authentication server, application server, or other computing node), and some other smart contracts may be configured to publish results (e.g., results received from an authentication server or application server) where those results are independently verifiable.

In the context of the identity management system, the first two configurations may provide increased benefit for one or more authentication operations as the results of those records stored in the directed acyclic graph 205 may be considered authoritative by virtue of determining whether the transaction records corresponding to those results are unmodified (e.g., by computing one or more cryptographic hashes) because a majority of the computing nodes reached consensus on verification of the results for publication according to a given smart contract. Accordingly, the results need not necessarily be re-verified in instances where an entity agrees to the body of logic in the given smart contract. In the latter configuration, verification of both the legitimacy of a transaction record within the graph 205 and the results therein (e.g., by computation of inputs and corresponding signature verification) may be necessary for an entity to consider the results authoritative, such verification operations may be performed by smart contract or through interrogation of transaction records (e.g., such as where the entity operates a computing node).

In some embodiments, a user uses a client device, like mobile device 101, to submit a zero-knowledge proof of ownership of a Net ID 271 for authentication. In some embodiments, a user may voluntarily submit proof of ownership. For example, the user may use an application, like authentication application 220 or a relying party application 225, to transmit those credentials to an authentication server 155, computing node 201, or relying party application server 245 for authentication. If authenticated, the results may be published to the immutable data stored and honored by at least the party the user desired to authenticate. In some embodiments, the mobile device 101 may receive an indication of the result, like a token, identifier of the transaction, or other data which the mobile device 101 may present as proof of authentication. Some results may be signed in a way (e.g., by private key of an authoritative party like the authentication server or server of a relying party) such that they may be considered authoritative for a given function based on signature verification. Thus, for example, the mobile device may present the results to a terminal or electro-mechanical device for payment authorization or physical access. In some examples, results output by smart contract (e.g., token, authorized function, public key of client device, etc.) may be signed by the authority and results and signed results may be provided to the mobile device. The mobile device may sign at least some of the result data (e.g., the token or signed data string) with the same private key and provide to the terminal or electro-mechanical device the received results, received signed results, and the signature generated by the mobile device. The terminal or electro-mechanical device may in turn input that data received from the mobile device into a signature verification function that outputs whether that input data is verified or unverified. If the input data is verified, the terminal or the electro-mechanical device may perform a function based on the result, such as authorizing a payment or actuating a mechanism for physical access.

In some embodiments, a user may be prompted to submit proof of ownership, such as in response to a notification received or otherwise obtained by the mobile device 101. In some embodiments, a notification is received in response to a client device different from the mobile device 1101, like a client device 135, attempting to access a secure asset as described herein. Thus, the notification may be received in association with an out-of-band authentication process in which the user uses the mobile device 101 to authenticate the access attempt by the client device 135. In some embodiments, a notification is received in response to the user attempting to access a secure asset on the mobile device 101, like executing an example application 225A which may also be configured to retrieve assets from an example application server 225A. In some embodiments, a notification is received in response to the user attempting to otherwise access a secure asset on example application server 225B, like a web application, account, file, etc., where the example application 225B may be a web browsing application.

In some embodiments, an example application, like an authentication application 220 or a relying party application 225, is configured to receive or otherwise obtain notifications. For example, such applications may register or subscribe to a notification service to receive notifications, monitor a location in memory on the mobile device to obtain notifications, or monitor a port of the mobile device or address on a network to obtain notifications for processing. In response to obtaining a notification for processing, an authentication application 220 may interface with a TEE of the mobile device 101 to prompt the user to authenticate with the mobile device 101, such as by biometric authentication or entering credential values like a passcode, pin, or other values. In some embodiments, a notification may request authentication by one or more specific credential values or biometrics, which the user may supply for processing within the TEE. As described previously, credential values may reside with the user or within the TEE. For example, when the user authenticates on the mobile device 101 via a biometric value, the TEE may analyze the biometric values supplied by the user to determine whether the supplied biometric values are indicative of the user who established representations of those values within the TEE. A result of that processing may be a representation of the credential values, like a cryptographic hash value, or other determined representation of the result of the processing, which may be signed within the TEE, such by one or more signature functions, and the result and signature may be output by the TEE. In other words, the results that are signed are not actual credential values, but rather representative credentials corresponding to cryptographic hash values of credential values or results indicative of a user authenticating by one or more credential values such that those representative credentials may be passed outside of the TEE (e.g., to an application executing within the CEE of the mobile device by secure channel) without compromising actual credential values. Thus, for example, the TEE may sign a representative credential with a private key of the TEE to allow verification that credential values corresponding to the representation were securely collected and processed within the TEE. The TEE may also sign results or other data (e.g., ID of a Net ID, token, notification data, etc.) with a private key stored within the TEE, such as private key of the user that corresponds to the public key associated with the Net ID to allow verification of proof of secret knowledge. In some embodiments, the private keys may be the same. In some embodiments, verification of TEE signature for different representations of credentials associated with a Net ID may satisfy some authentication criteria while verification of a signature by the private key corresponding to the public key associated with the Net ID may satisfy some other more stringent authentication criteria. Signature functions may also take as input a time stamp or other identifier (e.g., identifier corresponding to the notification or other received value, like a token) such that a verification process may take into account timeliness of signature generation or to which notification or authentication request the signature pertains to. Thus, for example, an otherwise valid signature may be considered invalid if not received within a threshold time or were not generated responsive to or based on an expected value like an identifier of notification or token.

In some embodiments, an example application, like an authentication application 220 or a relying party application 225, receives results including one or more verifiable zero-knowledge proofs from the TEE of the mobile device 101 and transmits the results to an entity for authentication. For example, the authentication application 220 may transmit the results to the authentication server 155, a relying party application server 245, or a computing node 201 for verification. In some embodiments, the application transmits the results to an entity specified by the notification, an entity associated with the notification, or a default location (e.g., an authentication server, application server, or a given computing node). For example, an application 225A may process notifications received from or identifying an application server 245A and transmit the results to application server 245A. In some embodiments, the results may be transmitted over a secure session, such as via an HTTPS connection established between the mobile device and a remote server or computing node within the identity management system. Thus, for example, exposure to man-in-the-middle and other types of attacks may be mitigated (e.g., a timely theft of results and representation of those results).

The entity receiving the results including one or more zero-knowledge proofs from the mobile device 101 may verify the received information based on transaction records stored within the directed acyclic graph 205. For example, the entity may be a computing node or include computing node functionality and execute a smart contract to process the received information. In some cases, the entity may structure the results according to a schema of a smart contract and transmit a request to computing node including the data structure for processing by the smart contract. In some cases, the entity may access one or more transaction records, process the results received from the mobile device 101 to determine an authentication decision, and transmit a request to a computing node or other computing nodes to execute a smart contract configured to verify and publish the results of the authentication decision. An example smart contract 207 may determine an authentication result, verify an authentication decision, or publish an authentication decision. For example, a computing node 201 executing example smart contract 207 may receive a zero-knowledge proof of ownership for Net ID 271, access transaction record Tx 1, determine an authentication result based on the zero-knowledge proof and the Net ID 271 information, and publish those results, such as in an example transaction including Auth1 results 281. In some embodiments, the example smart contract 207 may generate a token, which may be included in the published transaction and provided as a confirmation of the processing (e.g., returned to the mobile device or requesting entity). In some embodiments, the smart contract 207 may be configured to cause the executing computing node 201 to return results of the processing, e.g., a transaction ID, token, etc., indicative of the authentication decision to the requesting entity such as an application server 245, mobile device 101, or authentication server 155. Other computing nodes may execute the same smart contract 207 to verify the Auth1 results 281 of a published transaction by consensus, thereby agreeing upon an authoritative transaction record Tx4 including the Auth1 results 281 as shown in block 23.

Different entities may choose to honor authentication results at different times and may optionally choose to verify or independently determine authentication results. For example, if auth1 results 281 pertain to application 225A requesting access to application server 245A, and application server 245A requests processing by a computing node operated by relying party A, or the application server 245A includes computing node functionality (or is a computing node) to determine or verify auth1 results 281, application server 145A may accept auth1 results 281 as valid prior to consensus or authoritative publication of transaction record Tx 4. Other entities, such as authentication server 155 or other relying parties such as application server 245B, may honor the auth1 results 281 only after authoritative publication of transaction Tx 4 or based on independent verification (such as by including computing node functionality to verify the results or receiving verification of results from a trusted computing node). For example, if the user attempts to access a secure asset managed by application server 245B with their mobile device 101, the application server 245B may authorize the attempt based in part on the prior auth1 result 281.

In some embodiments, a relying party different from a prior party with which the user authenticated may specify criteria for authentication of a user based on prior authentication results, e.g., auth1 results. For example, application server 245B may specify criteria for honoring the auth1 results, and a user providing proof of knowledge in association with an access attempt may be verified based in part on the Auth1 results 281 in a recent transaction Tx4, rather than by a full verification of ownership of the Net ID. In some embodiments, where one or more of those criteria are not met, such as one or more different credentials required by application server 245B for authentication not being previously supplied, a notification may be generated and transmitted to the mobile device 101 of the user. The notification may specify which additional credentials the user must supply to satisfy the criteria. The credentials corresponding to criteria already satisfied as indicated in the auth1 results 281 may not be requested. A smart contract 207 may access the transaction Tx4, receive the additional representations of credentials to satisfy criteria not met by the prior authentication results, and determine whether the prior authentication results combined with the additional representations satisfy all criteria. If the prior auth1 results 281 for authentication of user ownership of the Net ID 281 and the additional representations satisfy all criteria as indicated by an authentication result determined by the smart contract, the application server 245A may authorize the access attempt. In instances where additional credentials are supplied, a smart contract may publish a transaction Tx5 including auth2 results 282 indicative of the authentication result based on the prior auth1 results and the additional credentials. Similar to transaction Tx4, a plurality of computing nodes may verify the auth2 results 282 and reach consensus on the publication of transaction record Tx5, e.g., in block 24, within the directed acyclic graph 205. Thus, for example, yet another relying party or an access attempt to a more restricted asset or function subject to more stringent criteria with application server 245A or 245B may authenticate based on or based in part on the auth2 results 282 in a similar fashion as described above. In some embodiments, the criteria may include a threshold time for authenticating based on any prior transaction record or a threshold number of prior authentication records to accept authentication results enumerated therein such that previously supplied credentials or transaction records are not considered indefinitely.

In some embodiments, authentication results include a unique token. For example, the computing node 201 executing a smart contract 207 to determine an authentication result may generate a token in association with successful authentication results. The token may be returned to the entity requesting the authentication or to a client device, like mobile device 101, for storage in association with identity information 230. In some embodiments, an entity like the authentication server 155 or a relying party server 155 may receive and sign the token. The token and the signature may be transmitted to the mobile device 101 such that the mobile device 101 may present the token and signature verifiable by public key of the signing entity as proof of verified identity.

In some embodiments, the token may be signed within a TEE of the mobile device 101, such as by a private key corresponding to a public key associated with a Net ID 271. The auth1 results 281 may include an identifier, public key, or other information corresponding to the Net ID 271 or reference, like a cryptographic hash pointer to the transaction record Tx 1 establishing the Net ID 271. Thus, for example, the transaction record Tx4 may be accessed to identify a token value and public key associated with the Net ID 271 to which the Auth1 results 281 correspond. Accordingly, in response to a notification to authenticate or a user attempt to authenticate, the mobile device 101 may transmit the signed token as results for a zero-knowledge proof as the signature may be verified based on the corresponding public key associated with the Net ID 271. Thus, for example, a smart contract may verify a signature of a token in a process to determine an authentication result of user proof of ownership of a Net ID.

Turning briefly to FIG. 4C, an illustrative example embodiment is shown. Example transaction Tx 415A may correspond to authentication results of verified proof of ownership of a Net ID record. The authentication results may include an ID and a Public ID Key of the Net ID for which the proof of ownership claim was authenticated (or, alternatively, a cryptographic hash pointer to a transaction record of the Net ID), criteria A, and optionally a token A. The transaction Tx 415 including the authentication results is published to the blockchain (e.g., as node content within a block within a directed acyclic graph). As described above, a transaction record like transaction Tx 415A may be published on the blockchain in association with a user authentication process within the identity management system. The criteria A may include representations of credential values the user satisfied for successful authentication of proof of ownership of a Net ID. The token A may be a unique, randomly generated value determined during authentication of the proof of ownership of the Net ID.

Those prior authentication results represented by transaction Tx 415A may be relied upon for subsequent user authentication to the Net ID. In some cases, an entity may accept the criteria A by which the user previously authenticated and authenticate the user based on a zero-knowledge proof verifiable by the authentication results in transaction Tx 415A. For example, the entity may accept a signed token A (e.g., signed with the private key corresponding to the public ID key), subject to signature verification, as proof of ownership based on the transaction Tx 415A within a configurable amount of time after the transaction Tx 415A is published or recorded on the blockchain. In some embodiments, that token may satisfy some criteria B of a relying party B for authentication of the user based on the prior record of transaction Tx 415A. For example, criteria B may require same or equivalent credentials as criteria A, but require presentation of the signed token. A transaction, like transaction Tx 415B, may be published indicating that criteria by which the relying party B authenticated the user. For example, a smart contract may take as input the Tx 415A and the signed token and determine an authentication result based on the signed token being verified as signed by a private key corresponding to a public key (e.g., public ID key) in the Tx 415A information. Determination of the authentication result may be additionally based on confirmation that one or more timestamps corresponding to the transaction Tx 415A (e.g., time of publication) or signature of the token are within a threshold period of time. The authentication results may be published as indicated by transaction Tx 415B, which indicates the ID and public ID key corresponding to the Net ID the authentication results were determined for and the criteria B by which the user was authenticated. In some embodiments, the transaction 415B may include a new token, like token B, generated by the smart contract having determined the authentication results. In turn, that token B, rather than token A, might be required for a subsequent authentication based on the authentication results indicated in transaction Tx 415B.

In some cases, an entity may have more stringent or specific criteria by which they require a user to authenticate prior to granting the user access to an asset. For example, an entity, like a relying party C, may require user authentication by different criteria C than the criteria B indicated in the transaction record Tx 415B corresponding to a previous authentication of the user. Yet, the relying party C may consider the transaction record 415B authoritative, i.e., by virtue of confirmation on the blockchain that the user proved ownership of the Net ID as indicated in a record of transaction Tx 415B by the criteria B. As a result, rather than require the user to authenticate by all the criteria C and proof of ownership of a Net ID, the relying party C may accept the criteria B and the proof of ownership claim such that the user only need to provide a subset of criteria C not met by the record of transaction Tx 415B. For example, the criteria C may specify a type of biometric measurement or other user specific information different than those previously supplied by the user to meet criteria B (or criteria A). The criteria C may also indicate that if a prior authentication record 415B is used to satisfy some portion of criteria, a signed token, e.g., token B, from the prior transaction Tx 415B must be provided along with one or more additional representations of credentials, which may also be signed. For example, the token B and representations of the additional credentials required to meet criteria B may be signed by a private key of the user corresponding to a public key corresponding to the Net ID. For example, the token B and representations of credentials may be signed by a private key corresponding to the Public ID Key of the Net ID indicated in the authentication results of the prior transaction Tx 415B. As with the prior example, signed credentials may be authenticated by signature verification, such as by a signature verification function that takes as input signed data (e.g., the signature), the data, and the corresponding public key. Thus, the user may authenticate by providing zero-knowledge proofs relative to those additional credentials required by criteria C not met by one or more prior transactions (e.g., Tx 415B or Tx 415A). The one or more credentials previously supplied for user authentication may not be requested for authentication based on criteria C as the prior criteria (e.g., criteria B or criteria A) may be accepted as satisfying that portion of the criteria C.

A transaction, like transaction Tx 415C, may be published indicating that criteria by which the relying party C authenticated the user. For example, a smart contract may take as input the Tx 415B, the signed token B, and additional signed credentials (which may be provided with the data string that was signed in instances where the data string includes one or more representations of credentials, a time stamp, token, or other value), and determine an authentication result based on the signed token being verified as signed by a private key corresponding to a public key (e.g., public ID key) in the Tx 415B information and the requested signed credentials being verified as signed by the private key and the representations of the credentials having been verified as matching established representations of credentials associated with the Net ID. Determination of the authentication result may be additionally based on confirmation that one or more timestamps corresponding to the transaction Tx 415B or transaction Tx 415A (e.g., time of publication), signature of token, or other credentials are within a threshold period of time. The authentication results may be published as indicated by transaction Tx 415C, which indicates the ID and public ID key corresponding to the Net ID the authentication results were determined for and the criteria C by which the user was authenticated. In some embodiments, the transaction 415C may include a new token, like token C, generated by the smart contract having determined the authentication results. In turn, that token C, rather than a prior token, might be required for a subsequent authentication based on the prior authentication results. In some embodiments, authentication based on prior authentication results may only consider a threshold number of prior transactions, and acceptance of a prior transaction may also expire based on a threshold period of time.

In some embodiments, transaction records including authentication results for Net IDs are stored in a sub-graph, like a sub-graph of cryptographic hash pointers within a directed acyclic graph, such that authentication results records may be interrogated within a smaller search space than the entire body of on-block transactions. For example, because prior authentication transactions may be accepted in subsequent authentication transactions for a relatively short threshold period of time (e.g., minutes, hours, or days), storing such transactions within a sub-graph may avoid searches through older authentication transactions for other types of transactions storing relatively static content (e.g., Net ID records, smart contracts, etc.). In other words, the normal search space for active authentication transactions may be on the order of a relatively small number of blocks compared to the entire chain of blocks. In contrast, the search space for Net ID records may span the entire chain of blocks including such records as a transaction record establishing a Net ID may remain valid indefinitely, or until updated or otherwise modified, which may occur with much less frequency than user authentication on the Net ID.

Thus, for example, records like those shown in FIG. 4C may be stored within a sub-graph and other types of transaction records (e.g., for Net ID records like those illustrated in FIGS. 4A and 4B) may be stored within a different sub-graph. In some embodiments, the example transactions 415 in FIG. 4C may also include some or all of the information from one or more of transactions 401, 405 of FIG. 4A or FIG. 4B. For example, an authentication transaction 415 combining that information may indicate which devices or users authenticated to which Net ID and which user account of a Net ID, such as by one or more associations (e.g., key-value pairs) between a user account or additional user/device credentials to which criteria were satisfied for authentication on the Net ID.

Figure 3A:
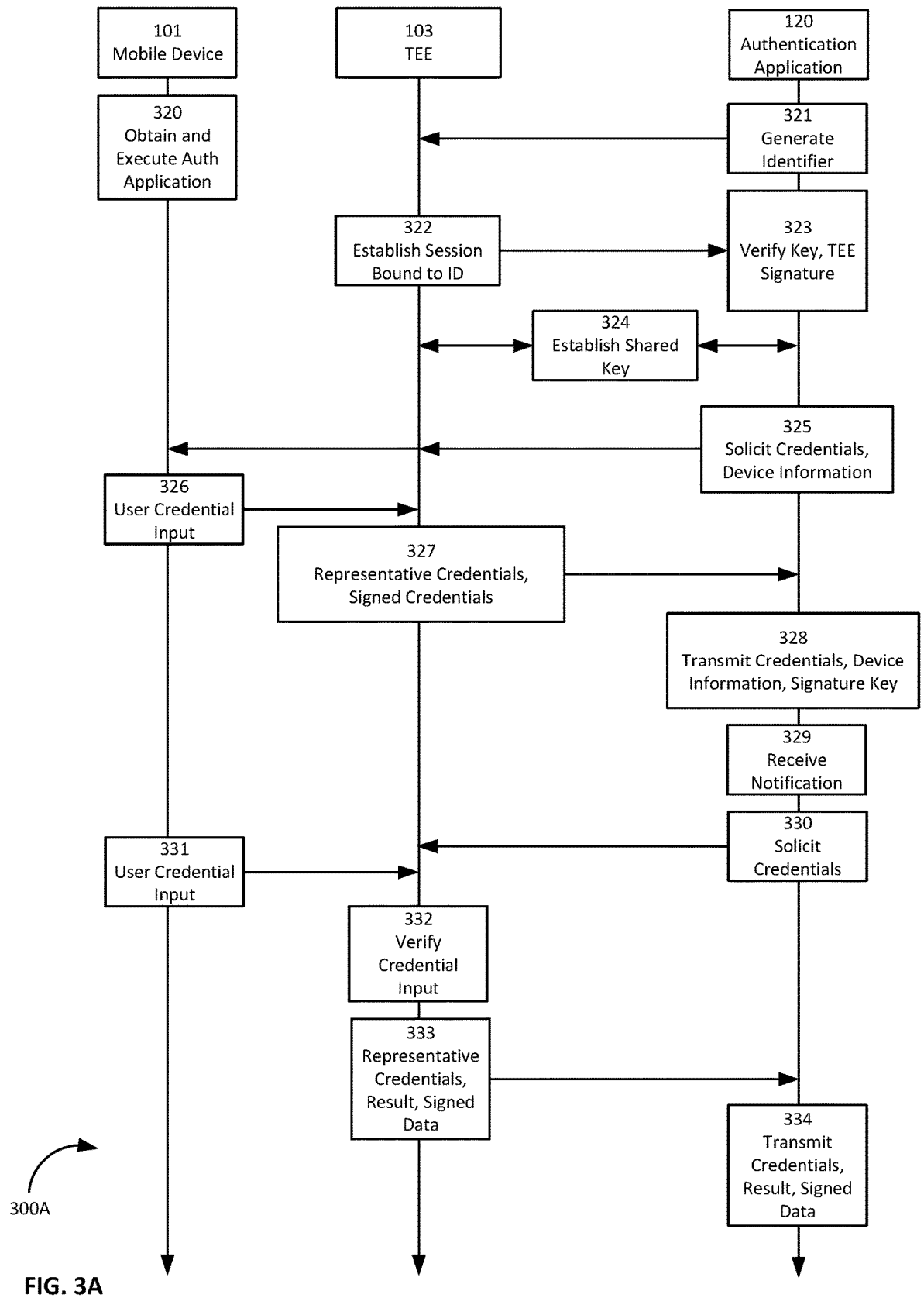
FIG. 3A is a diagram showing an example of a process for authentication of a user within example computing environments described in the present application.

Example Process for Credential Establishment and Collection for Authentication of a User FIG. 3A is a diagram showing an example of a process 300A for authentication of a user. The process 300A may occur within an example computing environment, such as the example computing environment 100 illustrated in FIG. 1 or the example computing environment 200 illustrated in FIG. 2.

The process 300A of FIG. 3A illustrates operations performed by a device, such as a mobile device 101 including a trusted execution environment 103 and authentication application (e.g., an authentication application 120 or 220), according to at least one embodiment described herein. While example authentication application 120 is shown in FIG. 3A by reference, example authentication application 220 may be configured to perform all or some of the illustrated operations described below. Accordingly, reference to authentication application 120 should be not construed as limiting. As described previously, example mobile devices 101 may include a trusted execution environment 103 and execute an authentication application 120 (or authentication application 220). As such, the separation of the blocks 101, 103, 120 may be considered illustrative as each of the operations may be performed on a mobile device 101.

The process 300A may begin with the obtaining 320 of an authentication application on the mobile device 101. Examples of obtaining the authentication application on the mobile device may include a preloading of the authentication application on the mobile device 101 or downloading of the authentication application to the mobile device from an application repository. Further, step 320 may include executing the authentication application on the mobile device 101, which may include loading the authentication application in a memory of the mobile device and executing the authentication application by a processor of the mobile device. The memory and processor of the mobile device 101 may be configured for the execution of applications within a client execution environment (CEE), which may be isolated from a trusted execution environment 103 (TEE) of the mobile device. The TEE 103 may include a secure memory and co-processor not accessible by applications within the CEE.

Example authentication application 120 is configured to interface with the TEE 103 of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application 120 within the CEE, the authentication application 120 is configured to establish a secure session, e.g., a secure channel of communications, with the TEE 103. The secure session may be considered secure by way of encryption of data communicated between the authentication application 120 and the TEE 103.

Once executed, such as within the CEE, the authentication application 120 perform one or more operations in a registration process, which may correspond to steps 321-328. Starting with operation 321, the authentication application 120 may generate an identifier and pass the identifier to the TEE 103. For example, the authentication application 120 may pass the identifier to the TEE 103 in association with one or more requests for establishing a secure session.

The TEE 103 may also perform operations to establish a secure session. The TEE 103 may also bind a secure session to an identifier received from the authentication application. For example, the TEE 103 may generate one or more keys, and one or more of those keys may be bound to a received identifier. The TEE 103 may generate a public key and a private key of a key pair, which may be bound to the received identifier. Additionally, the TEE 103 may generate a shared key, which may be bound to the received identifier. The binding may be logical, such as by an association in memory, or one or more of those keys may be generated based on the identifier. For example, in response to a request for a secure session, the TEE 103 may generate a private and public key, and pass the public key to the authentication application 120 by which the application 120 may encrypt a generated identifier 221 to pass to the TEE 103. In turn, a shared key may be bound to or based on the generated identifier. Alternatively, the TEE 103 may sign the identifier or other data with a private signature key and pass the signed identifier or other data with the public signature key to the TEE 103 for verification. In either instance, a public key may be provided in a response to the authentication application 120, by which the authentication application may verify 323 that data was generated by the TEE.

Thus, the TEE 103 may establish 322 a session bound to the identifier generated by the authentication application 120 and output data for establishing the session to the authentication application. In addition, the TEE 103 may sign data corresponding to output data in the response, and provide a key (e.g., a public key) of the TEE 103, in association with the response. The signed data and the signature may be provided in a same response as a key or by one or more different responses.

The authentication application 120 receives responses from the TEE 103. The responses may include data, signed data, or a key for verifying signed data. The key may be a public key for verifying 323 a signature of the TEE 103 using a corresponding private key, such that the data may be verified as being generated by the TEE 103 based on the signed data and signature key. For example, a verification function may take as input the data, signed data, and signature key, and return a result indicating that the data corresponds to the signed data. In some embodiments, the data may be organized in a string for signing and verification. Example string values may correspond to data values or hashes of data values.

Once the authentication application 120 verifies that the TEE 103 generated data, the authentication application 120 and TEE 103 may establish a shared key 324. For example, the authentication application 120 may encrypt data (e.g., identifier or other data) corresponding to a shared key using a public key provided by the TEE 103. In turn, using a private key, the TEE 103 may decrypt the data to obtain the shared key. Alternatively, the process may occur in the other direction with the authentication application 120 providing a public key to the TEE 103, by which the TEE 103 can encrypt and return a shared key. The shared key may be used by the TEE 103 and the authentication application 120 to exchange data using symmetric encryption. In either instance, the shared key may be bound to an identifier generated by the authentication application 120.

In some embodiments, establishment 322 of the secure session further comprises an initialization of a count within the TEE 103. The TEE 103 may also provide a current count in responses to the TEE 103. The TEE 103 may respond to only those requests received from the authentication application 120 which increment the count. As such, the authentication application 120 may be configured to, in generating a request to the TEE 103, increment a current count last received from the TEE 103 in an immediately prior response to the generated request. Thus, in receiving a request from the authentication application 120, the TEE 103 may verify whether the incremented count was incremented in an appropriate manner (various examples of which are described within reference to FIG. 1). The TEE 103 may also verify whether the number of increments or a value of the count exceeds a threshold representative of a number of requests allowed for a given session. Upon determining the threshold has been reached, the TEE 103 may request the authentication application 120 refresh the sessions, such as by performing one or more of steps 321-324, which may include authentication of the use according to one or more credentials stored within the trusted execution environment 103.

With the shared key established, the authentication application 120 may solicit 325 credentials and device information from the TEE 103 or mobile device 101. Device information may include a device identifier solicited from the TEE 103 or mobile device 101 that is operable to receive a notification for authentication of the user of the mobile device. User input credentials 326 via the mobile device 101 may be obtained with the TEE 103. The TEE 103 may generate 327 representations of those credentials for transmission outside of the TEE without divulging actual credential values. The TEE 103 may sign output data corresponding to the representations and output the representations and the signed data. The TEE 103 may also output one or more public keys corresponding to one or more private keys used to generate signed data if different than a prior key provided to the authentication application 120.

The authentication application 120 receives data output from the TEE 103, which may include representations of credentials, signed data corresponding to those representations, and signature key (e.g., a public key) for verifying signed data output by the TEE 103. As described above, the authentication application 120 may verify data was generated by the TEE 103 based on the signed data, correspond public key, and data. The authentication application 120 transmits 328 data, including the data output from the TEE 103, and device information of the mobile device 101, to a server to complete a registration. The data transmitted to the server many further include user account information (e.g., for a given relying party) to which the registration pertains. The server stores the information for later use to authenticate a user to access secure assets of the relying party.

After registration of the mobile device 101 by the authentication application 120, the authentication application may receive a notification 329 corresponding to an access attempt to access a secure asset (e.g., of a relying party) or attempt to use an established identity or federated user account associated with an established identity. The notification 329 may request solicitation of one or more user credential inputs, such as one or more of the different credentials established during the registration process. In response to the notification, the authentication 120 interfaces with the TEE 103 to solicit 330 the credentials requested by the notification.

The user may be prompted or otherwise request to input 331 one or more credentials. The input credentials are obtained within the TEE 103, and the TEE 103 may verify 332 credential input. Representations of the input credentials may be generated, or stored representations of the input credentials the TEE 103 verified 332 according to the input credentials may be output by the TEE 103. In some embodiments, the TEE 103 also provides a result of the verification. In some embodiments, the TEE 103 generates signed data corresponding to one or more of the output data and outputs the signed data. The signed data may also include inputs such as one or more timestamps or other identifying information describing when or what the signed data was generated for. For example, the signed data may take as input a representation of a credential and other information, such as a timestamp or other identification information for the notification. The other inputs may be included in the output data or selected from information also known to a server based on the last notification transmitted to the mobile device (which may select same other data in a verification of signed data). The data and signed data are provided to the authentication application 120, which transmits the data and signed data to a server for authentication. A signature key previously provided to the server in a registration process can be used to verify the signed data in accordance with the data (and optionally other data, such as notification information).

Example Process for Out-of-Band Authentication

Figure 3B:
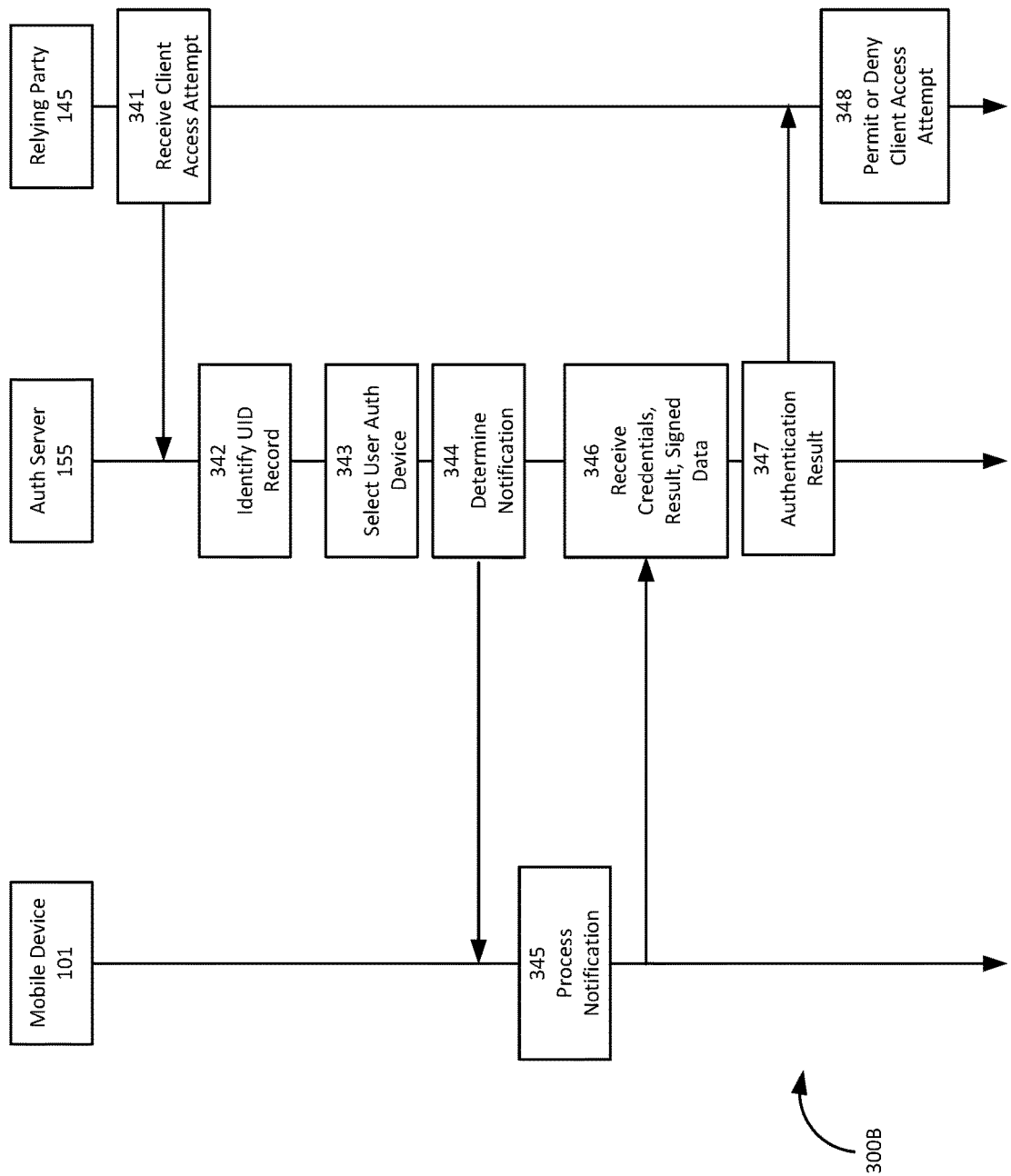
FIG. 3B is a diagram showing an example of a process for authentication of a device within example computing environments described in the present application.

FIG. 3B is a diagram showing an example of a process 300B for authentication of a device with another device in an out-of-band authentication process. The process 300B may occur within an example computing environment, such as the example computing environment 100 illustrated in FIG. 1 or the example computing environment 200 illustrated in FIG. 2. The process 300B of FIG. 3B illustrates example operations performed by various devices, such as a mobile device 101 including a trusted execution environment 103, an authentication server 155, and a relying party server 145 according to at least one embodiment described herein. In some embodiments, such as in accordance with embodiments described with reference to the computing environment of FIG. 2, an application server 245 may be an instance of a relying party server 145, and one or more of the application server 245 and the authentication server 155 may optionally include all or some computing node functionality or be a computing node 201. Thus, for example, one or more of the operations illustrated as being performed by the authentication server 155 may alternatively be performed by a computing node, such as by the computing node loading and execution of a smart contract configured to perform one or more of the illustrated operations. Accordingly, reference to the authentication server 155 should be not construed as limiting, as a computing node of a decentralized computing platform for identity management may perform all or some of the illustrated process, and that computing node need not be a specific computing node controlled by a specific entity, but rather any computing node in a collection of computing nodes participating within the computing environment 200 of FIG. 2.

As shown, the process 300B begins with an access attempt by a client device at the relying party 145. The access attempt may be to a secure asset of the relying party 145, such as an online resource accessible by client devices over a network. The relying party 145 may pass information about the access attempt to the authentication server 155. The information passed to the authentication server 155 may include information such as user account information or device information associated with the access attempt. For example, the relying party 145 may receive a user account identifier at block 341 and pass the user account identifier to the authentication server 155.

The authentication server 155, based on the user account identifier, may identify a UID Record 342, such as within a repository storing various UID Records corresponding to different users or accounts. The UID record may be associated with or otherwise include the user account identifier for identification by the authentication server 155 based on information about an access attempt by a client device. The UID record identified by the authentication server 155 may include records or a listing of one or more devices registered with the authentication server 155 for user authentication. The authentication server 155 may select 343 a device according to a device record stored for the different ones of the registered devices. In some embodiments, the authentication server 155 selects a device different from the device attempting to access the asset when multiple devices are registered with the authentication server 155 under the UID Record. The selected device may also be determined by the authentication server 155 to have a trusted execution environment, such as by the registration of the device using an authentication application in accordance with various steps described with reference to FIG. 3A. The registration of the device and creation of the device record may further include the receipt of credential information for the user from the device.

With a device selected based on the device record, the authentication server 155 may determine 344 a notification for transmission to the device. The notification may be determined responsive to information stored in the device record. For example, the device record may include a device identifier applicable to transmit the notification to the selected device. Similarly, the device record may store information about the different credentials which a user of the device may provide to authenticate with the authorization server using that device. The notification 344 determined by the authentication server 155 may identify one or more of the different credentials the user must provide.

The device, which may be a mobile device 101 having a trusted execution environment and previously registered with the authentication server 155, may receive the notification from the authentication server 155. In turn, such as by various steps described with reference to FIG. 3A, the mobile device 101 may process 345 the notification within the trusted execution environment. The result of the processing 345 by the mobile device 101 may include various data transmitted to the authentication server 155 for authentication of the user of the mobile device.

For example, the authentication server 155 may receive a response to the notification from the mobile device that includes data corresponding to representations of requested credentials input by the user or results of any verifications performed within the TEE. The response may also include signed data for verification of the data. For example, the authentication server 155 may use a public key for signature verification previously received from the mobile device 101 in a registration process to verify the data was generated by the mobile device having the corresponding private key. In turn, the authentication server 155 may also verify whether the data (e.g., determined to have originated from the mobile device based on the signature) matches stored data. For example, the authentication server 155 may determine whether a received representation of the credential matches a previously stored representation of the credential. Further, the authentication server 155 may determine whether the received data corresponds to a notification 344 requesting that data. For example, the received data or verification process (e.g., using signed data) may include a timestamp or other identifying information for a notification (e.g., the notification from step 344) such that authentication server 155 can determine that the response was generated for a specific notification that requested it.

Based on the processing of the data and signed data received from the mobile device 110 for the notification transmitted to the mobile device at step 344, the authentication server 155 determines an authentication result. For example, if the data can verified as originating from the mobile device 101 the data was requested from based on the signed data and a stored key for the verifying, which may include verification of whether the data is responsive to the particular notification from step 344, and the received representation of a credential matches the stored representation of the credential that was requested, the authentication server 155 determines the user successfully authenticated. Alternatively, the authentication server 155 may determine that the user did not successfully authenticate, such as if one of the verification steps fails due to a lack of a match, credential different than that requested, or unable to verify data based on signed data, etc. The authentication server 155 transmits an authentication result to the relying party, for example the authentication result may indicate that the user was authenticated and the access attempt by the client should be granted or indicate that the user was not authenticated and the access attempt should be denied. In some embodiments, the result includes identifying information for the client device attempting to access the relying party based on the information previously received from the relying party 145 in association with the access attempt such that the attempt is granted or denied only for that particular device.

The relying party 145 receives the authentication result for the access attempt of step 341 from the authentication server 155. In turn, the relying party permits or denies 348 the access attempt by the client device based, at least in part, on the result. Accordingly, the access attempt by the client device from step 341 may be authenticated, at least in part, by involvement of a different device including a trusted execution environment, such as mobile device 101, that is operable to authenticate a user permitted to access the secure asset by additional factors for increased security of the asset.

Example Process for Establishing a User Identity

Figure 5:
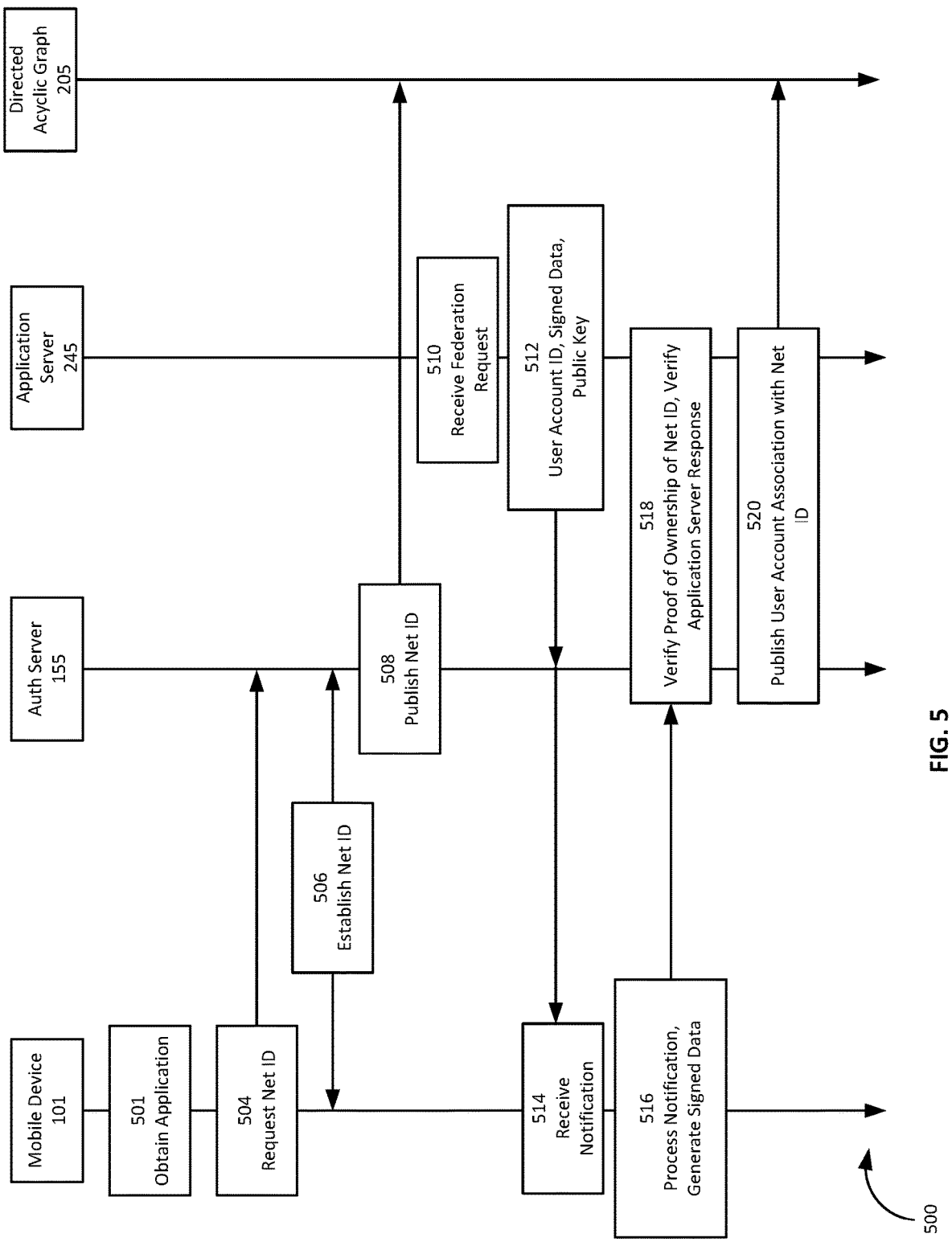
FIG. 5 is a diagram showing example processes for establishing an identity and optionally federating a user account on a decentralized computing platform.

FIG. 5 is a diagram showing an example of a process 500 for establishing an identity on a decentralized computing platform. The process 500A may occur within an example computing environment, such as the example computing environment 200 illustrated in FIG. 2.

The process 500 of FIG. 5 illustrates various operations performed by a device, such as a mobile device 101, which may include an application like an authentication application 220 or relying party application 225 configured to perform at least some of the operations, according to at least some embodiments described herein. In addition, the mobile device 101 may include a trusted execution environment operable to collect and process at least some of the data described below, according to at least some embodiments described herein. The authentication server 155 and application server 245 are alternately shown as performing some operations but not others. Some or all of these operations may be implemented by a smart contract, iterations of which may be called by different ones of the servers and verified as authentic to disparately execute processes comprising same operations according to the smart contract. In some embodiments, the authentication server 155 or relying party application server 245 may be a computing node, or otherwise include computing node functionality, such as being configured to access data or store data within a directed acyclic graph 205 or process data for publication within the directed acyclic graph 205. Alternatively, a server 155 or 245 may interface with a computing node configured to store, access, and process data within a directed acyclic graph 205. Although just one directed acyclic graph 205 is illustrated, many entities may store authoritative representations of the directed acyclic graph 205 according to a consensus process whereby a plurality of computing nodes agree on authoritativeness of records and data structure of the directed acyclic graph 205 and verification according to those authoritative records within the data structure.

The process 500 may begin with the obtaining 501 of an authentication application on the mobile device 101. Examples of obtaining the authentication application on the mobile device may include a preloading of the authentication application on the mobile device 101 or downloading of the authentication application to the mobile device from an application repository. Further, step 501 may include executing the authentication application on the mobile device 101, which may include loading the authentication application in a memory of the mobile device and executing the authentication application by a processor of the mobile device. The memory and processor of the mobile device 101 may be configured for the execution of applications within a client execution environment (CEE), which may be isolated from a trusted execution environment (TEE) of the mobile device. The TEE may include a secure memory and co-processor not accessible by applications within the CEE.

In some embodiments, the authentication application is configured to interface with the TEE of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application within the CEE, the authentication application is configured to establish a secure session, e.g., a secure channel of communications, with the TEE. The secure session may be considered secure by way of encryption of data communicated between the authentication application 120 and the TEE.

The authentication application may be configured to request 504 establishment of a net ID within the identity management system. For example, upon execution of the authentication application within the CEE, the authentication application may prompt the user indicate whether the user desires to create a Net ID. If the user desires to create a Net ID, the authentication application may generate a request 504 for transmission by the mobile device 101 to a server, such as authentication server 155. For example, the request 504 may indicate that the user desires to establish a Net ID. In some embodiments, the request 504 also includes an encryption key such that the authentication server 155 may encrypt data for decoding only by the mobile device 101, like within the TEE of the mobile device 101, which may generate the encryption key. An encryption key may also be used to establish a secure connection, such as by HTTPS, TLS, etc., to afford secure communication of data between the mobile device 101 and the authentication server 155.

The mobile device 101 and authentication server 155 may exchange data for establishing 506 the Net ID. In some embodiments, an authentication application interfaces with the TEE of the mobile device 101 to obtain the data transmitted to the authentication server 155 and stored or process information received from the authentication server 155. For example, the authentication server 155 may generate a private key, digital certificate, or other data pertaining to the establishment of the Net ID for the user of the mobile device 101 and encrypt that data by an encryption key provided by the TEE of the mobile device such that the data may be decrypted, stored, or processed securely within the TEE. The authentication server 155 may also convey similar data over a secure connection to the mobile device 101. Similarly, the mobile device 101 may securely generate data within the TEE for transmission to the authentication server 155. Additionally, the mobile device 101 may securely sign data within the TEE of the mobile device and output the signed data and a public key by which that signed data may be verified by the authentication server 155. Similarly, the authentication server 155 may sign data and output signed data and a public key by which that signed data may be verified by the mobile device 101 within the TEE.

In some embodiments, the authentication application may receive data output from the TEE, which may include representations of credentials collected or generated within the TEE, signed data corresponding to those representations, and signature key (e.g., a public key) for verifying signed data output by the TEE. The signature key of the TEE may be operable to verify that representations of credentials and other data were collected or generated within the TEE based on the signed data, correspond public key, and data. Some of the representations of credentials may include another public key, for which the TEE stores a corresponding private key. This public key may be associated with the Net ID, although that should not suggest the public key of the TEE may not be used. Rather, multiple public keys may be used to verify data signed by different corresponding private keys retained by the user or stored within the TEE.

In some embodiments, the authentication application performs one or more steps similar to those previously described with reference to FIG. 3A to establish data within the TEE and receive data from the TEE, and transmit that data to the authentication server 155 during step 506. For example, the mobile device, TEE, and authentication application may perform one or more steps, like steps 320-328, as described with reference to FIG. 3A. Those steps may also include the exchange, storage, and generation of the addition data discussed above and discussed elsewhere throughout the application, such as with reference to FIG. 2, for the establishment of a Net ID 506 including that information.

Subsequent to receiving the information for establishing a Net ID for a user, such as from the mobile device 101, the authentication server 155 may authenticate the information. For example, the authentication server 155 may authenticate the information by one or more signature verification functions to ensure the validity of received representations of credentials, public keys, and the like. The authentication server 155 may organize at least some of the information according to a schema of a smart contract and structure a request, like a transaction, including the information according to the schema, results of the authentication of the information, and specifying the smart contract. The request may be published 508 to cause one or more computing nodes to receive the request and execute the smart contract to process the request. The smart contract may be configured to output a user identity information as a record of the transaction, like a user identity record in a unified schema, and the plurality of computing nodes may agree, by a consensus protocol, on the authoritative version of the user identity record and the data therein for authoritative publication within the directed acyclic graph 205 (e.g., recordation within a blockchain).

In some embodiment, an application server 145 of a relying party may receive a federation request 510. The federation request may be received from the mobile device 101, such as via a relying party application executing on the mobile device, or via a web interface of the application server 245 (which may originate from another client or the mobile device 101 of the user). The request 510 may include information about the Net ID with which a user desires to federate their account with the application server 245 under. The information may be operable to identity a user identity record corresponding to the Net ID such that a notification may be issued to the mobile device 101, or other device identified within the user identity record, by which the user may approve the activity. The notification may include a user account ID of the user account to federate, signed data by the application server 245, and a public key of the application server 245 operable to verify the authentication of the signed data and thus the authenticity of the notification. In some embodiments, the notification may be a transaction published to a blockchain. In some embodiments, the notification may be a push notification to the mobile device of the user, which may be identified from user account information of the relying party, authentication server 155, or the user identity record. Other example notification options are also contemplated. Moreover, a user may use a relying party application to exchange data with the application server 245 which may include the request, notification, and data processed in response to the notification as discussed below.

In some embodiments, the mobile device 101 receives 514 a notification pertaining to a request to federate a user account. An application, like the authentication application, may obtain and process 516 the notification. Processing of the notification may include the processing of at least some data within the TEE of the mobile device 101 to generate signed data by which user confirmation of the request and user proof of ownership of the Net ID the user account is to be federated under may be verified. The authentication application may obtain the signed data 516 indicative of the user approving the request to federate a user account and indicative of user ownership of the Net ID (e.g., a zero knowledge proof).

The application server 245 or authentication server 155 may receive the signed data 516 and associated the user account with the Net ID responsive to a verification 518 of proof of ownership of the Net ID by the signed data. The verification 518 may also include verification of application server response by signed data, which may be received from the application server or the mobile device 101 if the authentication server 155 authenticates the federation request. In some embodiments, the application server 145 may authenticate the federation request.

If the request is authenticated the authentication server 155 or the application server 245 may publish 520 the user account association with the Net ID to federate the user account. For example, subsequent to receiving the information for federating a user account with an established Net ID, the authentication server 155 may authenticate the information. For example, the authentication server 155 may authenticate the information by one or more signature verification functions to ensure the validity of received representations of credentials, public keys, and the like. The authentication server 155 may organize at least some of the information according to a schema of a smart contract and structure a request, like a transaction, including the information according to the schema, results of the authentication of the information, and specifying the smart contract. The request may be published 520 to cause one or more computing nodes to receive the request and execute the smart contract to process the request. The smart contract may be configured to output a user identity information as a record of the transaction, like a user identity record including the association with the user account ID or public key of the application server 245 in a unified schema, and the plurality of computing nodes may agree, by a consensus protocol, on the authoritative version of the user identity record indicating the association and the data therein for authoritative publication within the directed acyclic graph 205 (e.g., recordation within a blockchain).

Example Process for Authenticating a User to a User Identity

Figure 6:
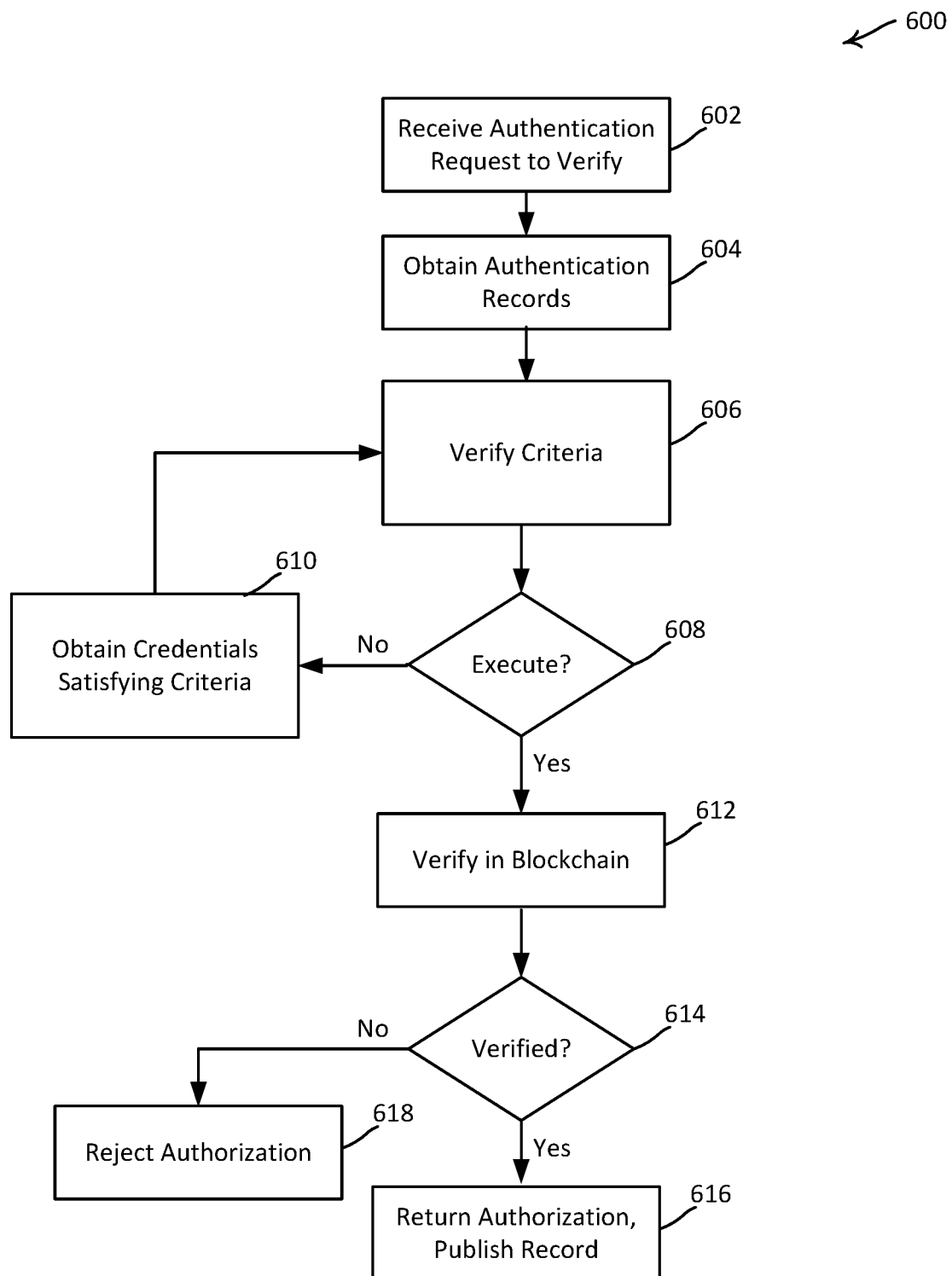
FIG. 6 is a diagram showing an example of a process for authentication of a user to an identity established on a decentralized computing platform within example computing environments described in the present application.

FIG. 6 is a diagram showing an example of a process for authentication of a user to an identity established on a decentralized computing platform within example computing environments described in the present application. In some cases, the process 600 is executed by one or more computing nodes 100 of the decentralized data store or a server 155, 245, though embodiments are not limited to that implementation, which is not to suggest that any other description herein is limiting. For example, in some cases one or more servers 155, 245 may operate as, or include, a computing node 100, and in some cases, some steps may be performed by an authority 130 and some steps by a computing node 100 executing a smart contract.

In some embodiments, the process 600 includes receiving, with one or more processors, an authentication request 602 to verify based on on-blockchain records. On-blockchain records may include user identity records and authentication records. In some embodiments, an address of a smart contract may be called with an API call including the information described below. In some embodiments, the smart contract may respond to the API call by executing a transaction on the blockchain that records information in a schema of an authentication record to the blockchain. In some embodiments, the smart contract may perform one or more API requests to other entities to retrieve some of the information described below for processing. For example, a request may specify storage locations of some information and the smart contract may be configured to retrieve that data, such as by a reference, like a cryptographic hash pointed to a prior authentication record or a user identity record. All or a subset of the information may also be provided in a request.

An example request may include one or more credentials, which may be representations of credentials, identifiers of records to access, which may be addresses of those records, and signed data as proof of secret knowledge for asserting ownership of a Net ID, such as a net ID established by a user identity record on a blockchain. Additionally, the request may include criteria by which the user must authentication. In some embodiments, the criteria are accessed by or included in the smart contract.

At step 604 the process may include obtain a prior record of authentication. For example, the request may identify the prior record of authentication by address. Some embodiments may include a search for a prior record of authentication based on a value provided in the request, such as a token value or identifier associated within the user identity. The search may be restricted to only those authentication records published within a threshold period of time, such as specified by the criteria, as authentication records published outside the threshold period of time may not be counted as satisfying any of criteria. If a prior authentication record is identified within the threshold period of time, it may be considered as satisfying some criteria for authentication of the request. For example, the prior authentication record may indicate which criteria were previously satisfied by the user during authentication of a prior authentication request. The prior authentication record may also indicate any other prior authentication record which may be considered, and that record and any other additional record may be accessed in a similar fashion, up to a threshold number of prior authentication records to consider. In some embodiments, if any prior authentication record was considered in authentication of a user, that information is published in the record of authentication of the request such that all active criteria (at least at the time of authentication) by which the user has authenticated is indicated. A timestamp may be associated with the different criteria such that it may be considered or discarded according to criteria for authentication of the request. The prior record of authentication and any additional authentication records may be verified as authoritative by the computation of cryptographic hash values based on the record and other records within the blockchain.

The process may include verification 606 of the criteria for authenticating the request. Some of the criteria may be satisfied by a prior authentication record according to which credentials a user supplied for the prior authentication. Some of the criteria may be satisfied by signed data provided within the request. For example, the signed data may include a token of the prior authentication record signed by a private key of the user and verifiable by a public key of the user. Information like public keys of the user and representations of the credentials may be stored within the prior authentication record, or, they may be accessed based on an address of a provided user identity record or identifier of a user identity record provided within the request. If a user identity record is accessed, it may also be verified. First, however, the process may include verifying 606 that the request data and any criteria accepted from a prior authentication record satisfy the criteria by which the request 602 is to be authenticated. If criteria are not satisfied, the next verification process may not execute 608 until additional credentials satisfying the criteria not met are obtained 610. For example, a notification may be generated and transmitted to the user to provide additional credentials satisfying the criteria, which may be obtained 610 and verified against the criteria 606. However, in some embodiments, the process may start again at 602, such as by the requesting entity obtaining credentials for the criteria not met and submitting a new request. If the criteria are met, execution 608 may continue.

At step 612, the process may include verifying, on the blockchain, any authentication record obtained at step 604 or any user identity record obtained 604 (e.g., if no prior authentication record is obtained). The verification 612 may include the computation of cryptographic hash values based on the records and other records within the blockchain to determine that the records relied upon, obtained, or referenced are authentic (e.g., have not been tampered with subsequent to their publication). If the records relied upon have not been tampered with, and the criteria are satisfied, the request may be authenticated by virtue of the user proving ownership of the user identity record (which may be conveyed by prior authentication records deemed authoritative as public keys and credential values are verified by consensus according to the process for publication).

If the records are verified 614, the process may continue to step 616, which may include the publication of a record of the authentication result for the request and the criteria by which the request was authenticated. In some embodiments, a token is generated and included in the authentication record. Step 616 may also include a return of authorization of the authentication request, which may be provided as authentication results for publication or other result response, depending on the embodiment.

If the records are not verified 614, authorization is rejected 618 and no record of authentication may be published. The authorization is rejected 618 when the records are not verified 614 as it indicates the records were improperly modified and thus the criteria cannot be considered to have been properly satisfied.

Results published at step 616 or the returned authorization of the authentication request (e.g., returned results) may be used in a variety of different ways as discussed herein. For example, a relying party server may permit a client device access to a secure asset based on those results derived from user authentication via a different device as described previously, such as in an out-of-band authentication. In another example, a relying party server may permit a mobile device access to a secure asset based on those results in an in-band process, by which the mobile device may pre-authenticate or have authenticated previously with a different relying party. In another example, some results may be returned to a mobile device, which the mobile device may process and present to access a secure asset. In some embodiments, those results are structured and signed by private signature of an authority (or controlling relying party) as proof of authentication, by which a terminal or electro-mechanical device may perform an action subject to signature verification based on the results and signed results when presented by the mobile device. In some embodiments the mobile device signs at least some data such that signature verification may also confirm timeliness of presentation by the same mobile device that the authentication results pertain for physical access or payments.

In some embodiments, the described functionality of FIGS. 3-6 and elsewhere herein may be implemented with machine-readable instructions stored on a tangible, non-transitory, machine-readable medium, such that when the instructions are executed, the described functionality may be implemented. In some embodiments, notwithstanding use of the singular term "medium," these instructions may be stored on a plurality of different memory devices (which may include dynamic and persistent storage), and different processors may execute different subsets of the instructions, an arrangement consistent with use of the singular term "medium." In some embodiments, the described operations may be executed in a different order from that displayed, operations may be omitted, additional operations may be inserted, some operations may be executed concurrently, some operations may be executed serially, and some operations may be replicated, none of which is to suggest that any other description is limiting.

Figure 7:
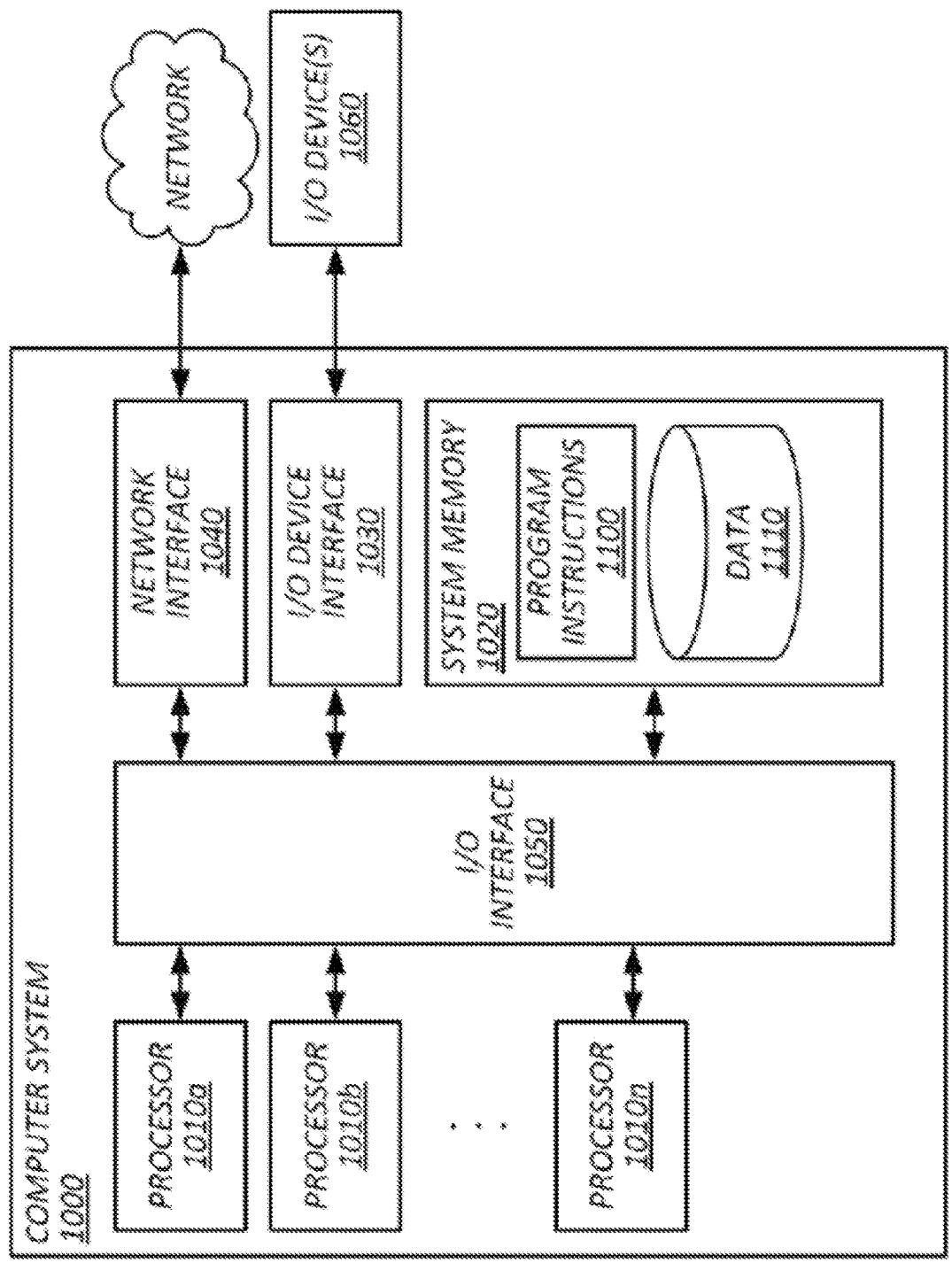
FIG. 7 is a block diagram showing an example of a computing device by which the present techniques may be implemented.

FIG. 7 is a diagram that illustrates an example computing system 1000 in accordance with embodiments of the present techniques. The various servers (e.g., 145, 155, 245), computing nodes 201, client devices (e.g., 101, 135), or repositories (e.g., 160, 165) described herein may include one or more components like those of the example computing system 1000. Various portions of systems and methods described herein, may include or be executed on one or more computer systems similar to computing system 1000. Further, functions, processes and modules described herein may be executed by one or more processing systems similar to that of computing system 1000. In some embodiments, functions and processes may be enumerated in one or more smart contracts that may be executed be one or more processing systems similar to those of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be used independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A computer-implemented method of establishing a user identity, the method comprising:
    receiving, with one or more processors, at least one credential value, first cryptographically-signed data, and a public key of a cryptographic key pair for establishing an identity;
    determining, with one or more processors, to establish the identity in response to verification of the first cryptographically-signed data based at least in part on the public key and the at least one credential value;
    causing, with one or more processors, a record of the identity to be published to a tamper-evident, decentralized data store, the record of the identity associated with the public key and the at least one credential value, wherein the data store comprises a plurality of identity records and a plurality of other records;
    receiving, with one or more processors, a request identifying a first record within the data store and second cryptographically signed data associated with the request;
    accessing, with one or more processors, within the data store, the first record and accessing at least one other second record referenced by the first record;
    determining, with one or more processors, an authentication result for the request based on verification of:
        a set of cryptographic hash values based on the first record, at least some of the cryptographic hash values also being based on other records;
        a set of cryptographic hash values based on the second record, at least some of the cryptographic hash values also being based on other records, wherein the second record is the record of the identity; and
        the second cryptographically-signed data based at least in part on the public key associated with the record of the identity; and
    in response to the authentication result indicating the request is authenticated based on the verification:
        causing, with one or more processors, one or more computing devices to publish to the tamper-evident, data store an authentication record including at least a reference to the first record and the second cryptographically-signed data.

2. The method of claim 1, wherein:
the tamper-evident, decentralized data store is a blockchain-based data store of a decentralized computing system.

3. The method of claim 1, wherein:
a plurality of computing nodes of a decentralized computing platform obtain computer program code for determining the authentication result for the request; and
the plurality of computing nodes each perform the verification and then collectively, using a consensus protocol, determine the authentication result for publication to the tamper-evident, data store as the authentication record.

4. The method of claim 1, wherein:
the authentication result is obtained by a server system; and
a client device is permitted to access a resource by the server system based on the authentication result.

5. The method of claim 4, wherein:
the one or more computing devices are peer nodes of a decentralized computing platform and each executes a duplicate instance of obtained computer program code to perform the verification and then collectively determine the authentication result for the request.

6. The method of claim 1, wherein:
the first record is a prior authentication record and the second cryptographically-signed data comprises a cryptographic signature of data associated with the identity record;
the second cryptographically-signed data comprises a signature of one of the at least one credential values; and
verification of the second cryptographically-signed data based at least in part on the public key associated with the record of the identity comprises:
    verifying the cryptographic signature of the data as being generated using a private key of the cryptographic key pair.

7. The method of claim 1, further comprising:
receiving, with one or more processors, a request to federate a user account associated with a server system with the record of the identity, the request comprising third cryptographically-signed data;
determining, with one or more processors, whether to federate the user account with the record of the identity based on a verification of the third cryptographically-signed data, the third cryptographically-signed data verified based in part on the public key associated with the record of the identity and a public key associated with the server system; and
in response to determining to federate the user account with the record of the identity, causing, with one or more processors, a modified record of the identity to be published to the tamper-evident, decentralized data store, the modified record of the identity associated with the public key of the server system and a reference to the record of the identity.

8. The method of claim 7, wherein:
the first record is the modified record of the identity; and
the authentication result indicating the request is authenticated based on the verification of the modified record of the identity and the record of the identity confers authentication to the federated user account associated with the server system, the server system configured to permit an access attempt by a client device responsive to the authentication result.

9. The method of claim 1, wherein:
the tamper-evident, decentralized data store comprises a graphical data structure having a plurality of nodes;
a first subset of nodes have node content corresponding to records of identities; and a second subset of nodes have node content corresponding to authentication records.

10. The method of claim 9, wherein:
node content corresponding to a respective one of the authentication records comprises a reference to a record of a given identity and cryptographically-signed data by which a user or device was authenticated for the given identity.

11. The method of claim 9, further comprising:
verifying, within a first subgraph comprising the first subset of nodes, that the record of the identity is consistent with a set of cryptographic hash pointers based on a node in the first subset having node content corresponding the record of the identity, at least some of the cryptographic hash pointers also being based on other records of identities; and
identifying the record of the identity based on an identifier other than a cryptographic hash pointer by searching within contents of nodes within the first subgraph without searching within contents of nodes within the second subgraph.

12. The method of claim 9, further comprising:
receiving, with one or more processors, a second request identifying the first record, the request comprising third cryptographically-signed data and a reference to the authentication record;
determining, with one or more processors, a second authentication result for the second request based on verification of:
  a set of cryptographic hash values based on the first authentication record, at least some of the cryptographic hash values also being based on other authentication records;
  publication of the first authentication record occurring within a threshold period of time; and
  the third cryptographically-signed data based at least in part on the public key, wherein the public key is associated with the first authentication record; and
in response to the second authentication result indicating the second request is authenticated based on the verification:
  causing, with one or more processors, one or more computing devices to publish to the tamper-evident, data store a second authentication record including at least a reference to the first authentication record and the third cryptographically-signed data.

13. The method of claim 1, further comprising:
monitoring, by a computing system, the data store for publication of the authentication record; and
in response to detecting the publication of the authentication record, activating, by the computing system, a version or component of a software application on a computing device associated with the request.

14. The method of claim 1, further comprising:
monitoring, by a monitoring computing system, the data store for publication of the authentication record; and
in response to detecting the publication of the authentication record, permitting, by the monitoring computing system, access to an asset by a computing device associated with the request.

15. A computer-implemented method executed by one or more processors of a computing device that supports a client-side role in authentication, the method comprising:
obtaining an application within a memory of a computing device; and
executing, by the computing device, the application, the application causing the computing device to perform operations comprising:
  establishing a set of credentials within a secure memory of the computing device;
  obtaining a credential value corresponding to a credential in the set of credentials and first cryptographically-signed data;
  transmitting the first cryptographically-signed data to a first computing system for publication within a decentralized data store;
  receiving identity information, the identity information associated with a tamper-evident, identity record established within the decentralized data store, the identity record associated with a public key;
  obtaining second cryptographically-signed data, wherein the second cryptographically-signed data is signed by a private key corresponding to the public key; and
  transmitting the second cryptographically-signed data and identity information to a second computing system for authentication of the computing device to the identity record based on verification of the second cryptographically-signed data being signed by the private key corresponding to the public key associated with the identity record and verification of authenticity of the identity record within the decentralized data store.

16. The computer-implemented method of claim 15, wherein:
each credential in the set of credentials corresponds to a different credential and at least some of the different credentials are obtained from different corresponding components of the computing device, the application configured to cause a trusted execution environment of the computing device to obtain, in the secure memory, credential values for respective credentials from respective components; and
at least one representation of a credential is the public key corresponding to the private key.

17. The computer-implemented method of claim 15, wherein at least one credential value corresponding to a respective credential in the set of credentials is a representation generated with a function based on the respective credential.

18. The computer-implemented method of claim 15, further comprising:
obtaining the second cryptographically-signed data in response to receiving a request for authentication of a user of the computing device, and wherein:
  the request includes identifying information corresponding to an access attempt associated with the request, and
  obtaining the second cryptographically-signed data comprises providing the identifying information for signature by the private key responsive to user input confirming the access attempt.

19. The computer-implemented method of claim 15, further comprising:
receiving a token from the second computing system indicative of the authentication of the computing device to the identity record; and
presenting, by the computing device, at least the token to a device governing access to an asset, wherein the device determines to permit access to the asset in response to verification of the token.

20. A computer-implemented method executed by one or more processors of a computing device that supports a client-side role in authentication to a federated user account on a decentralized data store, the method comprising:
  obtaining an application within a memory of a computing device; and
  executing, by the computing device, the application within a client execution environment of the computing device, the application when executed causing the computing device to perform operations comprising:
    establishing of a set of credentials within a secure memory by a co-processor of a trusted execution environment of the computing device, the co-processor being a different processor from a central processing unit of the computing device;
    requesting, from the trusted execution environment, first data comprising a representation of a credential in the set of credentials, the representation of the credential being indicative of credential values maintained within the trusted execution environment;
    transmitting the first data to a first server system for publication within a decentralized data store;
    obtaining identity information, the identity information corresponding to a tamper-evident, identity record established within the decentralized data store, the identity record associated with a public key; and
    storing the identity information within a wallet application on the computing device; and
  executing, by the computing device, a relying application within the client execution environment of the computing device, the relying application when executed being configured to perform operations comprising:
    obtaining, from the wallet application, the stored identity information;
    requesting, from the trusted execution environment, second data signed within the trusted execution environment by a private key corresponding to the public key of the identity record; and
    transmitting the second data to a second server system for publication within the decentralized data store in association with the identity record.

21. The method of claim 20, wherein:
use of the private key to sign the second data is governed by authentication of a user on the computing device.

22. The method of claim 20, wherein:
the first sever system and the second server system are the same computing system, and
a third server system confers user access via the computing device executing the relying party application to an asset based on an authentication result using the identity record and the second data, the authentication result being stored as an authentication record within the decentralized data store.

23. The method of claim 20, wherein:
the first sever system and the second server system are different computing systems, and
the second server system confers user access via the computing device executing the relying party application to an asset based on an authentication result determined for the second data, the authentication result being stored as an authentication record within the decentralized data store.

24. A computer-implemented method executed by one or more processors of a computing device that supports a client-side role in authentication, the method comprising:
  obtaining an application within a memory of a computing device; and
  executing, by the computing device, the application, the application when executed causing the computing device to perform operations comprising:
    establishing of a set of credentials within a secure memory of the computing device;
    obtaining a credential value corresponding to a credential in the set of credentials;
    transmitting the first data to a first server system for publication within a decentralized data store;
    obtaining identity information, the identity information corresponding to a tamper-evident, identity record established within the decentralized data store, the identity record associated with a public key; and
    storing the identity information on the computing device; and
  generating, for a relying application executed by the computing device, in response to request to authenticate a user of the computing device to the identity record, second data signed by a private key corresponding to the public key of the identity record, wherein the second data is transmitted to a second server system for publication within the decentralized data store in association with the identity record.

25. A non-transitory, machine-readable medium storing instructions for establishing a user identity that, when executed by one or more processors, effectuate operations comprising:
  receiving, with one or more processors, at least one credential value, first cryptographically-signed data, and a public key of a cryptographic key pair for establishing an identity;
  determining, with one or more processors, to establish the identity in response to verification of the first cryptographically-signed data based at least in part on the public key and the at least one credential value;
  causing, with one or more processors, a record of the identity to be published to a tamper-evident, decentralized data store, the record of the identity associated with the public key and the at least one credential value, wherein the data store comprises a plurality of identity records and a plurality of other records;
  receiving, with one or more processors, a request identifying a first record within the data store and second cryptographically signed data associated with the request;
  accessing, with one or more processors, within the data store, the first record and accessing at least one other second record referenced by the first record;
  determining, with one or more processors, an authentication result for the request based on verification of:
    a set of cryptographic hash values based on the first record, at least some of the cryptographic hash values also being based on other records;
    a set of cryptographic hash values based on the second record, at least some of the cryptographic hash values also being based on other records, wherein the second record is the record of the identity; and
    the second cryptographically-signed data based at least in part on the public key associated with the record of the identity; and
  in response to the authentication result indicating the request is authenticated based on the verification:
    causing, with one or more processors, one or more computing devices to publish to the tamper-evident, data store an authentication record including at least a reference to the first record and the second cryptographically-signed data.

26. The non-transitory, machine-readable medium of claim 25, wherein:
the tamper-evident, decentralized data store is a blockchain-based data store of a decentralized computing system.

27. The non-transitory, machine-readable medium of claim 25, wherein:
a plurality of computing nodes of a decentralized computing platform obtain computer program code for determining the authentication result for the request; and
the plurality of computing nodes each perform the verification and then collectively, using a consensus protocol, determine the authentication result for publication to the tamper-evident, data store as the authentication record.

28. The non-transitory, machine-readable medium of claim 25, wherein:
the authentication result is obtained by a server system; and
a client device is permitted to access a resource by the server system based on the authentication result.

29. The non-transitory, machine-readable medium of claim 28, wherein:
the one or more computing devices are peer nodes of a decentralized computing platform and each executes a duplicate instance of obtained computer program code to perform the verification and then collectively determine the authentication result for the request.

30. The non-transitory, machine-readable medium of claim 25, wherein:
the first record is a prior authentication record and the second cryptographically-signed data comprises a cryptographic signature of data associated with the identity record;
the second cryptographically-signed data comprises a signature of one of the at least one credential values; and
verification of the second cryptographically-signed data based at least in part on the public key associated with the record of the identity comprises:
verifying the cryptographic signature of the data as being generated using a private key of the cryptographic key pair.

31. The non-transitory, machine-readable medium of claim 25, the operations further comprising:
receiving, with one or more processors, a request to federate a user account associated with a server system with the record of the identity, the request comprising third cryptographically-signed data;
determining, with one or more processors, whether to federate the user account with the record of the identity based on a verification of the third cryptographically-signed data, the third cryptographically-signed data verified based in part on the public key associated with the record of the identity and a public key associated with the server system; and
in response to determining to federate the user account with the record of the identity, causing, with one or more processors, a modified record of the identity to be published to the tamper-evident, decentralized data store, the modified record of the identity associated with the public key of the server system and a reference to the record of the identity.

32. The non-transitory, machine-readable medium of claim 31, wherein:
the first record is the modified record of the identity; and
the authentication result indicating the request is authenticated based on the verification of the modified record of the identity and the record of the identity confers authentication to the federated user account associated with the server system, the server system configured to permit an access attempt by a client device responsive to the authentication result.

33. The non-transitory, machine-readable medium of claim 25, wherein:
the tamper-evident, decentralized data store comprises a graphical data structure having a plurality of nodes;
a first subset of nodes have node content corresponding to records of identities; and
a second subset of nodes have node content corresponding to authentication records.

34. The non-transitory, machine-readable medium of claim 33, wherein:
node content corresponding to a respective one of the authentication records comprises a reference to a record of a given identity and cryptographically-signed data by which a user or device was authenticated for the given identity.

35. The non-transitory, machine-readable medium of claim 33, the operations further comprising:
verifying, within a first subgraph comprising the first subset of nodes, that the record of the identity is consistent with a set of cryptographic hash pointers based on a node in the first subset having node content corresponding the record of the identity, at least some of the cryptographic hash pointers also being based on other records of identities; and
identifying the record of the identity based on an identifier other than a cryptographic hash pointer by searching within contents of nodes within the first subgraph without searching within contents of nodes within the second subgraph.

36. The non-transitory, machine-readable medium of claim 33, the operations further comprising:
receiving, with one or more processors, a second request identifying the first record, the request comprising third cryptographically-signed data and a reference to the authentication record;
determining, with one or more processors, a second authentication result for the second request based on verification of:
a set of cryptographic hash values based on the first authentication record, at least some of the cryptographic hash values also being based on other authentication records;
publication of the first authentication record occurring within a threshold period of time; and
the third cryptographically-signed data based at least in part on the public key, wherein the public key is associated with the first authentication record; and
in response to the second authentication result indicating the second request is authenticated based on the verification:
causing, with one or more processors, one or more computing devices to publish to the tamper-evident, data store a second authentication record including at least a reference to the first authentication record and the third cryptographically-signed data.

37. The non-transitory, machine-readable medium of claim 25, the operations further comprising:
  monitoring, by a computing system, the data store for publication of the authentication record; and
  in response to detecting the publication of the authentication record, activating, by the computing system, a version or component of a software application on a computing device associated with the request.

38. The non-transitory, machine-readable medium of claim 25, the operations further comprising:
  monitoring, by a monitoring computing system, the data store for publication of the authentication record; and
  in response to detecting the publication of the authentication record, permitting, by the monitoring computing system, access to an asset by a computing device associated with the request.

39. A non-transitory, machine-readable medium storing instructions that, when executed by one or more processors, effectuate operations comprising:
  obtaining an application within a memory of a computing device for supporting a client-side role in authentication; and
  executing, by the computing device, the application, the application causing the computing device to perform operations comprising:
    establishing a set of credentials within a secure memory of the computing device;
    obtaining a credential value corresponding to a credential in the set of credentials and first cryptographically-signed data;
    transmitting the first cryptographically-signed data to a first computing system for publication within a decentralized data store;
    receiving identity information, the identity information associated with a tamper-evident, identity record established within the decentralized data store, the identity record associated with a public key;
    obtaining second cryptographically-signed data, wherein the second cryptographically-signed data is signed by a private key corresponding to the public key; and
    transmitting the second cryptographically-signed data and identity information to a second computing system for authentication of the computing device to the identity record based on verification of the second cryptographically-signed data being signed by the private key corresponding to the public key associated with the identity record and verification of authenticity of the identity record within the decentralized data store.

40. The non-transitory, machine-readable medium of claim 39, wherein:
  each credential in the set of credentials corresponds to a different credential and at least some of the different credentials are obtained from different corresponding components of the computing device, the application configured to cause a trusted execution environment of the computing device to obtain, in the secure memory, credential values for respective credentials from respective components; and
  at least one representation of a credential is the public key corresponding to the private key.

41. The non-transitory, machine-readable medium of claim 39, wherein at least one credential value corresponding to a respective credential in the set of credentials is a representation generated with a function based on the respective credential.

42. The non-transitory, machine-readable medium of claim 39, the operations further comprising:
  obtaining the second cryptographically-signed data in response to receiving a request for authentication of a user of the computing device, and wherein:
    the request includes identifying information corresponding to an access attempt associated with the request, and
    obtaining the second cryptographically-signed data comprises providing the identifying information for signature by the private key responsive to user input confirming the access attempt.

43. The non-transitory, machine-readable medium of claim 39, the operations further comprising:
  receiving a token from the second computing system indicative of the authentication of the computing device to the identity record; and
  presenting, by the computing device, at least the token to a device governing access to an asset, wherein the device determines to permit access to the asset in response to verification of the token.

44. A non-transitory, machine-readable medium storing instructions that, when executed by one or more processors, effectuate operations comprising:
  obtaining an application within a memory of a computing device for supporting a client-side role in authentication to a federated user account on a decentralized data store; and
  executing, by the computing device, the application within a client execution environment of the computing device, the application when executed causing the computing device to perform operations comprising:
    establishing of a set of credentials within a secure memory by a co-processor of a trusted execution environment of the computing device, the co-processor being a different processor from a central processing unit of the computing device;
    requesting, from the trusted execution environment, first data comprising a representation of a credential in the set of credentials, the representation of the credential being indicative of credential values maintained within the trusted execution environment;
    transmitting the first data to a first server system for publication within a decentralized data store;
    obtaining identity information, the identity information corresponding to a tamper-evident, identity record established within the decentralized data store, the identity record associated with a public key; and
    storing the identity information within a wallet application on the computing device; and
  executing, by the computing device, a relying application within the client execution environment of the computing device, the relying application when executed being configured to perform operations comprising:
    obtaining, from the wallet application, the stored identity information;
    requesting, from the trusted execution environment, second data signed within the trusted execution environment by a private key corresponding to the public key of the identity record; and
    transmitting the second data to a second server system for publication within the decentralized data store in association with the identity record.

45. The non-transitory, machine-readable medium of claim 44, wherein:
  use of the private key to sign the second data is governed by authentication of a user on the computing device.

46. The non-transitory, machine-readable medium of claim 44, wherein:
- the first sever system and the second server system are the same computing system, and
- a third server system confers user access via the computing device executing the relying party application to an asset based on an authentication result using the identity record and the second data, the authentication result being stored as an authentication record within the decentralized data store.

47. The non-transitory, machine-readable medium of claim 44, wherein:
- the first sever system and the second server system are different computing systems, and
- the second server system confers user access via the computing device executing the relying party application to an asset based on an authentication result determined for the second data, the authentication result being stored as an authentication record within the decentralized data store.

48. A non-transitory, machine-readable medium storing instructions that, when executed by one or more processors, effectuate operations comprising:
- obtaining an application within a memory of a computing device for supporting a client-side role in authentication; and
- executing, by the computing device, the application, the application when executed causing the computing device to perform operations comprising:
  - establishing of a set of credentials within a secure memory of the computing device;
  - obtaining a credential value corresponding to a credential in the set of credentials;
  - transmitting the first data to a first server system for publication within a decentralized data store;
  - obtaining identity information, the identity information corresponding to a tamper-evident, identity record established within the decentralized data store, the identity record associated with a public key; and
  - storing the identity information on the computing device; and
- generating, for a relying application executed by the computing device, in response to request to authenticate a user of the computing device to the identity record, second data signed by a private key corresponding to the public key of the identity record, wherein the second data is transmitted to a second server system for publication within the decentralized data store in association with the identity record.

* * * * *